(12) United States Patent
Schneider et al.

(10) Patent No.: US 12,162,235 B2
(45) Date of Patent: *Dec. 10, 2024

(54) METHODS OF BLADDER MOLDING AT LEAST A PORTION OF AN UPPER FOR AN ARTICLE OF FOOTWEAR

(71) Applicant: adidas AG, Herzogenaurach (DE)

(72) Inventors: Andrew Jacob Schneider, Portland, OR (US); Keith Alexander Blume, Portland, OR (US); Ian James Hennebery, Portland, OR (US); Benjamin William Kleiman, Portland, OR (US); Matteo Edmond Padovani, Portland, OR (US); Edward John Musho, Portland, OR (US); Carl Arnese, Portland, OR (US)

(73) Assignee: adidas AG, Herzogenaurach (DE)

( * ) Notice: Subject to any disclaimer, the term of this patent is extended or adjusted under 35 U.S.C. 154(b) by 676 days.

This patent is subject to a terminal disclaimer.

(21) Appl. No.: 17/213,366

(22) Filed: Mar. 26, 2021

(65) Prior Publication Data

US 2021/0237382 A1   Aug. 5, 2021

Related U.S. Application Data

(63) Continuation of application No. 15/588,433, filed on May 5, 2017, now Pat. No. 10,960,630.

(51) Int. Cl.
*B29D 35/00* (2010.01)
*A43B 9/20* (2006.01)
(Continued)

(52) U.S. Cl.
CPC ............ *B29D 35/0063* (2013.01); *A43B 9/20* (2013.01); *A43B 13/226* (2013.01);
(Continued)

(58) Field of Classification Search
None
See application file for complete search history.

(56) References Cited

U.S. PATENT DOCUMENTS

| 1,863,954 A | 6/1932 | Wilhelmi |
| 3,444,590 A | 5/1969 | Ludwig |

(Continued)

FOREIGN PATENT DOCUMENTS

| CA | 2330517 C | 1/2005 |
| CA | 2755855 A1 | 10/2010 |

(Continued)

OTHER PUBLICATIONS

Extended European Search Report issued in European Patent Application No. 1717004.9, mailed Sep. 19, 2017, 6 pages.

(Continued)

*Primary Examiner* — Jeffrey M Wollschlager
*Assistant Examiner* — Guy F Mongelli
(74) *Attorney, Agent, or Firm* — Sterne, Kessler, Goldstein & Fox P.L.L.C.

(57) ABSTRACT

Methods for manufacturing at least a portion of an upper for an article of footwear that include thermo-forming a pattern on the upper. The methods may include disposing a skin for forming an upper over and inflatable bladder and disposing a mold insert between the skin and a surface of a mold cavity. The mold insert may include a mold pattern including surface features formed in the mold insert. The inflatable bladder may be inflated such that the skin is pressed against the mold insert within a heated mold cavity to form a pattern on an exterior surface of the skin and cause the skin to take on the shape of at least a portion of an upper. In some embodiments, the surface features may be disposed in a gradient pattern configured to provide varying degrees of one or more characteristics to different areas of an upper.

19 Claims, 31 Drawing Sheets

(51) Int. Cl.
*A43B 13/22* (2006.01)
*A43B 23/02* (2006.01)
*A43B 23/04* (2006.01)
*A43D 3/02* (2006.01)
*A43D 3/04* (2006.01)
*B29C 37/00* (2006.01)
*B29C 43/10* (2006.01)
*B29D 35/12* (2010.01)
*B29K 101/12* (2006.01)
*B29L 31/50* (2006.01)

(52) U.S. Cl.
CPC ...... *A43B 23/0215* (2013.01); *A43B 23/0245* (2013.01); *A43B 23/042* (2013.01); *A43D 3/04* (2013.01); *B29C 37/0053* (2013.01); *B29C 43/10* (2013.01); *B29D 35/126* (2013.01); *A43D 3/02* (2013.01); *B29K 2101/12* (2013.01); *B29L 2031/505* (2013.01)

(56) References Cited

U.S. PATENT DOCUMENTS

| | | | |
|---|---|---|---|
| 6,299,962 | B1 | 10/2001 | Davis et al. |
| 6,533,885 | B2 | 3/2003 | Davis et al. |
| 6,708,427 | B2 | 3/2004 | Sussmann et al. |
| 6,855,281 | B2 | 2/2005 | Gumringer et al. |
| 7,992,243 | B2 | 8/2011 | Cook et al. |
| 8,109,536 | B2 | 2/2012 | Labonte |
| 8,578,534 | B2 | 11/2013 | Langvin et al. |
| 8,839,530 | B2 | 9/2014 | Smith et al. |
| 8,910,313 | B2 | 12/2014 | Gordon et al. |
| 8,961,723 | B2 | 2/2015 | Langvin et al. |
| 9,107,479 | B2 | 8/2015 | Hanson et al. |
| 9,114,570 | B2 | 8/2015 | Downs et al. |
| 10,194,714 | B2 | 2/2019 | McGinnity et al. |
| 10,779,616 | B2 | 9/2020 | Becker |
| 10,960,630 | B2 * | 3/2021 | Schneider ............... B29C 43/10 |
| 11,324,282 | B2 | 5/2022 | Becker et al. |
| 2001/0001903 | A1 * | 5/2001 | Di Girolamo ....... A43D 999/00 36/3 R |
| 2002/0165332 | A1 * | 11/2002 | Pope ..................... C04B 35/589 528/25 |
| 2008/0241455 | A1 * | 10/2008 | DiNello ................... B32B 3/26 428/58 |
| 2009/0072436 | A1 | 3/2009 | Dean |
| 2010/0037483 | A1 | 2/2010 | Meschter et al. |
| 2011/0088285 | A1 | 4/2011 | Dojan et al. |
| 2013/0232815 | A1 | 9/2013 | Meythaler et al. |
| 2013/0269209 | A1 | 10/2013 | Lang et al. |
| 2014/0134378 | A1 * | 5/2014 | Downs .................... B32B 5/022 156/196 |
| 2014/0223671 | A1 | 8/2014 | Fisher et al. |
| 2015/0013187 | A1 | 1/2015 | Taniguchi et al. |
| 2015/0052778 | A1 * | 2/2015 | Kirk ........................ A43B 1/04 442/204 |
| 2016/0180440 | A1 | 6/2016 | Dibenedetto et al. |
| 2016/0185062 | A1 | 6/2016 | Boucher et al. |
| 2016/0295971 | A1 | 10/2016 | Arnese et al. |
| 2017/0006965 | A1 | 1/2017 | Musho et al. |
| 2017/0050356 | A1 * | 2/2017 | Gatto .................. B29D 35/148 |
| 2017/0071290 | A1 | 3/2017 | Follet et al. |

FOREIGN PATENT DOCUMENTS

| | | |
|---|---|---|
| EP | 2 484 240 A2 | 8/2012 |
| EP | 2 805 638 A1 | 11/2014 |
| EP | 2 815 668 A1 | 12/2014 |
| KR | 10-0626160 B1 | 9/2006 |
| KR | 10-0903193 B1 | 6/2009 |
| KR | 2015-0100111 A | 9/2015 |
| WO | WO 0241721 A1 | 5/2002 |
| WO | WO 2009/036240 A1 | 3/2009 |
| WO | WO 2014/207325 A1 | 12/2014 |
| WO | WO 2017/083550 A1 | 5/2017 |

OTHER PUBLICATIONS

Extended European Search Report issued in European Patent Application No. 19169289.6, dated Oct. 8, 2019, 8 pages.

* cited by examiner

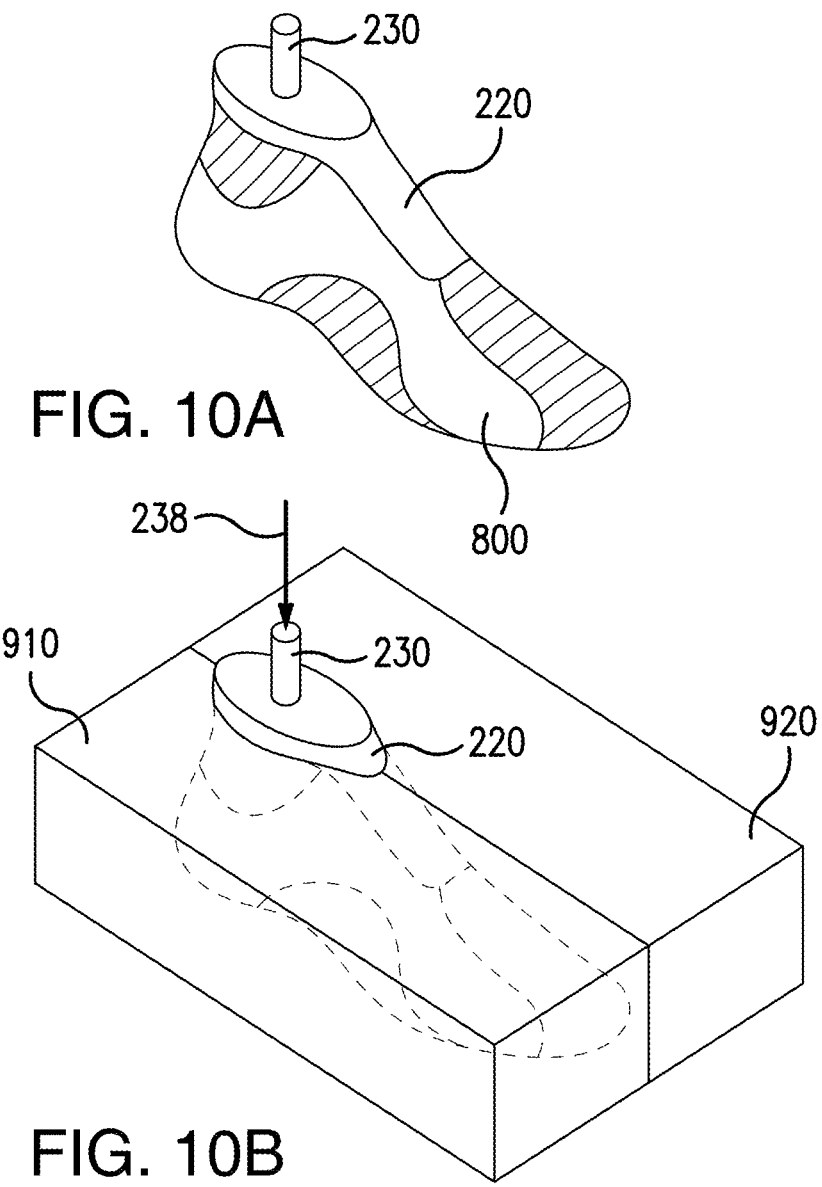
FIG. 10A
FIG. 10B
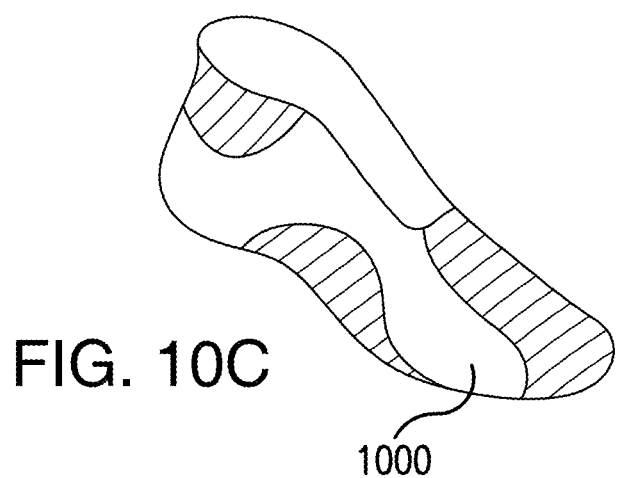
FIG. 10C

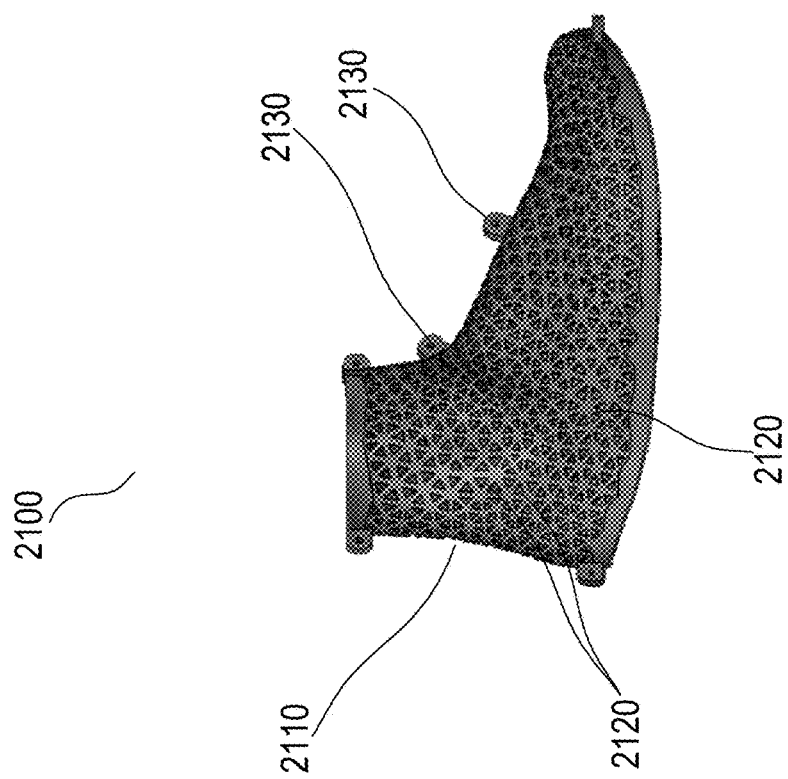
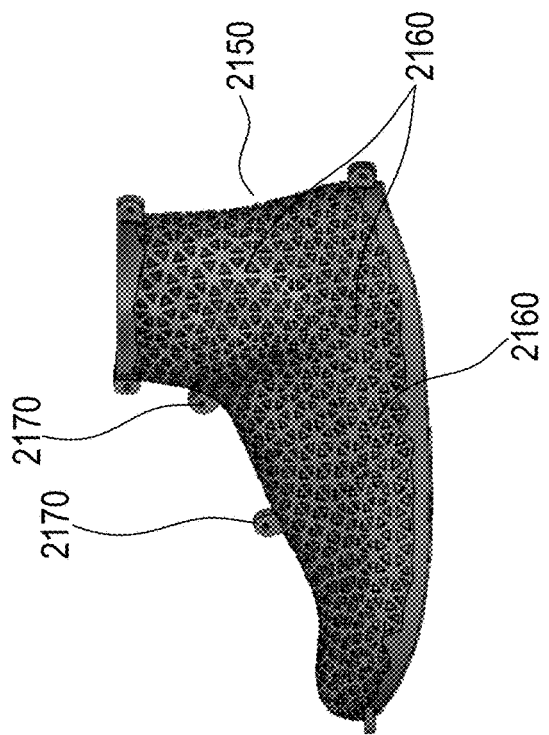
FIG. 21

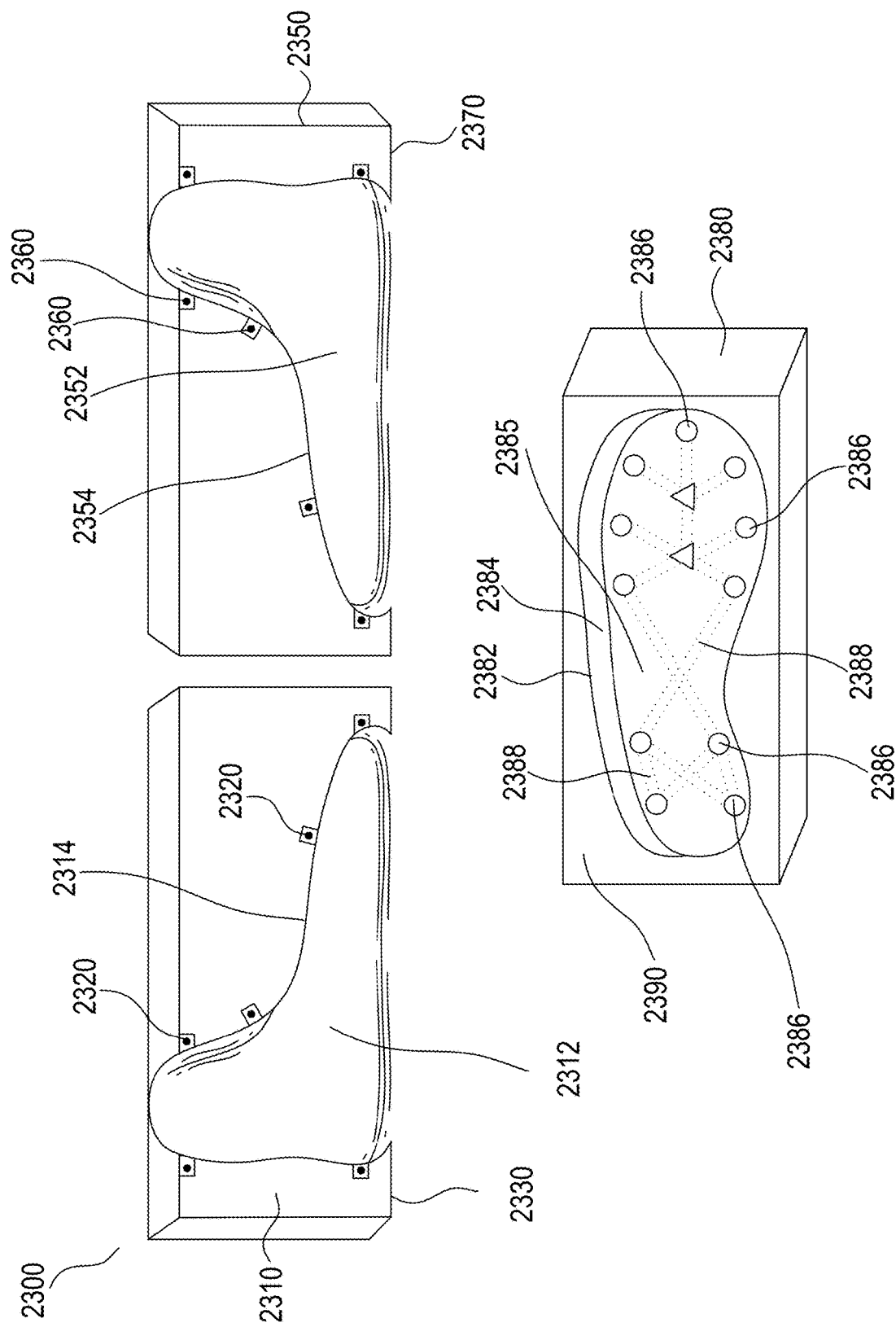

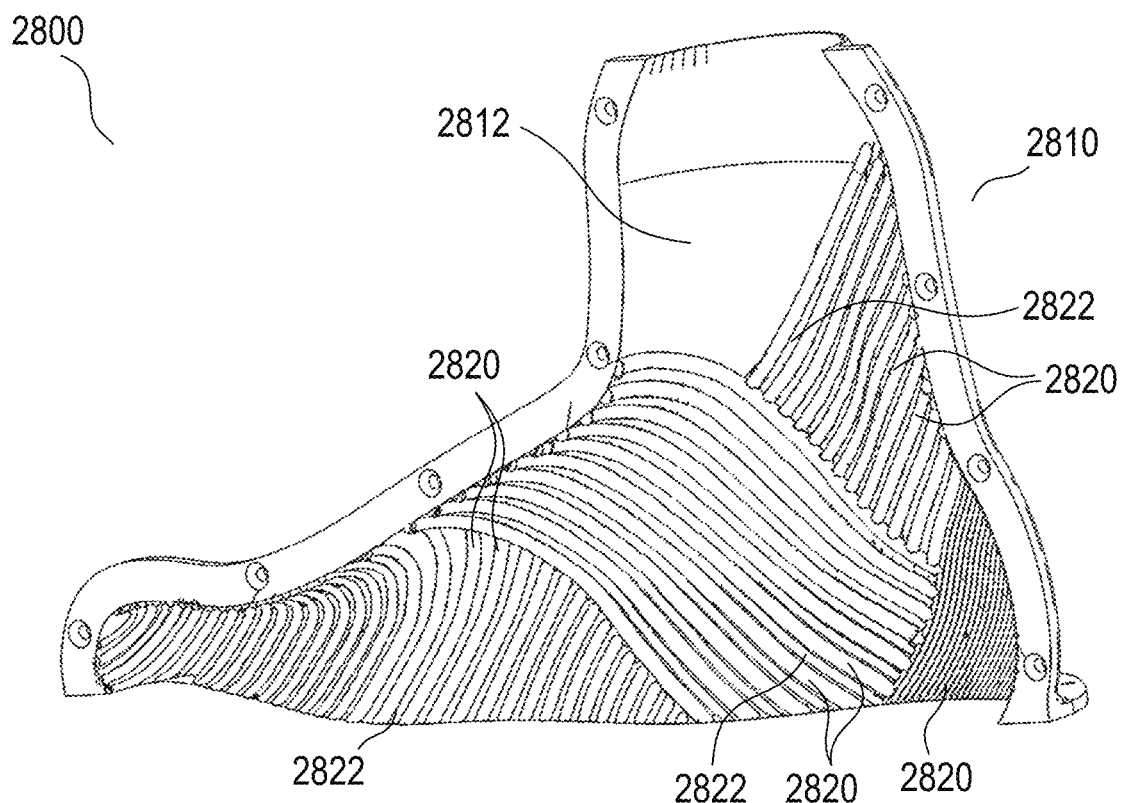
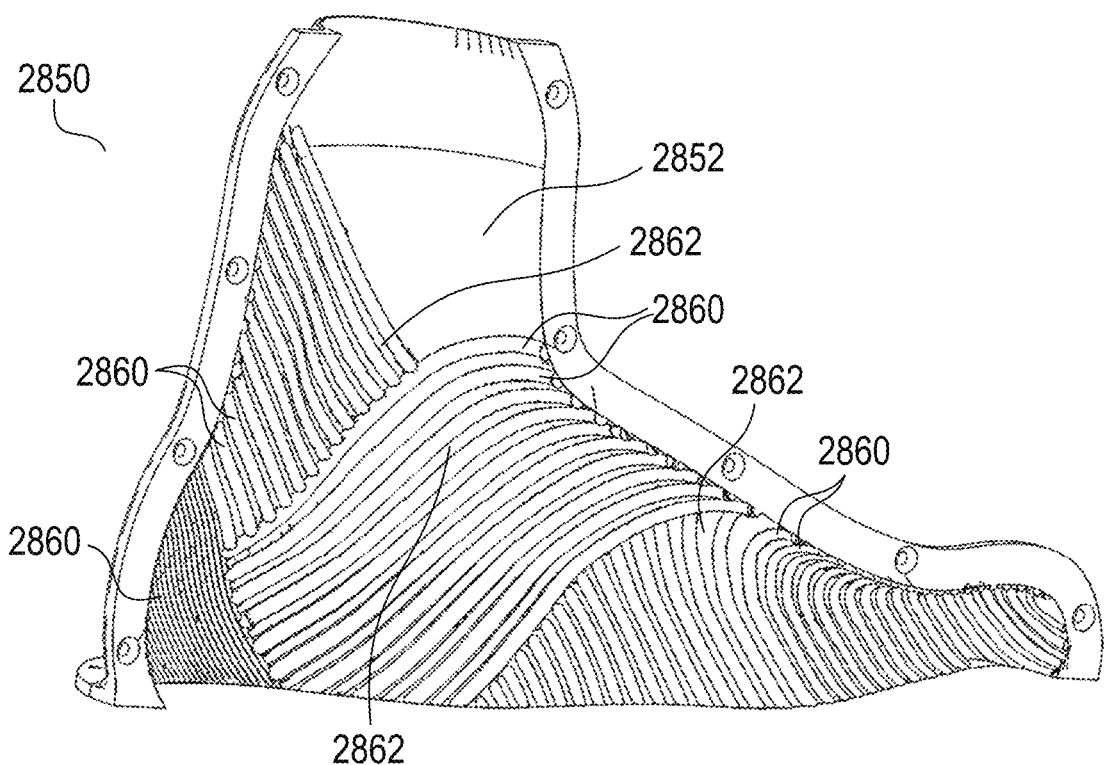
FIG. 28

METHODS OF BLADDER MOLDING AT LEAST A PORTION OF AN UPPER FOR AN ARTICLE OF FOOTWEAR

CROSS-REFERENCE TO RELATED APPLICATIONS

This application is a continuation of and claims priority to U.S. application Ser. No. 15/588,433, filed May 5, 2017, which is incorporated herein by reference in its entirety.

FIELD

The described embodiments generally relate to articles of footwear and methods of making articles of footwear. In particular, described embodiments relate to articles of footwear and methods of making articles of footwear with a three-dimensional thermo-molding process.

BACKGROUND

Individuals are often concerned with the durability, weight, and/or comfort of an article of footwear. This is true for articles of footwear worn for non-performance activities, such as a leisurely stroll, and for performance activities, such as running. Durable footwear will properly function for an extended period of time. Lightweight footwear minimizes the weight an individual has to carry on his or her feet and may be comfortable for an individual. Customized footwear may increase comfort for an individual because it is tailored to the individual's foot anatomy.

For some individuals, for example athletes, stability and propulsion may be desired characteristics for an article of footwear. Footwear that facilitates propulsion (e.g., forward and/or upward motion) may help an athlete perform at an optimal athletic level. Stability for footwear, an in particular stability in portions supporting the ankles of an individual, may reduce the chance of injury to the individual's feet.

Proper footwear should be durable, comfortable, and provide other beneficial characteristics for an individual. Therefore, a continuing need exists for innovations in footwear and fabrics used to manufacture the footwear.

BRIEF SUMMARY OF THE INVENTION

Some embodiments are directed towards a method of manufacturing an upper for an article of footwear, the method including disposing an inflatable bladder around a last; disposing a skin over the inflatable bladder, the skin including at least one of: a base layer including a low melting point thermoplastic polymer and a grid layer including a yarn composed of a low melting point thermoplastic polymer; placing the assembled last, inflatable bladder, and skin within a cavity of a mold; heating the mold to a predetermined temperature; and inflating the inflatable bladder such that the skin is pressed against an interior surface of the heated mold cavity to cause the skin to take on the shape of the internal surface of the mold cavity onto which it is pressed, thereby forming an upper for an article of footwear.

Some embodiments are directed to an upper for an article of footwear made by disposing an inflatable bladder around a last; disposing a skin over the inflatable bladder, the skin including at least one of: a base layer including a low melting point thermoplastic polymer and a grid layer including a yarn composed of a low melting point thermoplastic polymer; placing the assembled last, inflatable bladder, and skin within a cavity of a mold; heating the mold to a predetermined temperature; and inflating the inflatable bladder such that the skin is pressed against an interior surface of the heated mold cavity to cause the skin to take on the shape of the internal surface of the mold cavity onto which it is pressed, thereby forming an upper for an article of footwear.

Some embodiments are directed to a method of manufacturing an upper for an article of footwear, the method including disposing an inflatable bladder around a last; disposing a skin over the inflatable bladder, the skin including a layer including a low melting point thermoplastic polymer; placing the assembled last, inflatable bladder, and skin within a cavity of a mold; heating the mold to a predetermined temperature less than or equal to 180 degrees C.; and inflating the inflatable bladder such that the skin is pressed against an interior surface of the heated mold cavity to cause the skin to take on the shape of the internal surface of the mold cavity onto which it is pressed, thereby forming an upper for an article of footwear.

Some embodiments are directed towards an upper for an article of footwear, the upper including a single integrally molded skin defining a forefoot portion, a midfoot portion, and a rearfoot portion of the upper, the skin including at least one of: a base layer defining a forefoot portion, a midfoot portion, and a rearfoot portion of the upper and including a low melting point thermoplastic polymer; and a grid layer including a yarn composed of a low melting point thermoplastic polymer.

Some embodiments are directed towards an article of footwear including a midsole coupled to an upper, the upper including a single integrally molded skin defining a forefoot portion, a midfoot portion, and a rearfoot portion of the upper, the skin including at least one of: a base layer defining a forefoot portion, a midfoot portion, and a rearfoot portion of the upper and including a low melting point thermoplastic polymer; and a grid layer including a yarn composed of a low melting point thermoplastic polymer.

Some embodiments are directed towards an upper for an article of footwear, the upper including a single integrally molded skin defining a forefoot portion, a midfoot portion, and a rearfoot portion of the upper, the skin including a yarn composed of a low melting point thermoplastic polymer.

Some embodiments are directed towards a method of manufacturing at least a portion of an upper for an article of footwear, the method including disposing an inflatable bladder around a last; disposing a skin over the inflatable bladder; placing the last, the inflatable bladder, and the skin within a cavity of a mold such that a mold insert is disposed between the skin and a surface of the mold cavity, the mold insert including a mold-cavity-facing surface, a skin-facing surface opposite the mold-cavity-facing surface, and a mold pattern including a plurality of surface features formed in the mold insert; heating the mold to a predetermined temperature; and inflating the inflatable bladder such that the skin is pressed against the mold insert within the heated mold cavity, thereby forming a pattern on an exterior surface of the skin and causing the skin to take on the shape of at least a portion of an upper for an article of footwear.

Some embodiments are directed towards a method of providing a pattern on at least a portion of an upper for an article of footwear, the method including disposing an inflatable bladder around a last; disposing an upper material over the inflatable bladder, the upper material comprising a low melting point thermoplastic polymer; providing a mold insert including a mold-cavity-facing surface, an upper-facing surface opposite the mold-cavity-facing surface, and a mold pattern including a plurality of surface features formed in the mold insert; placing the last, the inflatable bladder, and the upper material within a cavity of a mold such that the mold insert is disposed between the skin and a surface the mold cavity; heating the mold to a predetermined temperature; and inflating the inflatable bladder such that the upper material is pressed against the mold insert within the heated mold cavity, thereby forming a pattern on an exterior surface of the upper material.

Some embodiments are directed towards an article of footwear including an upper having an outermost layer including a low melting point thermoplastic polymer, where the outermost surface of the outermost layer comprises a molded pattern formed by the method of either of the previous two paragraphs; and a sole coupled to the upper.

Some embodiments are directed towards an article of footwear including an upper having an outermost layer including a low melting point thermoplastic polymer and sole coupled to the upper, where the outermost surface of the outermost layer includes a molded pattern including a plurality of surface features disposed in a gradient pattern that extends from a forefoot portion of the upper to a heel portion of the upper, the gradient pattern includes surface features having different sizes, and the gradient pattern is configured to impart varying degrees of one or more structural characteristics to different areas of the upper.

Some embodiments are directed to a molding tool for manufacturing at least a portion of an article of footwear, the molding tool including a mold including a cavity defined by a cavity surface and including a three-dimensional volume having a surface area corresponding to an outermost surface area of an upper for an article of footwear; and a mold insert configured to be disposed over at least a portion of the cavity surface and including a mold-cavity-facing surface, an interior surface opposite the mold-cavity-facing surface, and a mold pattern including a plurality of surface features formed in the mold insert, the mold pattern including surface features disposed in a gradient pattern that is configured to impart varying degrees of one or more structural characteristics to different areas of an upper for an article of footwear.

Some embodiments are directed towards a molding tool for manufacturing at least a portion of an article of footwear, the molding tool including a mold including a cavity defined by a cavity surface and including a three-dimensional volume having a surface area corresponding to an outermost surface area of an upper for an article of footwear; and a three dimensional stencil including a first surface area in contact with the mold cavity, a second surface area configured to contact an exterior surface of an upper material, and a plurality of openings extending through the mold insert and disposed between struts of the stencil, where the openings are disposed in a gradient pattern including openings with at least one of: varying depths and varying sizes, the three dimensional stencil includes a shape corresponding to an outermost surface area of an upper for an article of footwear, and the gradient pattern extends from a forefoot portion of the three dimensional stencil to a heel portion of the three dimensional stencil.

BRIEF DESCRIPTION OF THE DRAWINGS/FIGURES

FIGS. 10A, 10B, and 10C are an exemplary process for three-dimensionally thermo-molding an upper according to an embodiment.

Figure 11A:
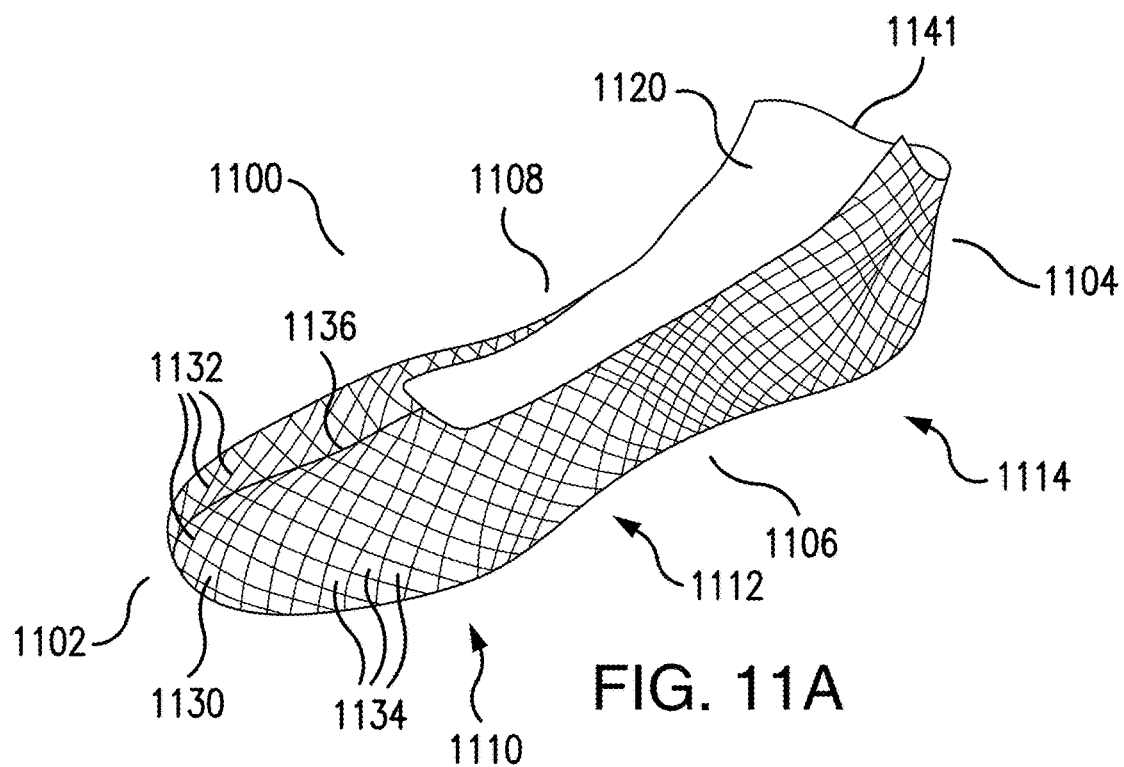
Figure 11B:
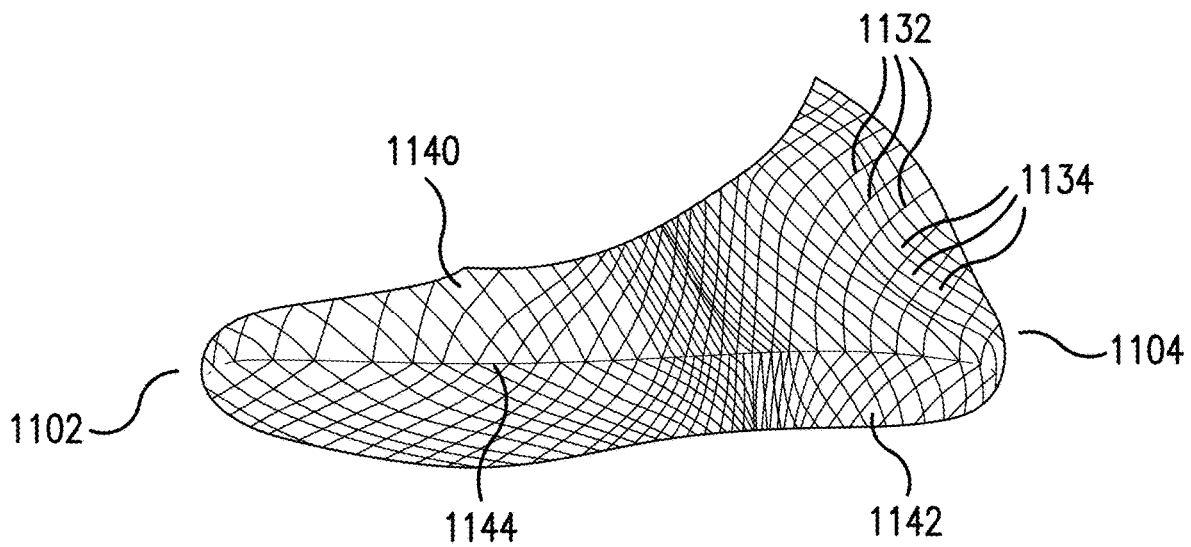

FIG. 11A is a top perspective view of an upper according to an embodiment. FIG. 11B is a bottom perspective view of an upper according to an embodiment.

Figure 12:
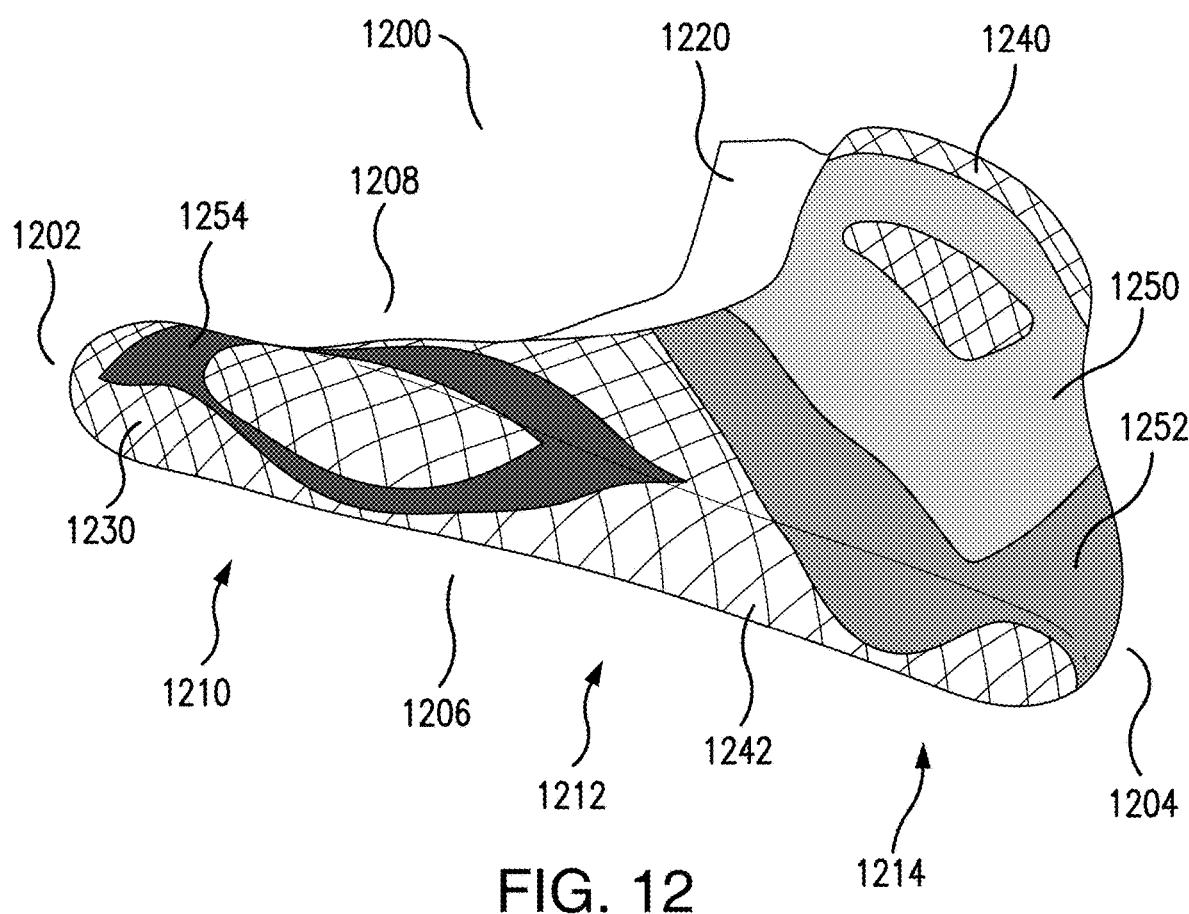

FIG. 12 is a bottom perspective view of an upper according to an embodiment.

Figure 13:
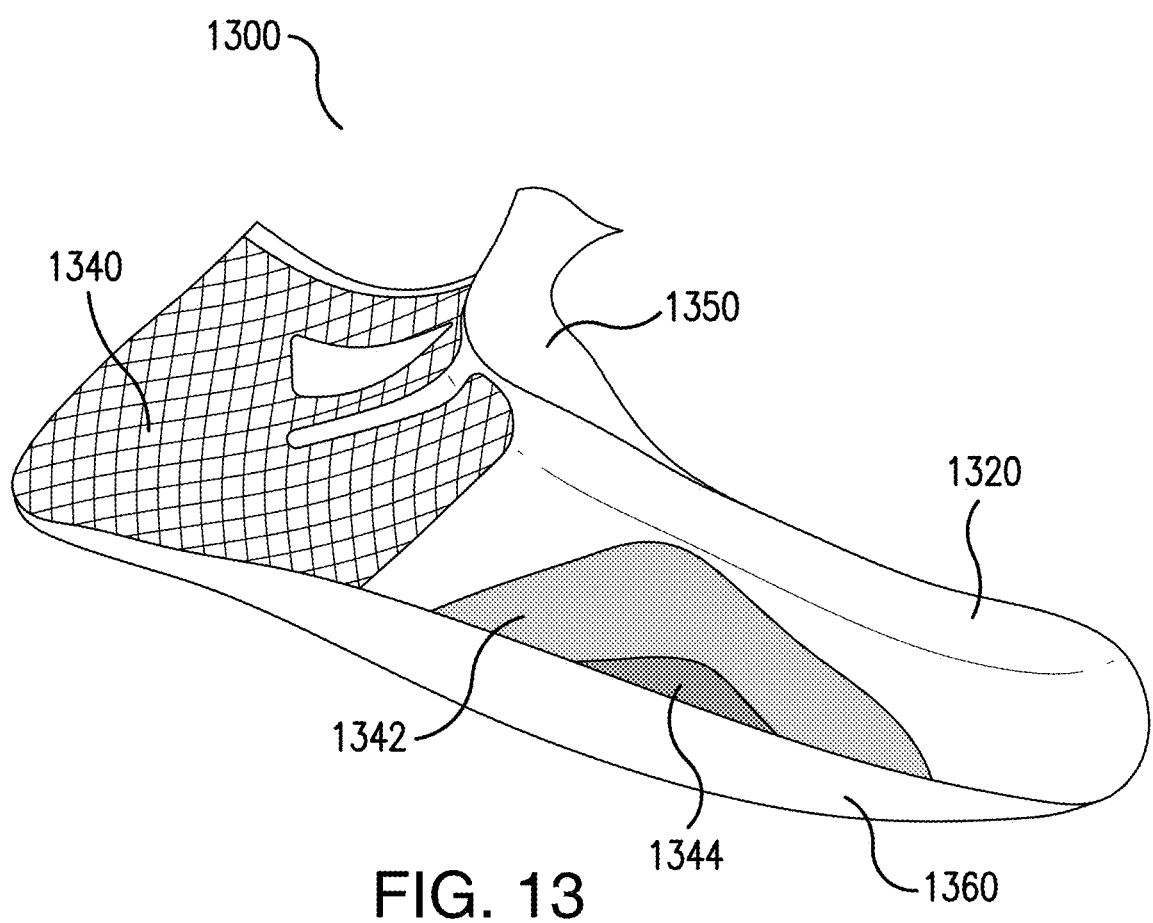

FIG. 13 is a side view of an upper according to an embodiment.

Figure 14:
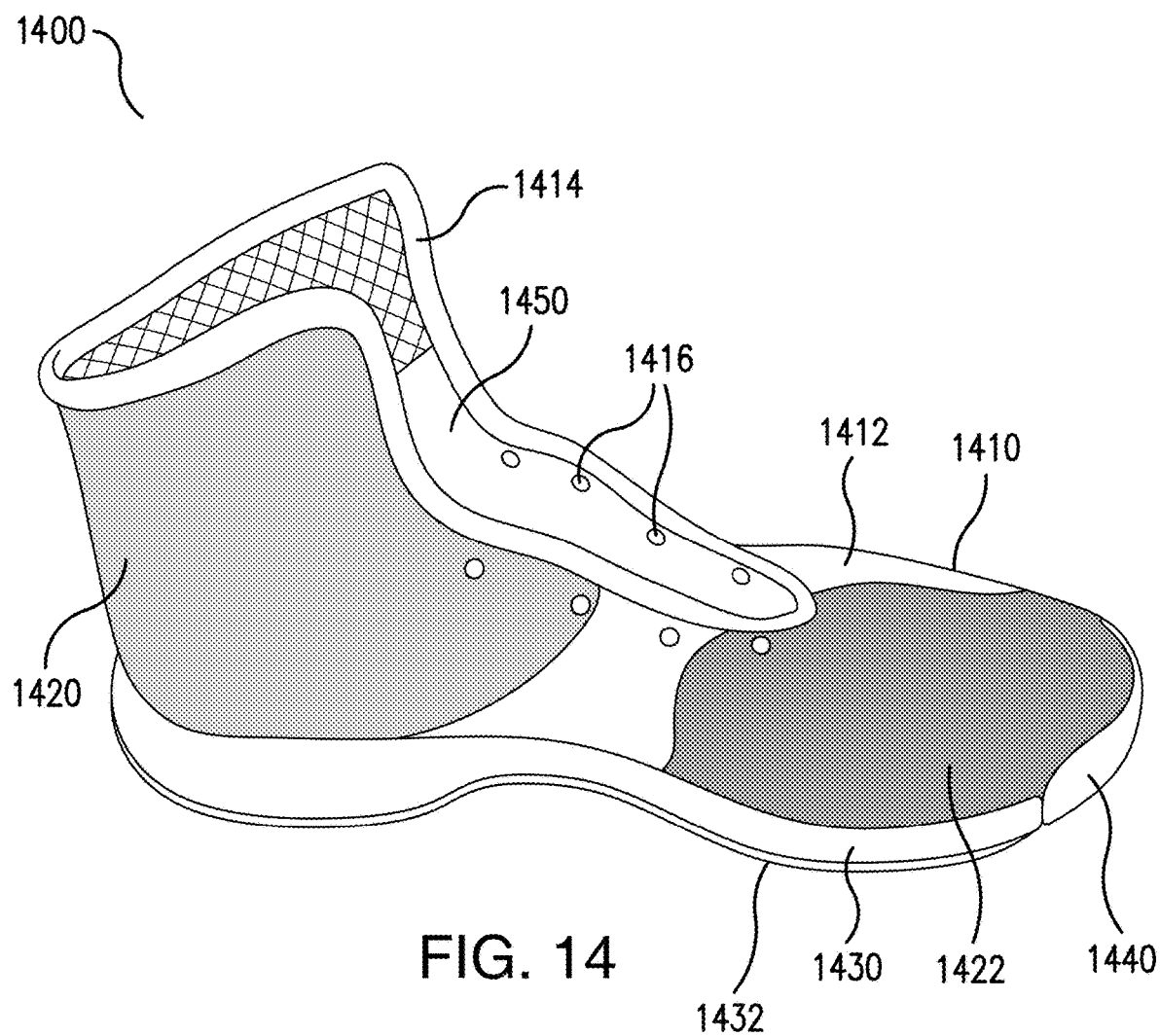

FIG. 14 is a perspective view of an article of footwear according to an embodiment.

Figure 15:
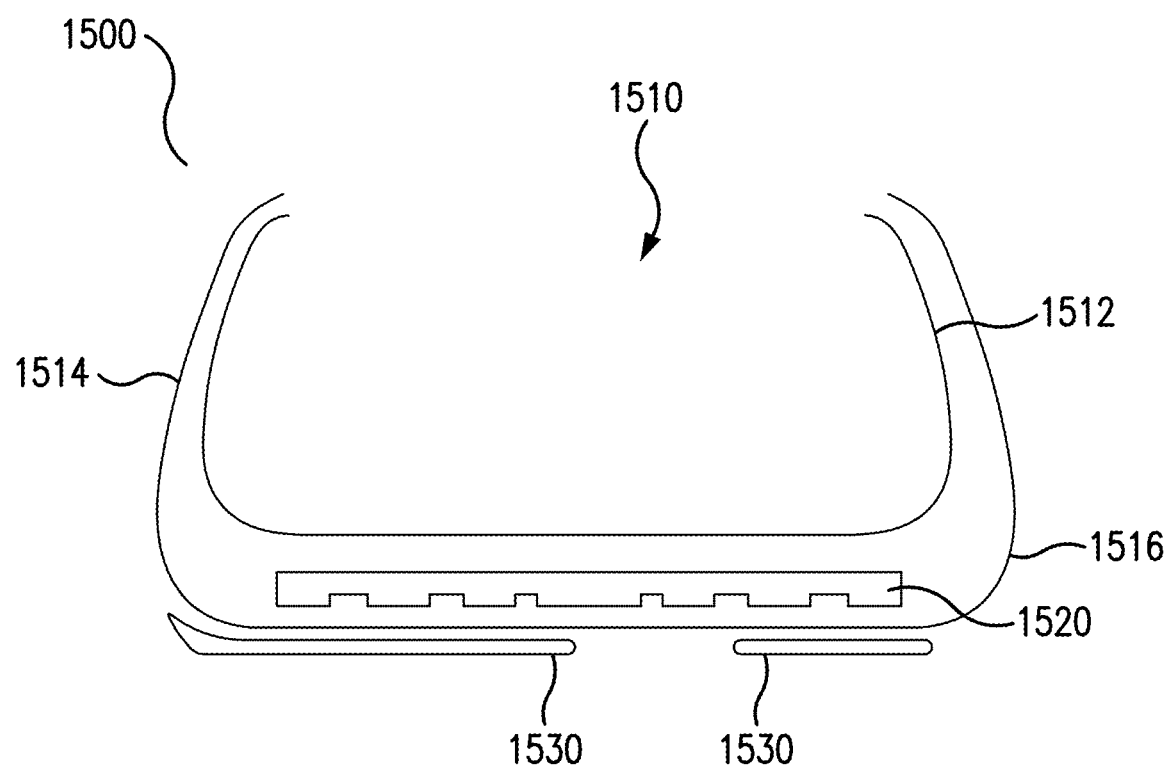

FIG. 15 is an exploded cross-sectional view of an article of footwear according to an embodiment.

Figure 16:
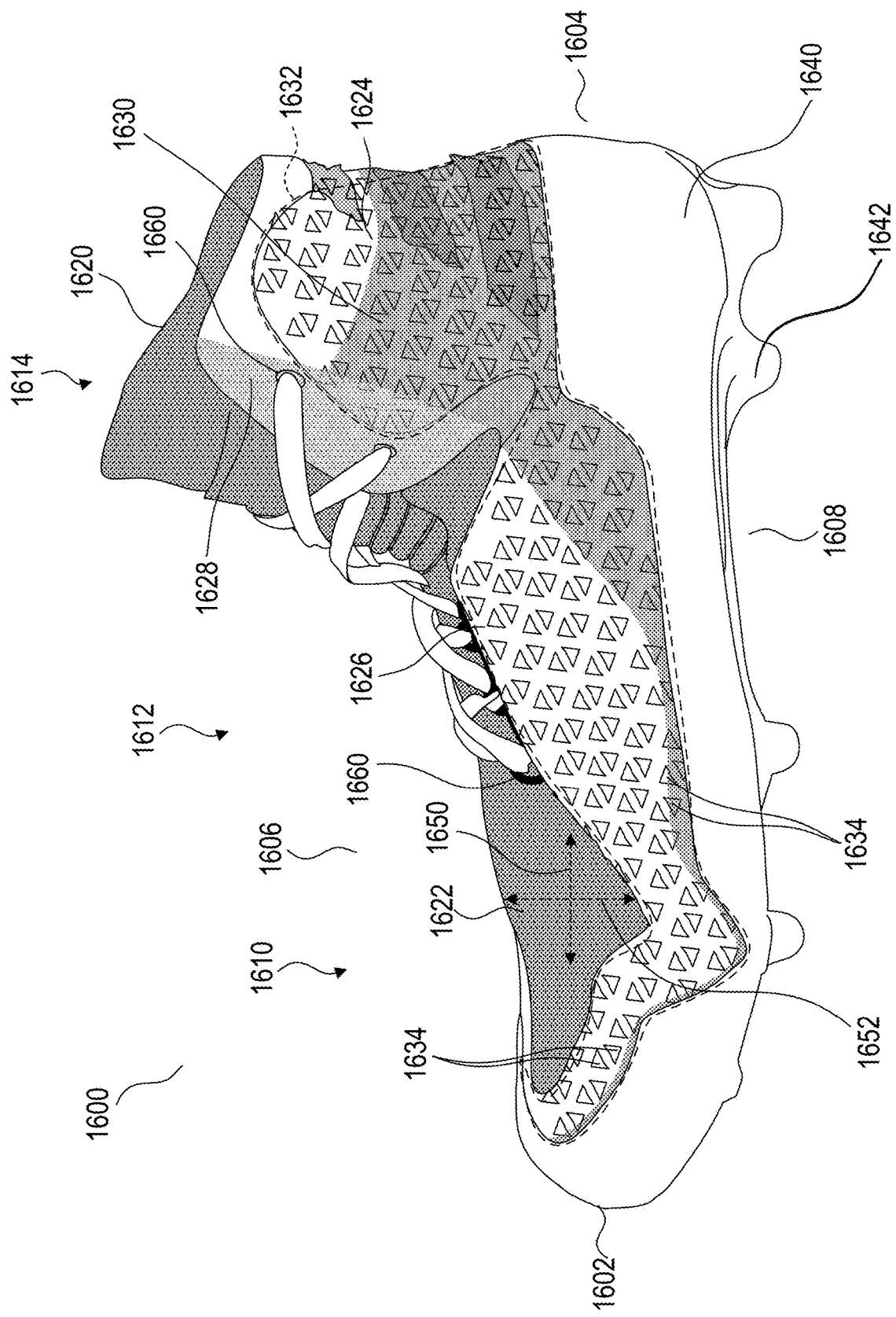

FIG. 16 is a side view of an article of footwear according to an embodiment.

Figure 17:
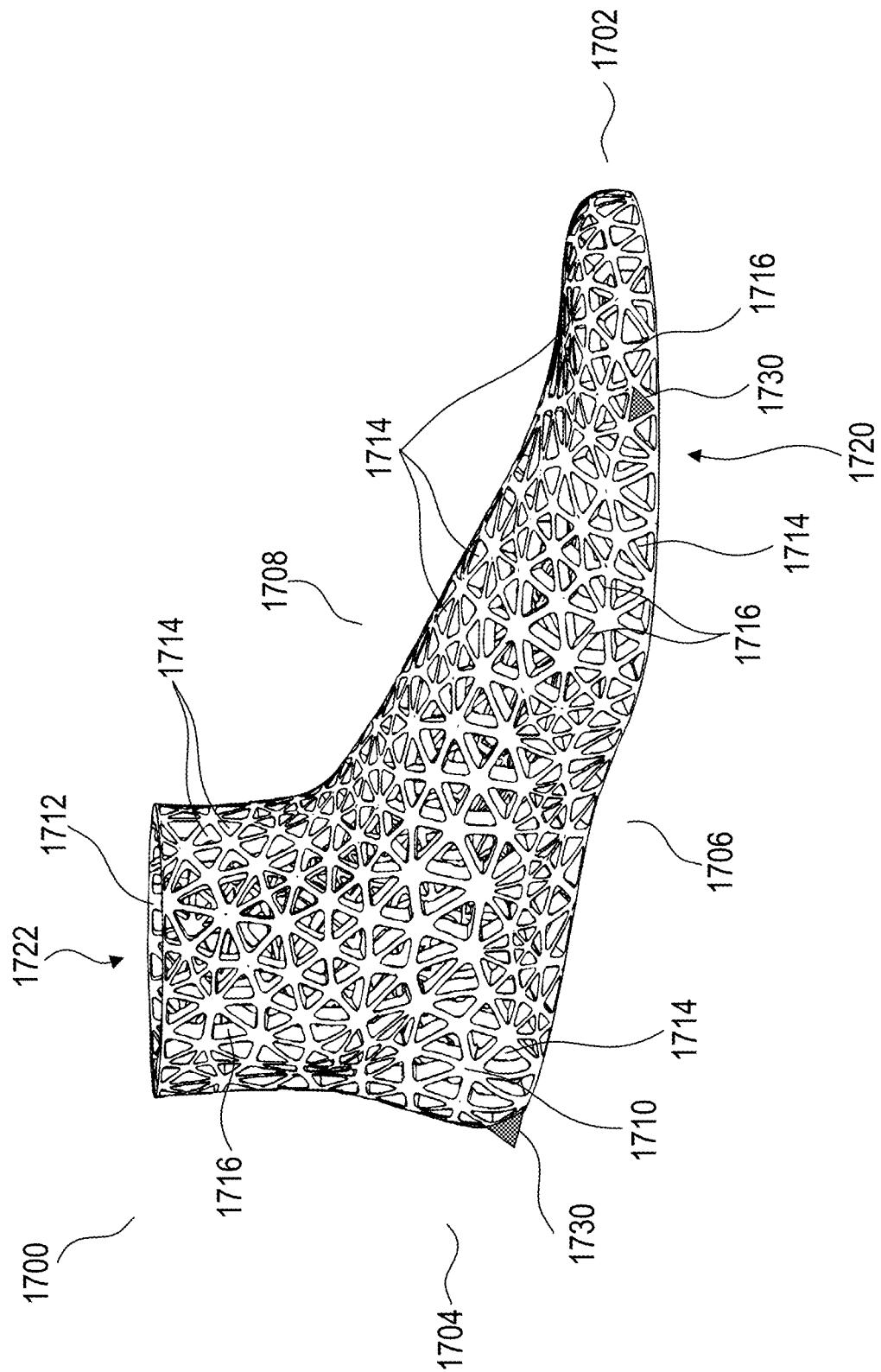

FIG. 17 is a side perspective view of a mold insert according to an embodiment.

Figure 18:
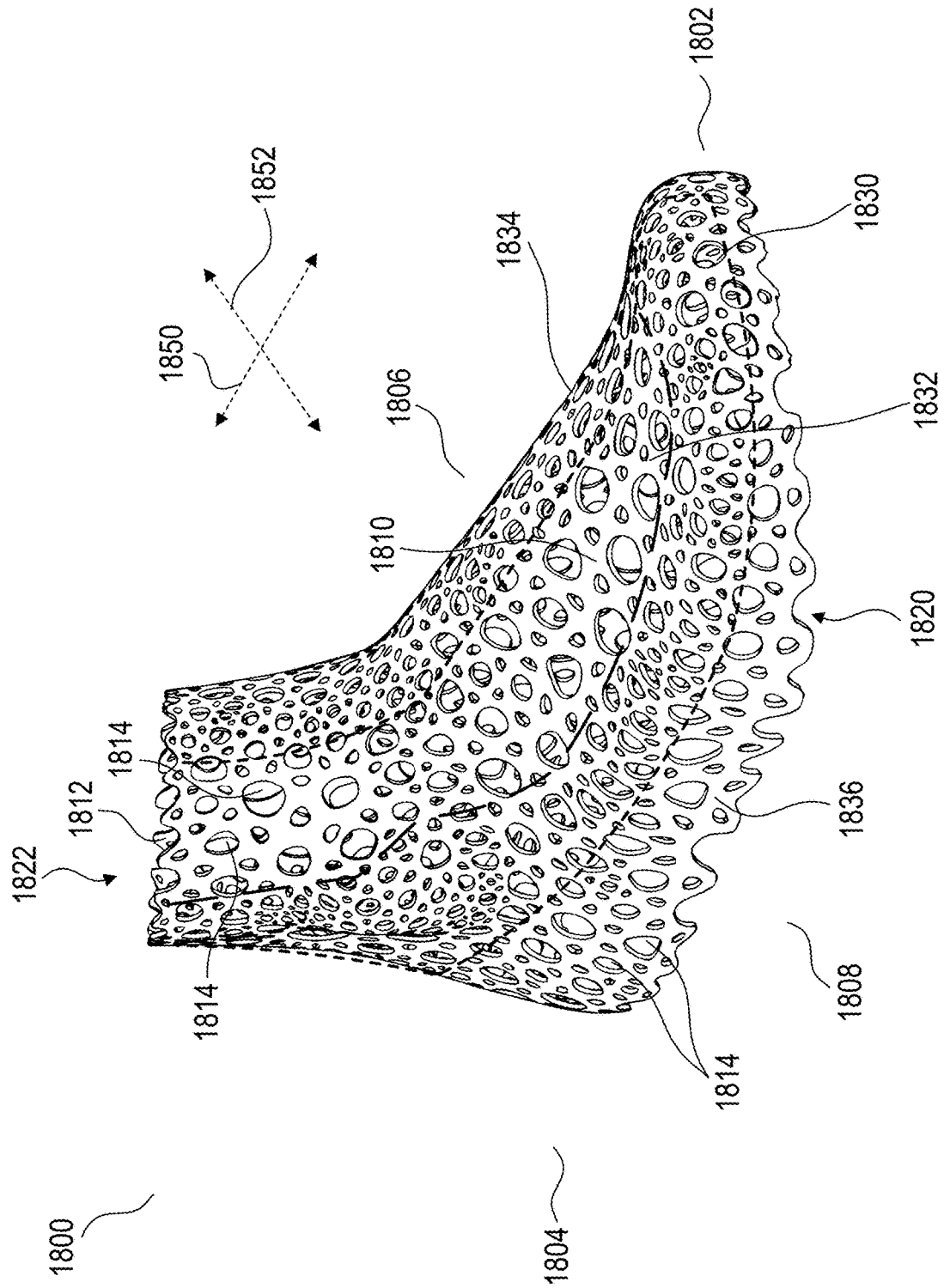

FIG. 18 is a front perspective view of a mold insert according to an embodiment.

Figure 19:
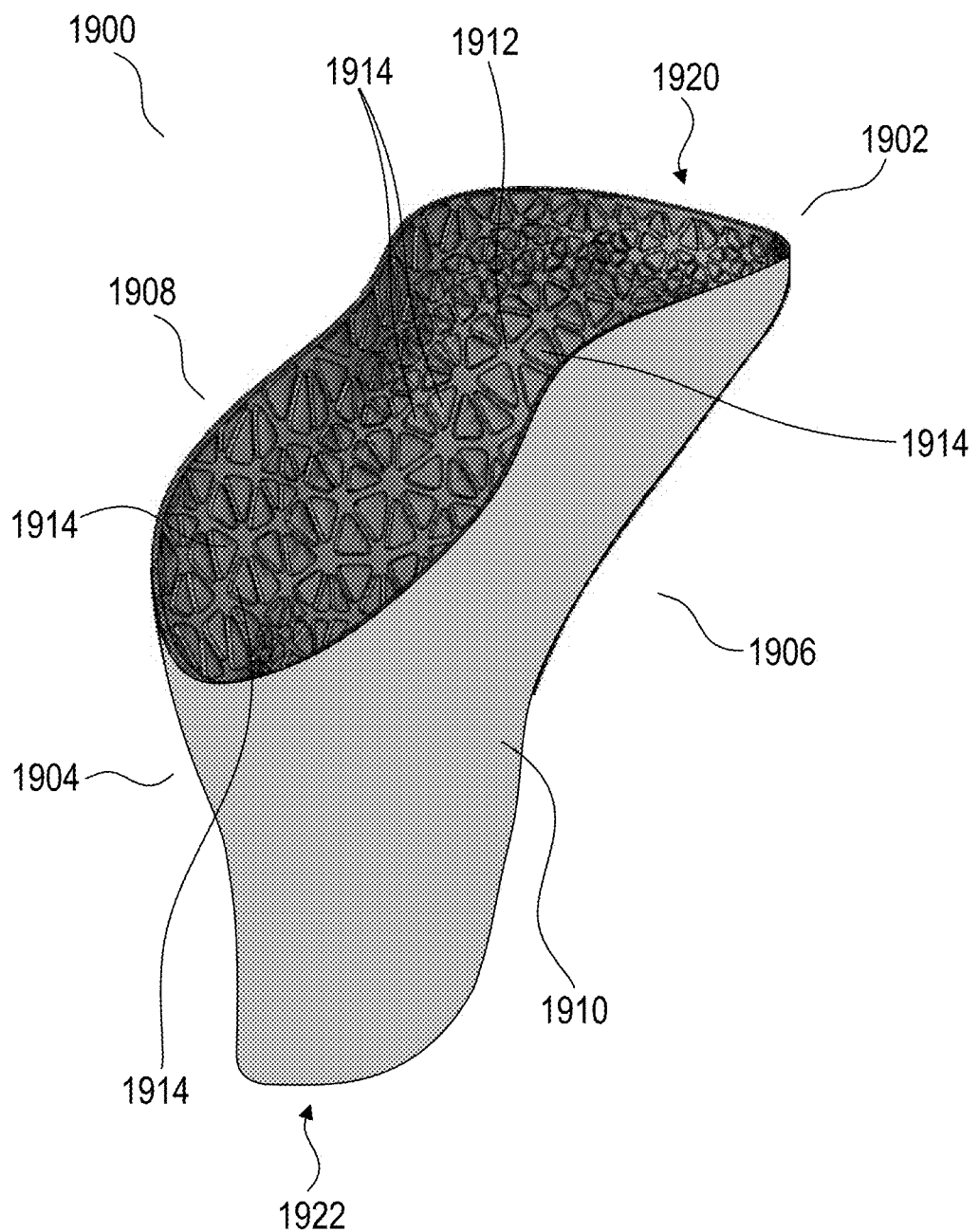

FIG. 19 is a bottom perspective view of a mold insert according to an embodiment.

Figure 20:
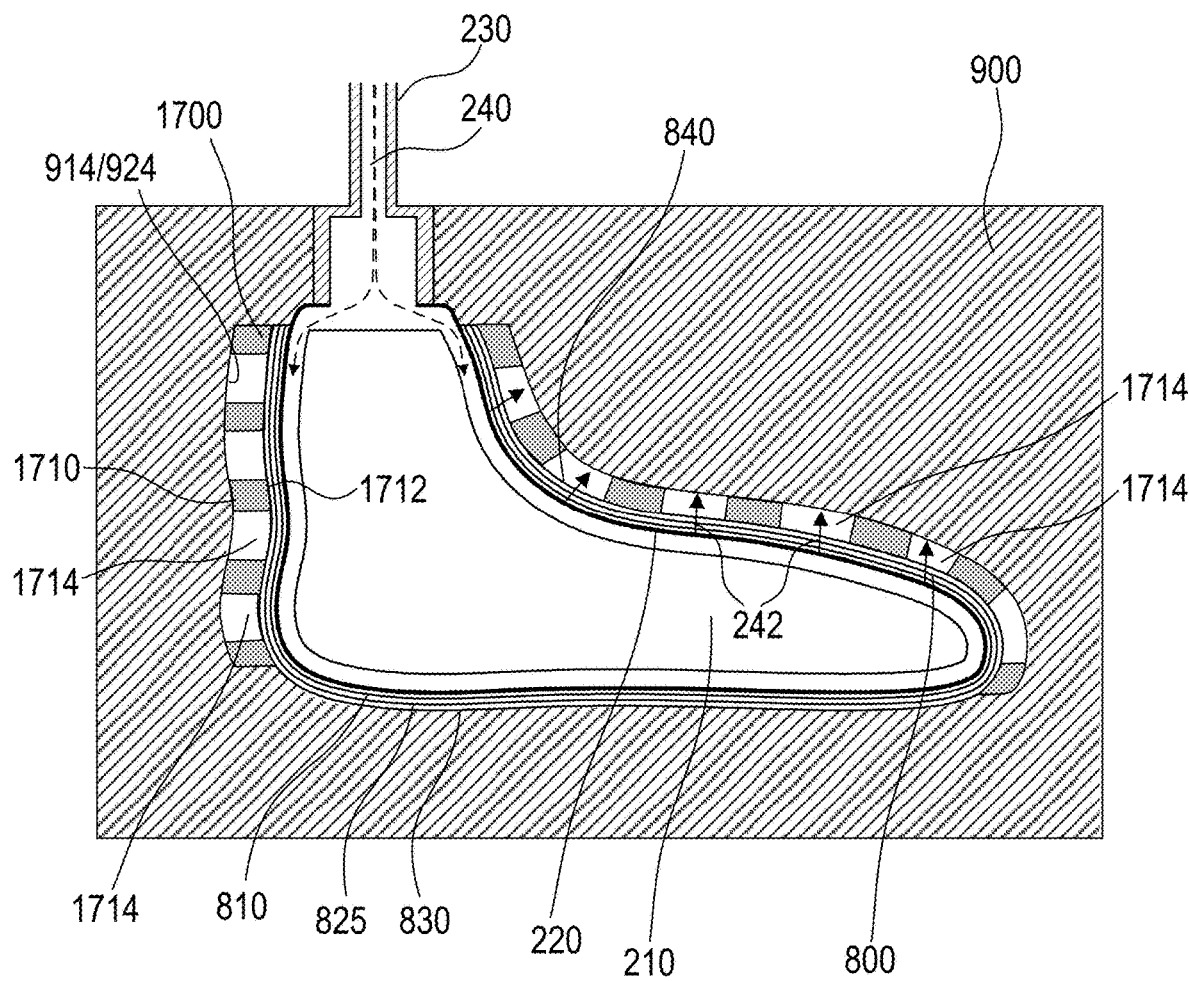

FIG. 20 is a cross-sectional view of a mold assembly according to an embodiment.

FIG. 21 is a multi-piece mold insert according to an embodiment.

Figure 22:
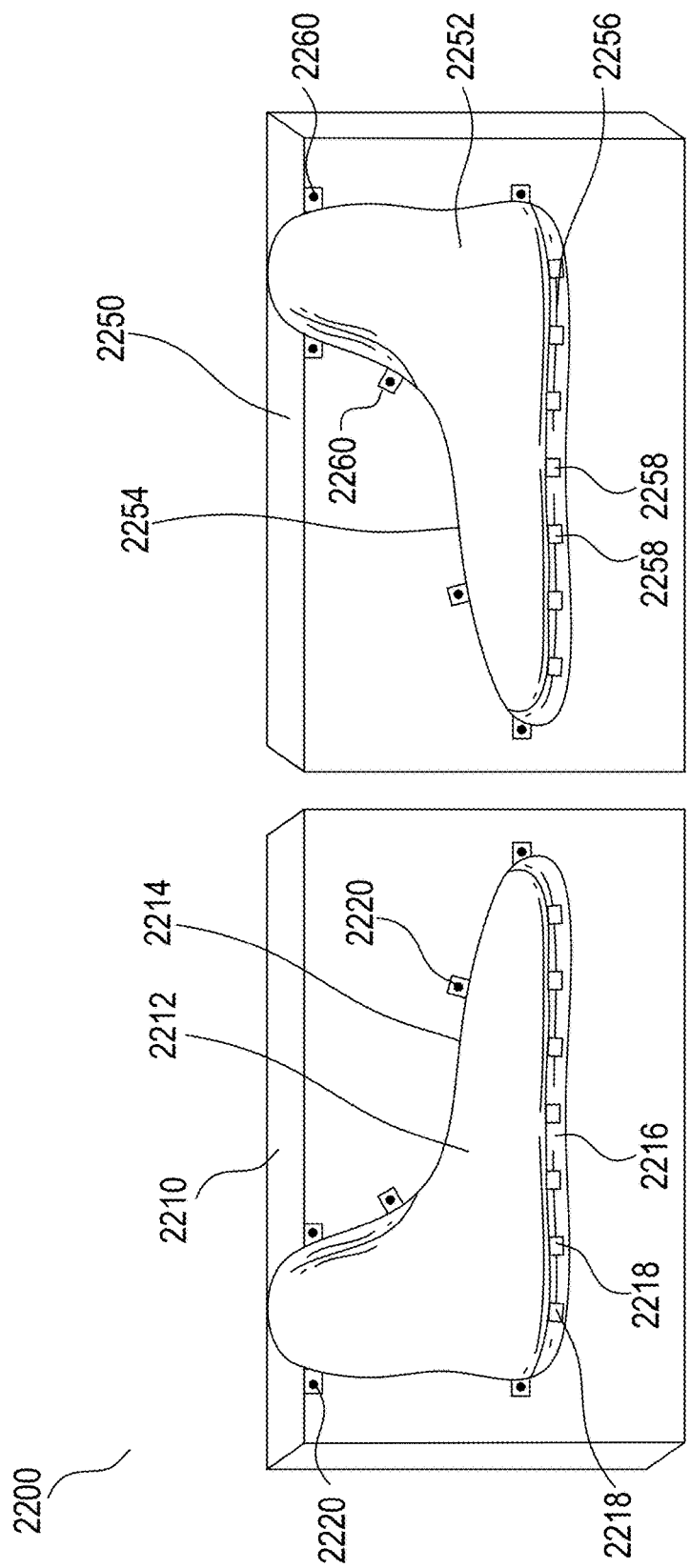

FIG. 22 is a mold according to an embodiment.

FIG. 23 is a mold according to an embodiment.

Figure 24A:
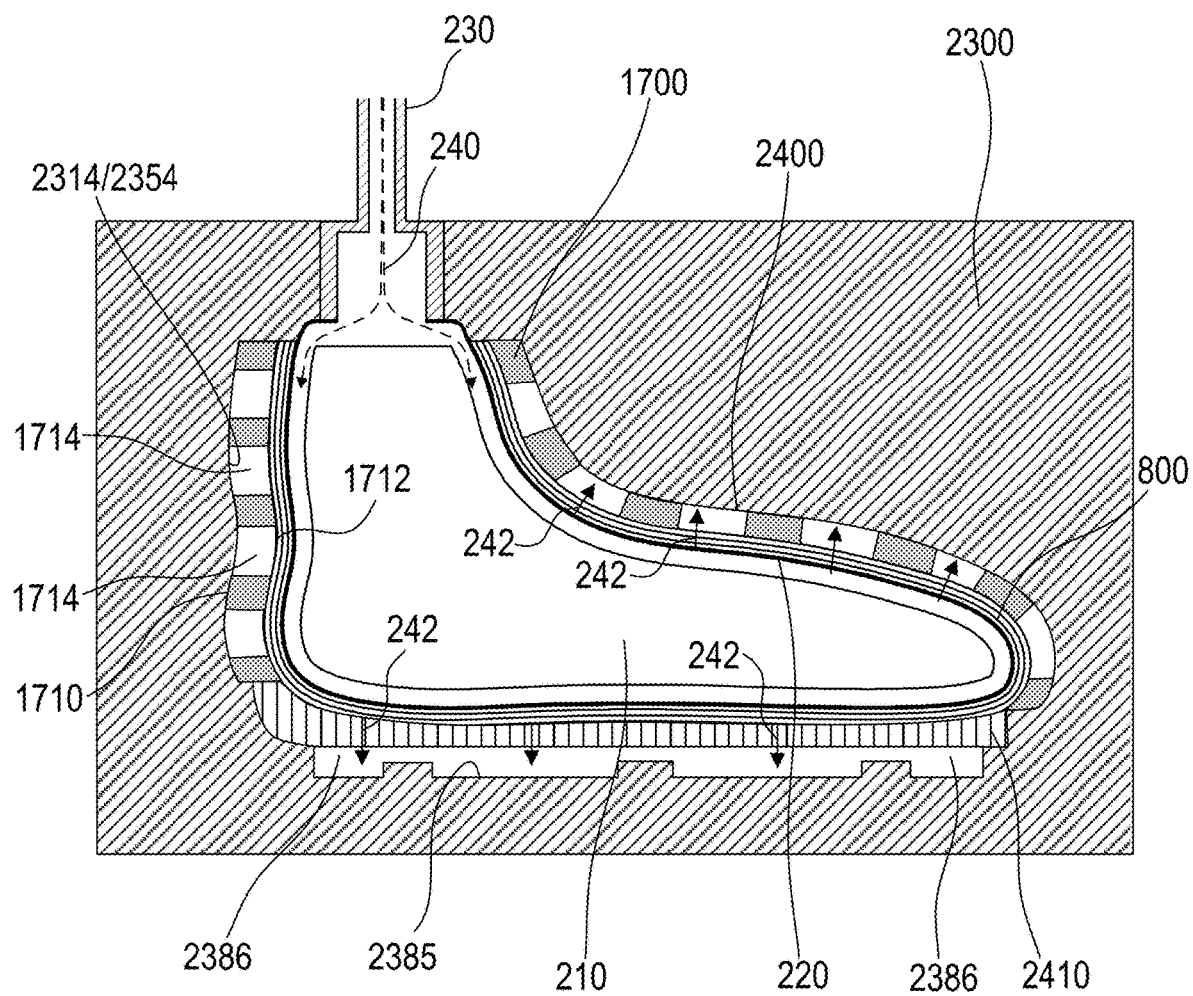

FIG. 24A is a cross-sectional view of a mold assembly according to an embodiment.

Figure 24B:
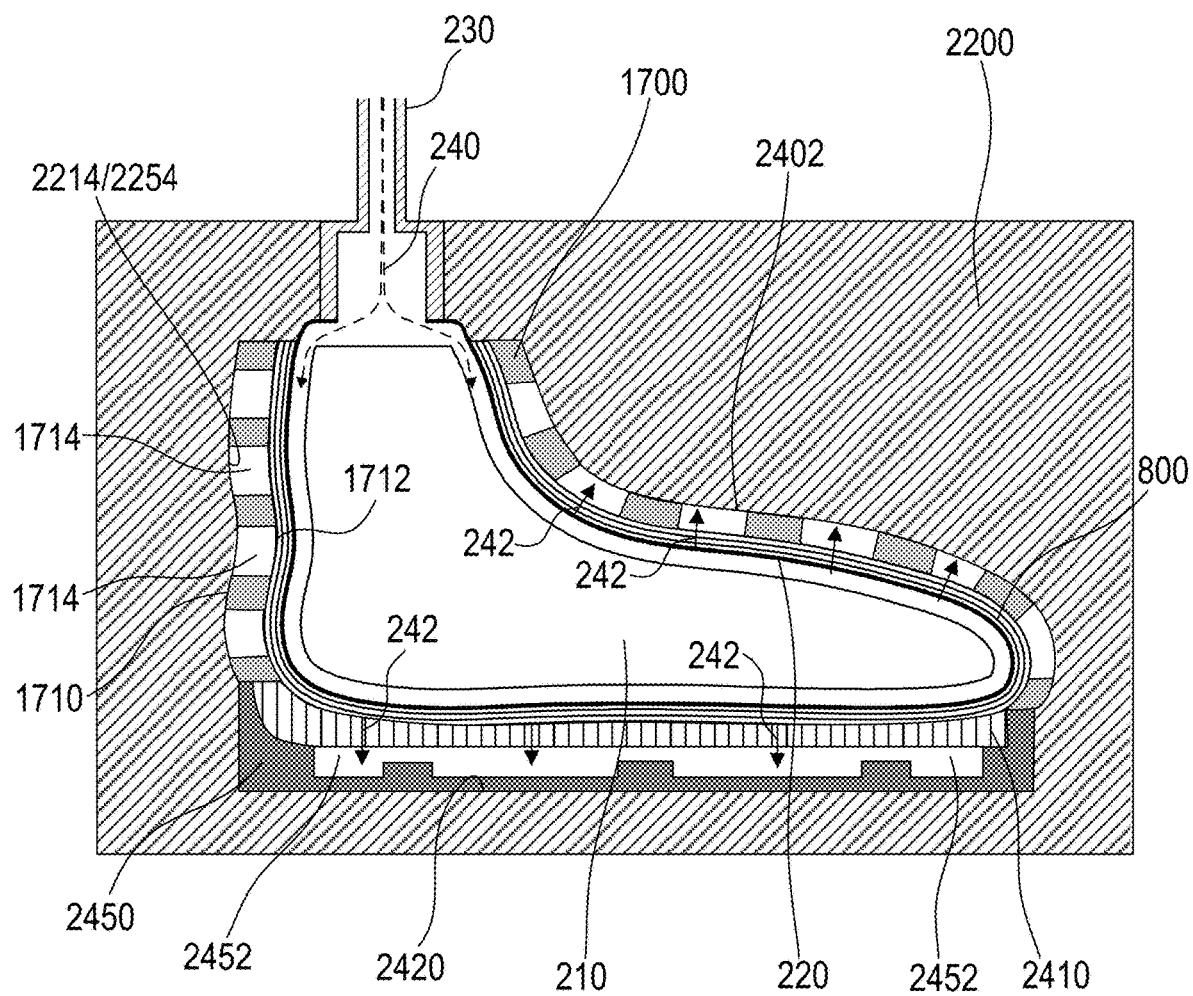
Figure 25:
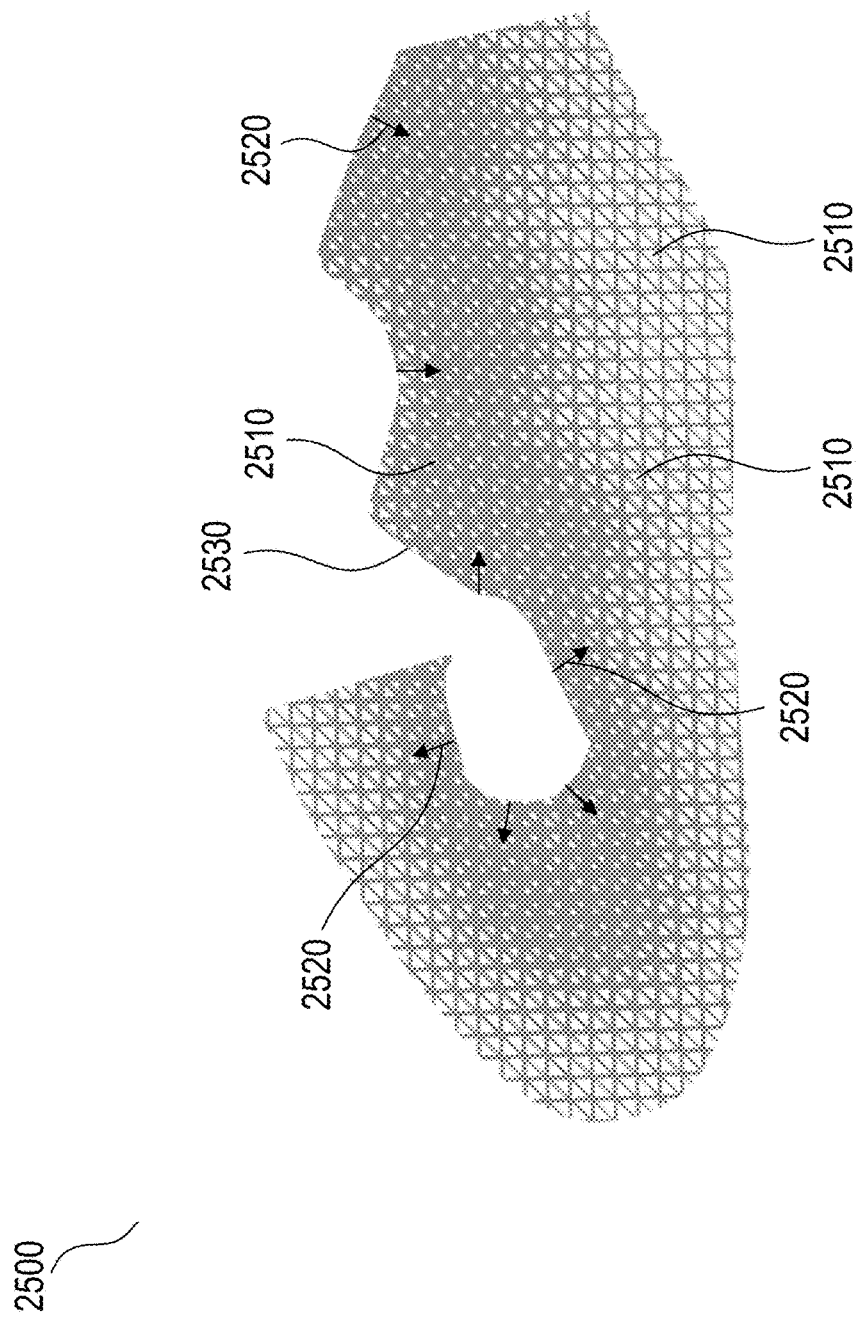

FIG. 24B is a cross-sectional view of a mold assembly with a sole mold insert according to an embodiment FIG. 25 shows an exemplary mold pattern for a mold insert according to an embodiment.

Figure 26:
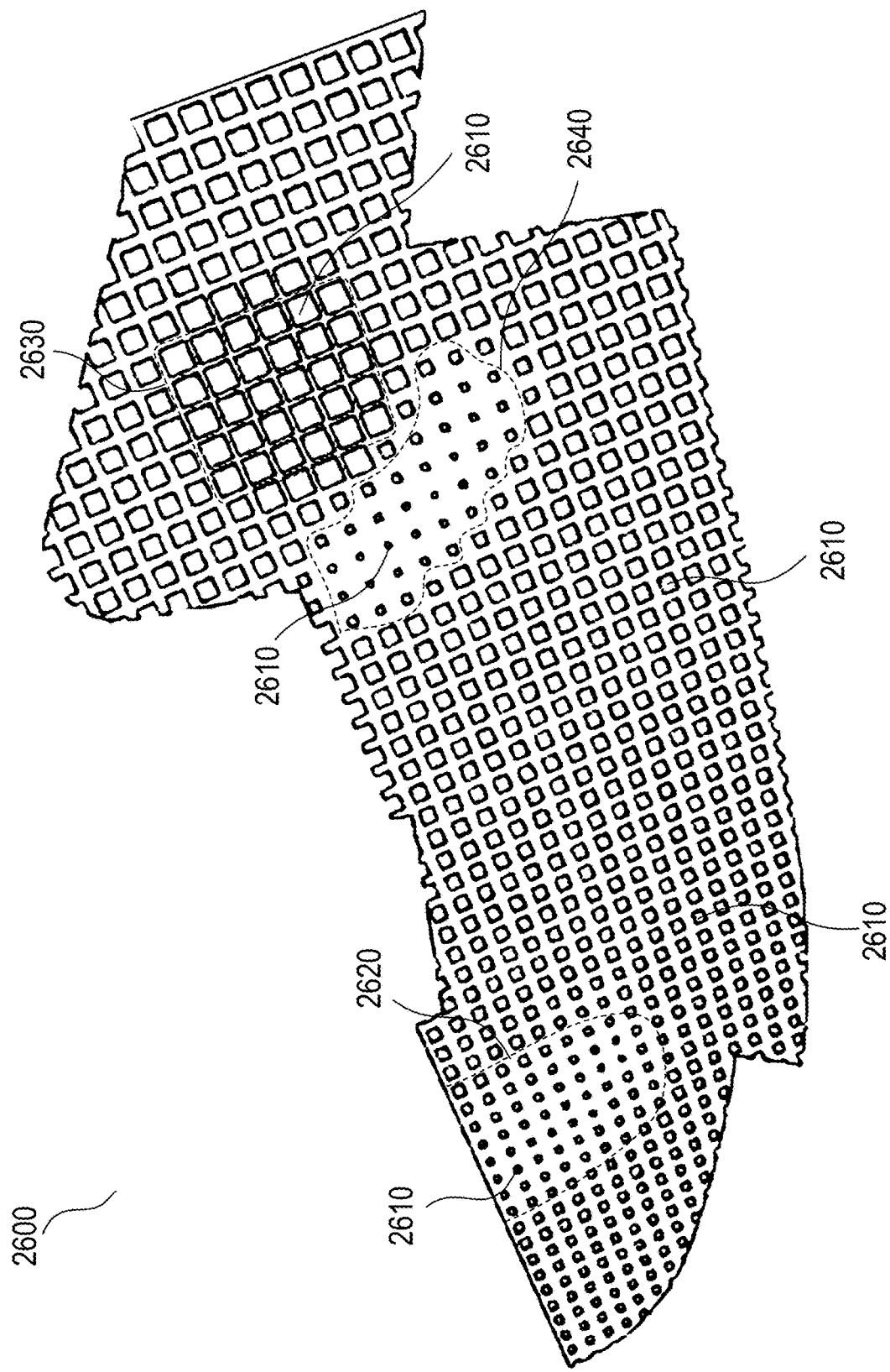

FIG. 26 shows an exemplary mold pattern for a mold insert according to an embodiment.

Figure 27:
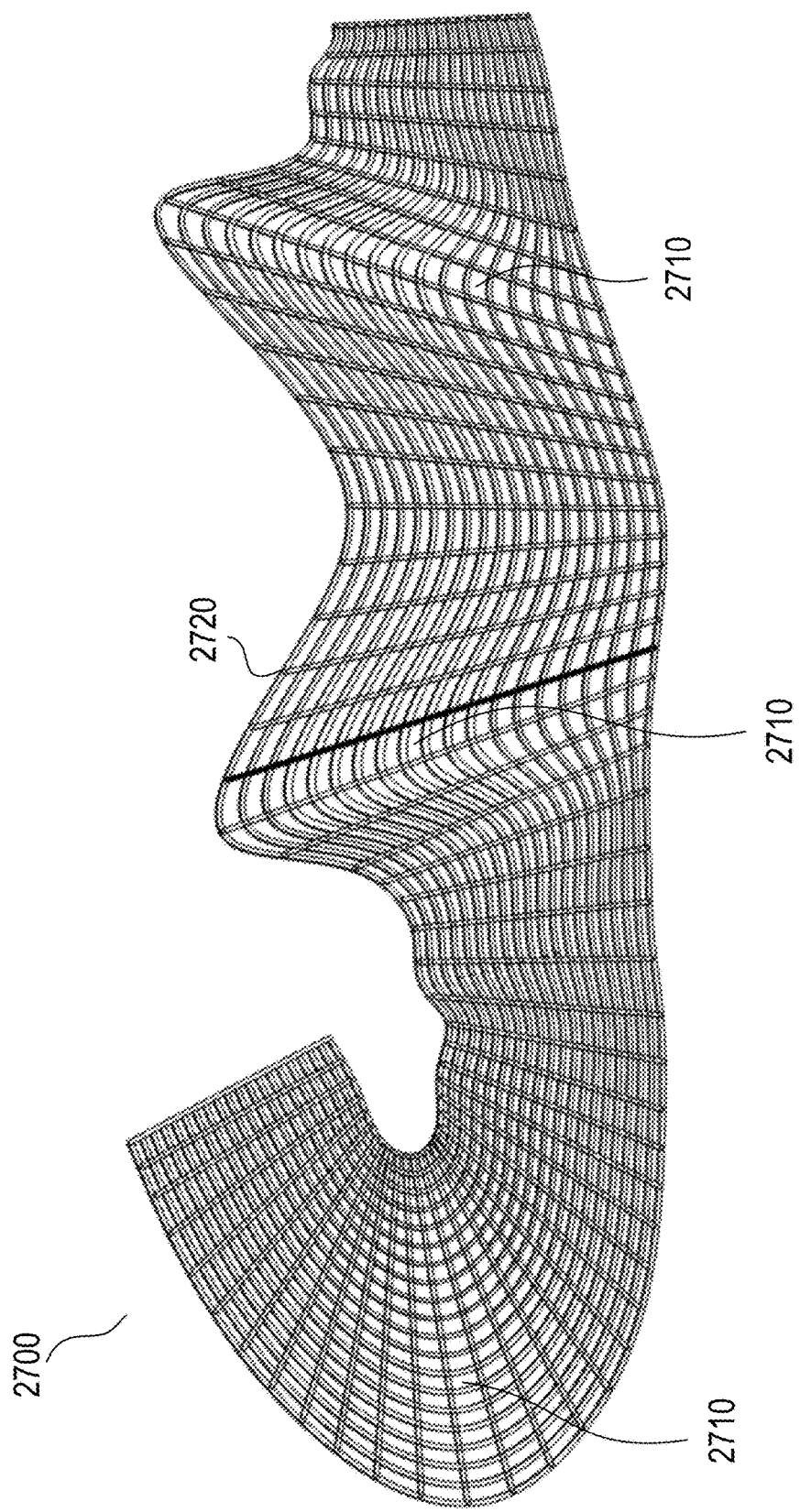

FIG. 27 shows an exemplary mold pattern for a mold insert according to an embodiment.

FIG. 28 is a multi-piece mold insert according to an embodiment.

Figure 29:
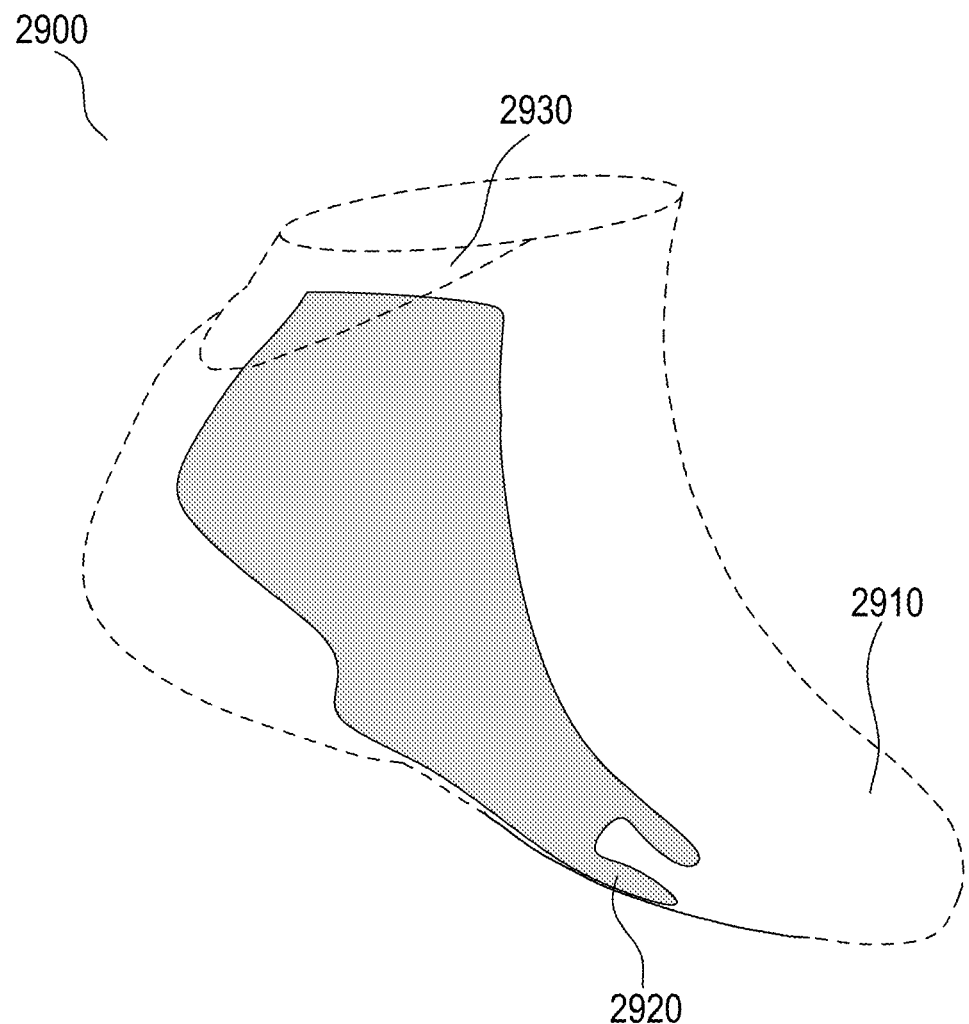

FIG. 29 is an upper according to an embodiment.

Figure 30:
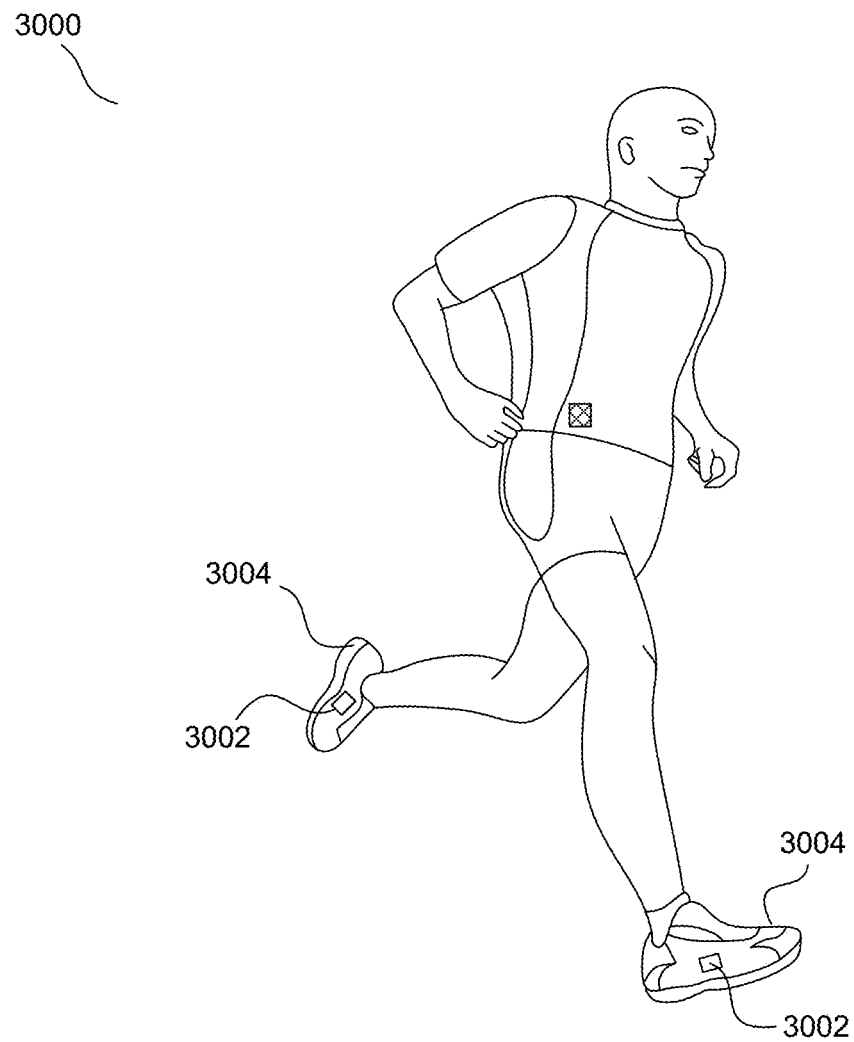

FIG. 30 is an illustration of an individual with sensor modules coupled to articles of footwear according to an embodiment.

DETAILED DESCRIPTION OF THE INVENTION

The present invention(s) will now be described in detail with reference to embodiments thereof as illustrated in the accompanying drawings. References to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

An article of footwear has many purposes. Among other things, an article of footwear may serve to provide cushioning for a wearer's foot, support a wearer's foot, and protect a wearer's foot. Each of these purposes, alone or in combination, provides for a comfortable article of footwear suitable for use in a variety of scenarios (e.g., exercise and every day activities). The features of an article of footwear (e.g., shape and materials used to make footwear) may be altered to produce desired characteristics, for example, durability, support, weight, and/or breathability.

Durable footwear will properly function for an extended period of time and may instill a wearer's trust in specific manufacture's footwear, leading to repeat sales. Supportive footwear may protect an individual's feet from injury. For example, an article of footwear configured to provide ankle support may be prevent injury to an individual's ankle by inhibiting undue twisting of the ankle. Lightweight footwear may be conformable for an individual, and for individuals competing in an athletic activity, such as running or biking, may provide a completive edge due to the decreased weight the individual carries on his or her feet. Breathable footwear may increase comfort for an individual by wicking sweat and heat away from an individual's foot. Designing footwear having a high degree of one or more of these characteristics without detrimentally affecting other characteristics of the footwear may be desirable.

Propulsion provided by an article of footwear may optimize the performance of a wearer's foot by, for example, maximizing the energy transfer from the individual's foot to the surface his or her foot is in contact with (e.g., the ground), via the article of footwear. Maximizing the energy transfer between the individual's foot and a surface (i.e., reducing energy lost via and/or absorbed by an article of footwear) may help an athlete, for example, accelerate faster, maintain a higher maximum speed, change directions faster, and jump higher. Designing footwear having a high degree of propulsion without detrimentally affecting other characteristics of the footwear may be desirable.

An article of footwear, or a portion thereof (e.g., an upper), may be configured to provide various degrees of durability, support, weight, breathability, etc. But the cost of manufacturing the article of footwear may also be a consideration. Footwear, or a portion thereof, that may be manufactured at a relatively low cost may be desirable for manufactures and consumers. Footwear that can be manufactured using a relatively small amount of resources (e.g., energy and man power), materials, and time reduces manufacturing costs and may also reduce the environmental impact of manufacturing.

Further, a manufacturing process that facilities the manufacture of customized footwear without increasing the complexity of the manufacturing process may be desirable. Customizing an article of footwear, or a portion thereof (e.g., an upper), for a particular individual or a group of individuals having similar foot anatomies (e.g., foot size and shape) may provide proper support and increased comfort for an individual. Also, it may allow an individual to order/buy articles of footwear customized to his or her needs. Moreover, it may allow the individual to order/buy new and/or replacement articles of footwear customized to his or her needs when desired.

In some embodiments, the article of footwear discussed herein may include an upper manufactured using a three-dimensional thermo-molding process. In some embodiments, the upper may be composed of one or more low melting point thermoplastic polymers. In some embodiments, the upper may be composed of a plurality of layers, each layer composed of one or more low melting point thermoplastic polymers.

In some embodiments, the maximum processing temperature of the three-dimensional thermo-molding processes discussed herein may be less than the melting point of the low melting point thermoplastic polymers used to form the upper. In some embodiments, the maximum processing temperature of the three-dimensional thermo-molding process may be such that the process releases little to no volatile substances (e.g., vapors created by chemical reactions such as those created during curing of a polymer). In some embodiments, the thermo-molding process may not cause a change in the chemical composition of the low melting point thermoplastic polymers used to form the upper. The use of low processing temperatures may reduce manufacturing cost and may reduce environmental impact of a manufacturing process by reducing the release of volatile substances. Further, a manufacturing process that does not rely on the occurrence of chemical reactions may result in a manufacturing process that is easier to control and reproduce. In some embodiments, the processing temperature of the three-dimensional thermo-molding process may be such that the low melting point thermoplastic polymer of a layer of the upper (e.g., the base layer) is malleable but does not fuse to the material of another layer of the upper (e.g., the yarns of a grid layer).

In some embodiments, the maximum processing temperature of the three-dimensional thermo-molding processes discussed herein may be greater than the softening point temperature of the low melting point thermoplastic polymers used to form the upper. The softening point temperature of a polymer may be measured using a Vicat softening point test. The use of such a temperature may allow different polymers and/or layers of polymers to bond (e.g., fuse) together during thermo-molding. Further, it may allow the different polymers and/or layers of polymers to take on the shape of a mold cavity used to form an upper.

In some embodiments, the maximum processing temperature of the three-dimensional thermo-molding processes discussed herein may be 180 degrees C. or less. In some embodiments, the maximum processing temperature of the three-dimensional thermo-molding processes discussed herein may be in the range of 180 degrees C. to 80 degrees C. In some embodiments, the maximum processing temperature of the three-dimensional thermo-molding processes discussed herein may be 160 degrees C. or less. In some embodiments, the maximum processing temperature of the three-dimensional thermo-molding processes discussed herein may be in the range of 160 degrees C. to 65 degrees C.

In some embodiments, a mold insert may be employed to thermoform at least a portion of an upper having desired characteristics, such as but not limited to ventilation, breathability, thermal conductivity, stretchability, strength, propulsion, and aesthetic characteristics. In some embodiments, the mold insert may include surface features that impart desired characteristics during thermo-molding. In some embodiments, the surface features may be arranged in a gradient pattern configured to impart varying degrees of one or more characteristics to different areas of an upper.

In some embodiments, the surface features of a mold insert may include openings. In some embodiments, the openings may have various sizes, shapes, and/or densities configured to impart varying degrees of one or more characteristics to different areas of an upper. In some embodiments, the thickness of a mold insert in which openings are formed may be varied to impart varying degrees of one or more characteristics to different areas of an upper. In some embodiments, the surface features of a mold insert may include cavities formed on a surface of the mold insert. In some embodiments, the cavities may have various sizes, shapes, depths, and/or densities configured to impart varying degrees of one or more characteristics to different areas of an upper.

In some embodiments, a mold insert may be employed to control the amount of softening and/or melting of one or more low melting point thermoplastic polymers during thermo-molding. The size, shape, depth, and/or density of a mold insert's surface features may be tailored to control the amount of softening and/or melting of low melting point thermoplastic polymer(s) in different areas of an upper during thermo-molding. In some embodiments, the thickness of a mold insert may be tailored to control the amount of softening and/or melting of one or more low melting point thermoplastic polymers during thermo-molding. In some embodiments, the thickness of a mold insert may be varied to control the amount of softening and/or melting of a thermoplastic polymer. By controlling the amount of softening and/or melting of a thermoplastic polymer during thermoforming, the resulting characteristics (e.g., ventilation, breathability, thermal conductivity, stretchability, strength, propulsion, and/or aesthetic characteristics) of an upper can be tailored to create an upper having desired characteristics.

In some embodiments, a mold insert may be releasably attached to a mold. In such embodiments, mold inserts may be exchanged to manufacture footwear having different characteristics. In some embodiments, mold inserts may be exchanged to manufacture different types of footwear (e.g., cleats, running shoes, casual shoes, etc.) In some embodiments, mold inserts may be exchanged to manufacture the same type of footwear, but for different individuals, or groups of individuals. For example, a first mold insert may include surface features tailored to create an upper that provides a high degree strength and support for a wearer's ankle and a second mold insert may include surface features tailored to create an upper with a high degree of overall stretchability for comfort. In some embodiments, mold inserts may be exchanged to manufacture footwear having different aesthetic characteristics. For example, a first mold insert may include surface features tailored to create a first aesthetic pattern on an upper and a second mold insert may include surface features tailored to create a second aesthetic pattern on an upper. The releasable attachment of mold inserts and a mold may facilitate the manufacture of customized footwear without increasing the complexity of the manufacturing process.

Figure 1:
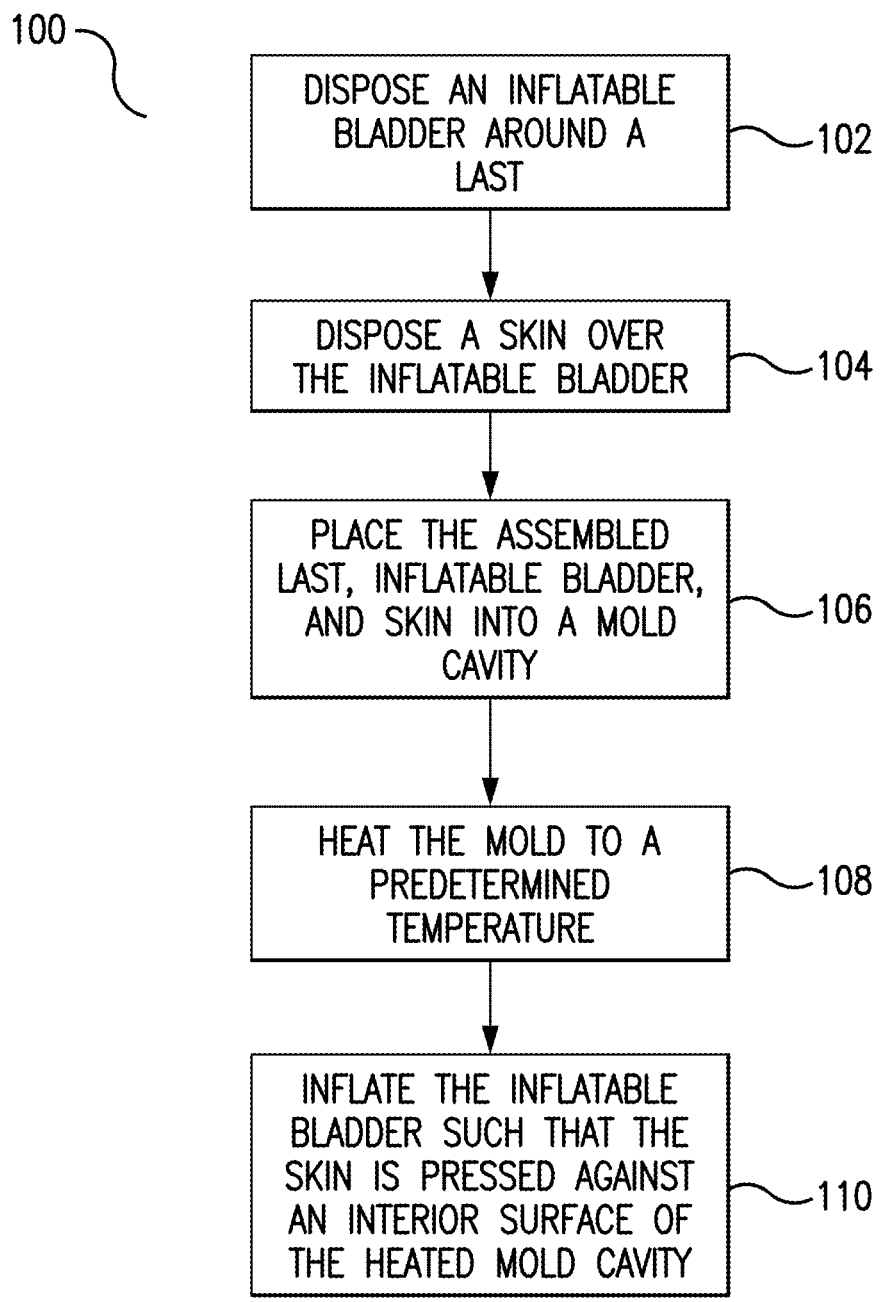
FIG. 1 is an exemplary flowchart of a method according to an embodiment.

FIG. 1 shows an exemplary flowchart of a method 100 of thermo-forming an upper for an article of footwear according to an embodiment. In step 102, an inflatable bladder (e.g., inflatable bladder 220) may be disposed around a last (e.g., last 210) having a shape similar to that of a human foot (see e.g., FIGS. 2 and 3). The inflatable bladder may be made of a deformable material such as, but not limited to, rubber, silicone, and silicone room temperature vulcanization (RTV silicone). In some embodiments, the inflatable bladder may be made of an elastomeric material.

Figure 8A:
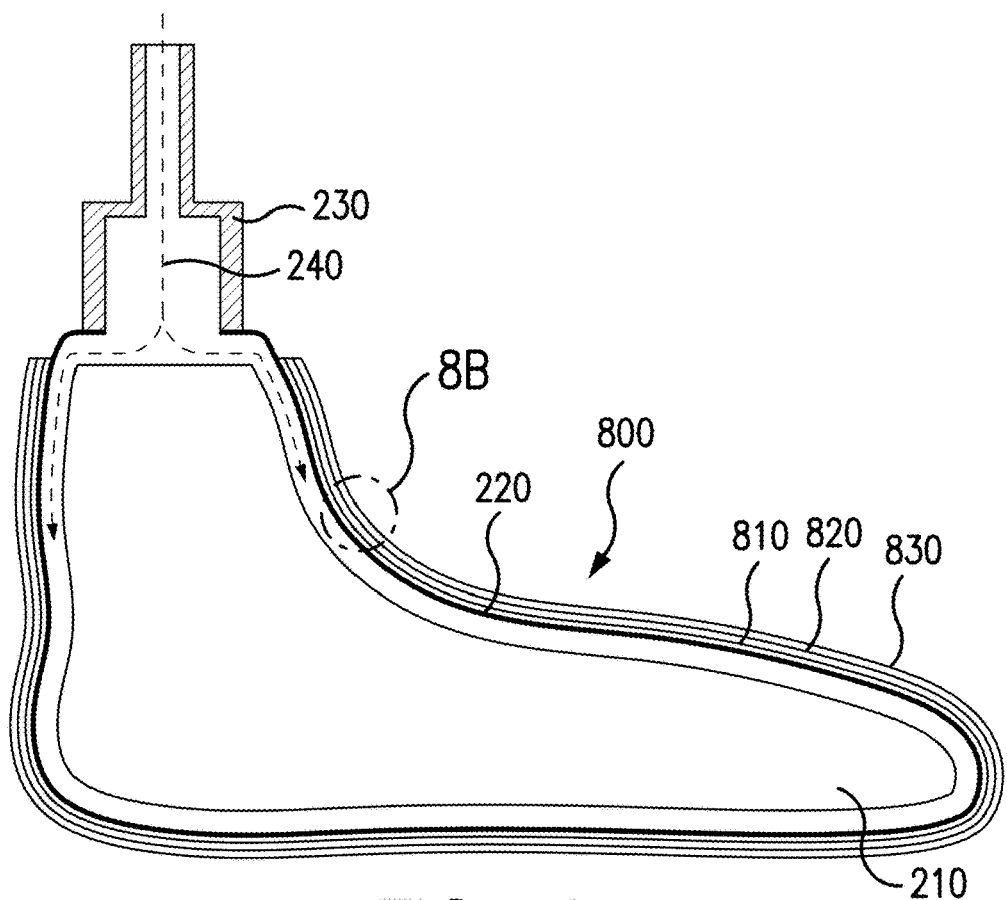
FIG. 8A is a cross-sectional view of various layers of a skin disposed over an inflatable bladder assembly according to an embodiment.

After disposing an inflatable bladder around a last in step 102, a skin (e.g., skin 800) may be disposed over the inflatable bladder, thereby forming an assembled last, inflatable bladder, and skin in step 104 (see e.g., FIG. 8A). The skin may define at least a portion of an upper for an article footwear after thermo-forming. In some embodiments, the skin may include one or more layers, where at least one of the layers includes a low melting point thermoplastic polymer. In some embodiments, each layer of the skin may include a low melting point thermoplastic polymer. For example, in some embodiments, the skin may include a base layer composed of one or more low melting point thermoplastic polymers and a grid layer including a yarn composed of one or more a low melting point thermoplastic polymers. In some embodiments, the skin may include layers composed of only low melting point thermoplastic polymers.

As used herein, "disposed over" means that a second layer/material is deposited, formed, or placed over a first layer/material. The contact between the second layer/material and the first layer/material may be indirect (i.e., there may be other layers between the first and second layers/materials), unless it is specified that the first layer/material is "in contact with," "deposited on," or the like with respect to the second layer/material. For example, a second layer/material may be described as "disposed over" a first layer/material, even though there are various layers/materials in between the first layer/material and the second layer/material. Furthermore, if a second layer/material is "disposed over" a first layer/material, the second layer/material is formed, deposited, or placed after the first layer/material (i.e., the first layer/material is present before the second layer/material is disposed over it).

As used herein, "low melting point thermoplastic polymer" means a thermoplastic polymer having a melting point of 200 degrees C. or less. Suitable low melting point thermoplastic polymers include, but are not limited to, low melting point polyesters, polyamides, polyethylene (PE), PE foams, polyurethane (PU) foams, and co-polymers or polymer blends including one or more these polymers.

As used herein, "high melting point thermoplastic polymer" means a thermoplastic polymer having a melting point of more than 200 degrees C. Suitable high melting point thermoplastic polymers include, but are not limited to, thermoplastic polyurethane (TPU), polyurethane foams, silicone, and nylon. In some embodiments, one or more layers of an upper may include a high melting point thermoplastic polymer. In some embodiments, the inclusion of a high melting point thermoplastic polymer may provide variable heating and/or partial forming of an upper. Variable heating and/or partial forming of different areas of an upper may provide different characteristics (e.g., breathability and/or thermal conductivity) to different areas of the upper.

Figure 9:
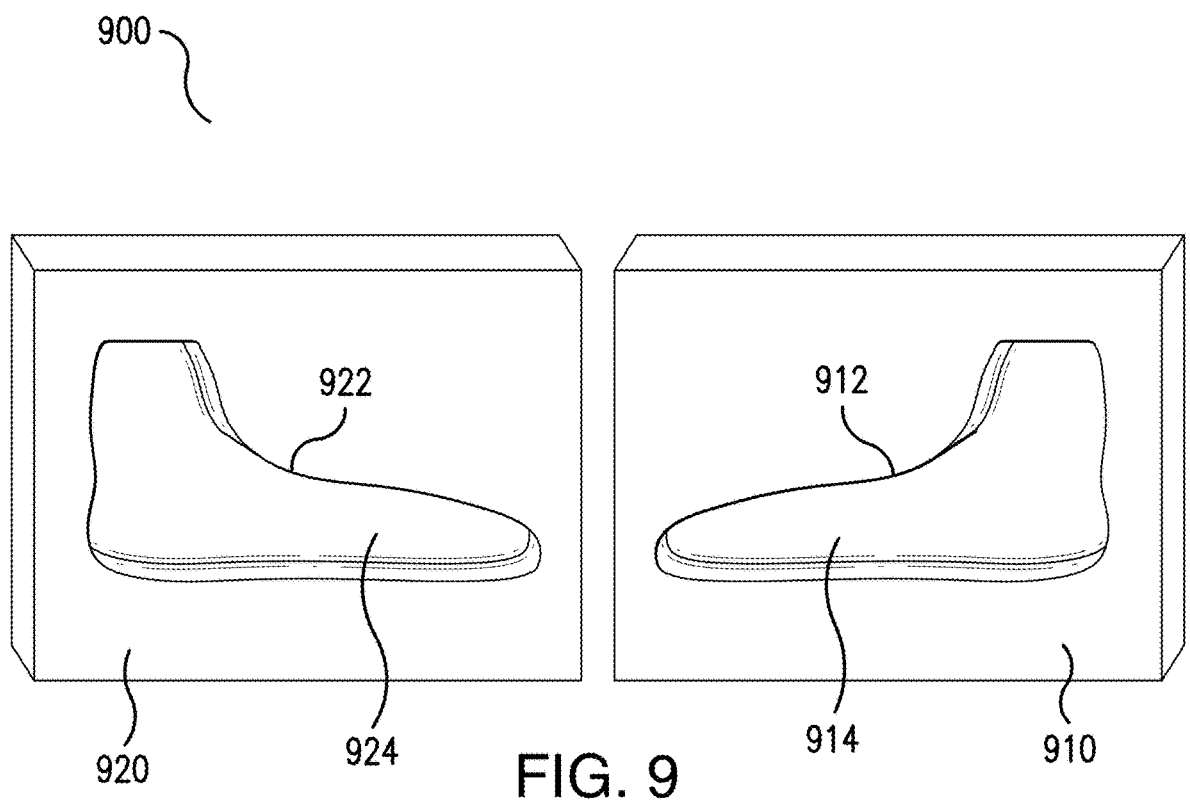
FIG. 9 is mold according to an embodiment.

In step 106, the assembled last, inflatable bladder, and skin may be placed within a cavity of a mold (e.g., mold 900 in FIG. 9). The cavity of the mold may include an interior shape corresponding to a desired shape for an upper. In step 108, the mold may be heated to a predetermined temperature. In step 110, the inflatable bladder may be inflated such that the skin is pressed against the interior surface of the heated mold cavity to cause the skin to take on the shape of the internal surface of the mold cavity onto which it is pressed, thereby forming an upper for an article of footwear. In this manner, the layers of the skin may be molded together, thereby forming a single integrally molded skin defining a forefoot portion, a midfoot portion, and a rearfoot portion of an upper. The skin may have a general shape corresponding to the shape of a human foot before it is pressed against the interior surface of the mold. After it is pressed against the interior surface of the mold, the skin may have a shape corresponding to an upper for a particular size of footwear (e.g., a particular length and width (size) and type of footwear (e.g., basketball shoe or football cleat)). After the skin takes on the shape of an upper, the upper may be removed from the mold and any excess material, if present, may be removed (e.g., by a cutting process).

Figure 2:
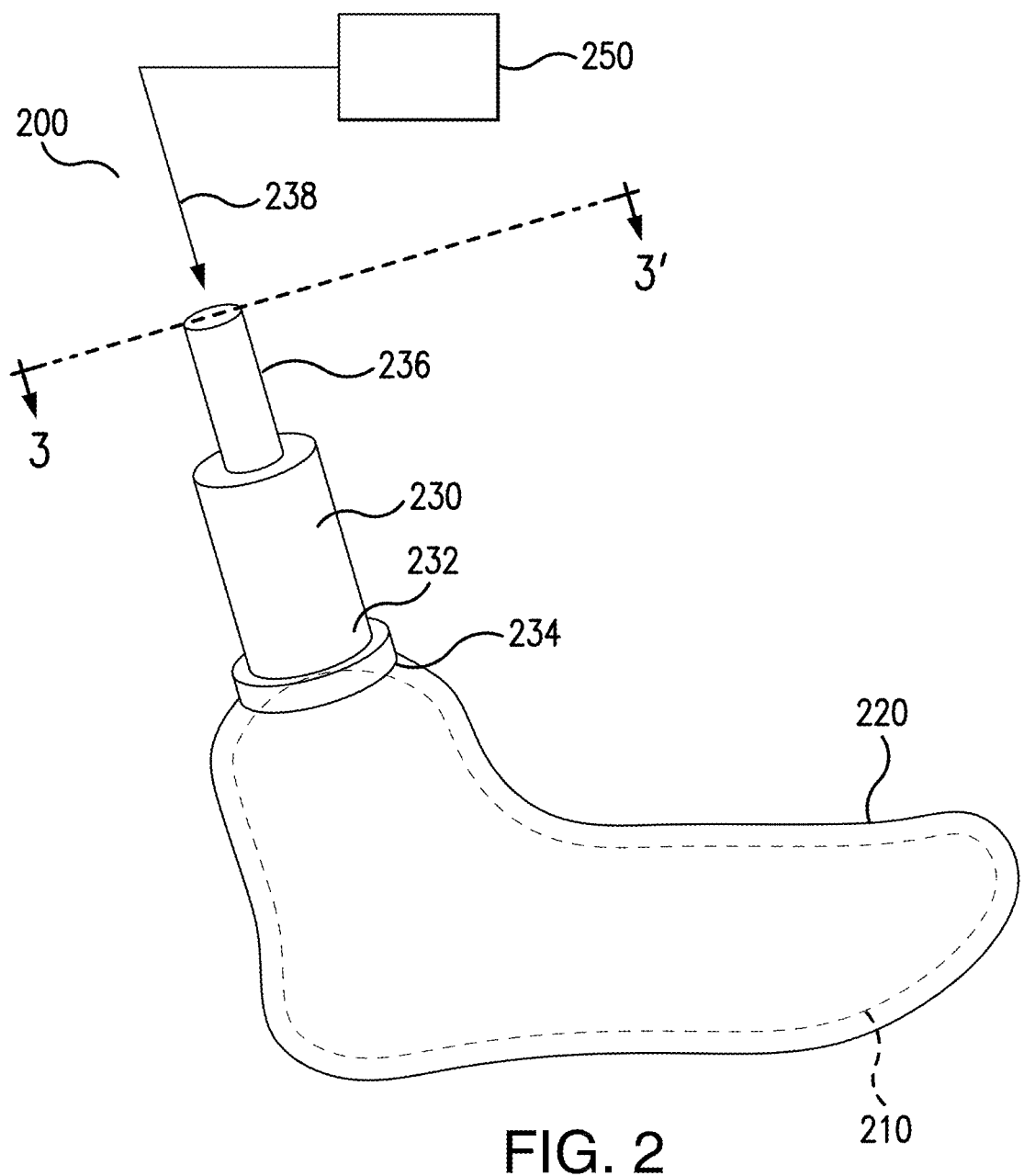
FIG. 2 is a perspective view of an inflatable bladder assembly according to an embodiment.
Figure 3:
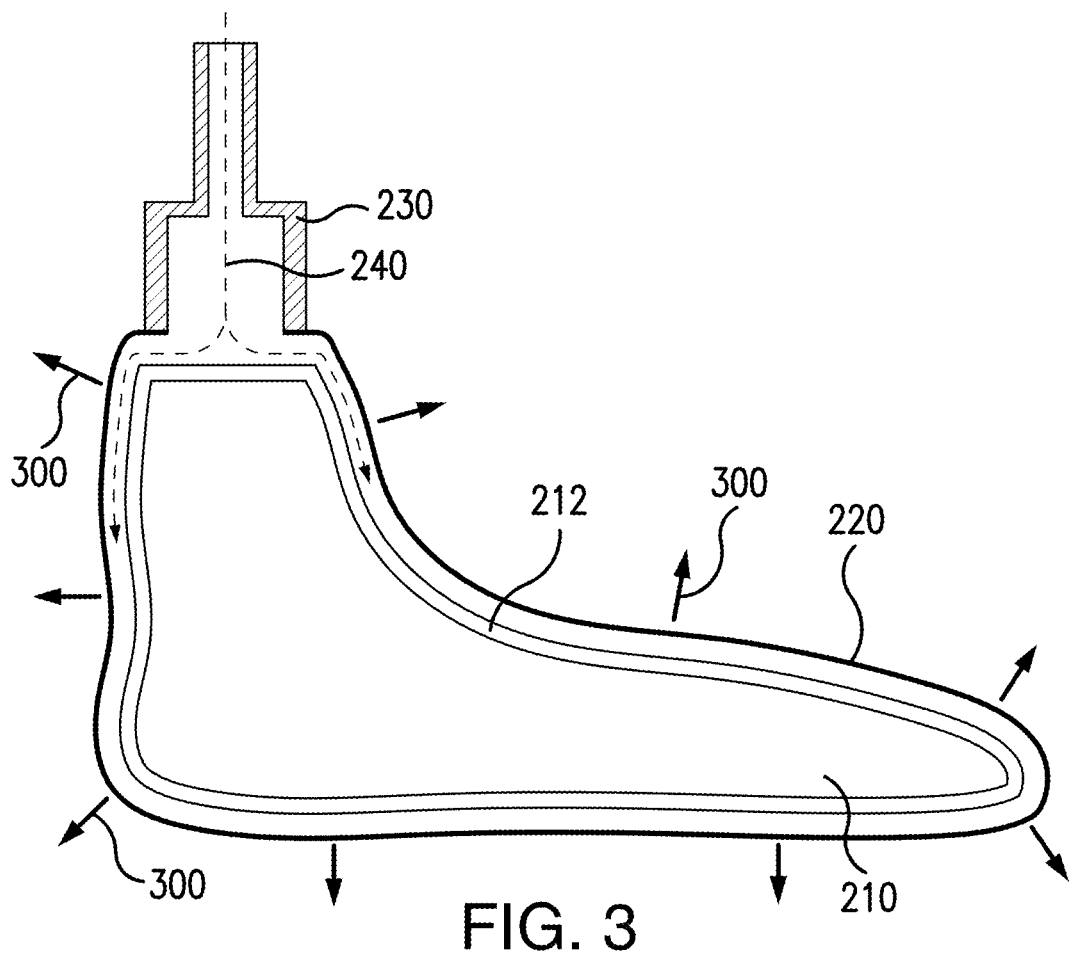
FIG. 3 is a cross-sectional view along the line 3-3' in FIG. 2.

FIGS. 2 and 3 show an inflatable bladder assembly 200 according to an embodiment. In some embodiments, inflatable bladder assembly 200 may include an inflatable bladder 220 disposed around a last 210 (last 210 is shown in broken lines in FIG. 2 for illustration purposes). In some embodiments, inflatable bladder 220 may be disposed around last 210 and in direct contact with last 210. In some embodiments, a release liner 212 may be disposed between last 210 and inflatable bladder 220. In such embodiments, release liner 212 may facilitate air flow between last 210 and inflatable bladder 220 by preventing adhesion between last 210 and inflatable bladder 220. Release liner 212 may be, but is not limited to, a Teflon® layer/film or a textured paper layer/film. In some embodiments, inflatable bladder 220 may have a hollow shape similar to the exterior shape of last 210 (e.g., a hollow shape corresponding to the shape of a human foot).

In some embodiments, inflatable bladder assembly 200 may include a connector 230. Connector 230 may include a first end 232 coupled to inflatable bladder 220 via a coupling 234 and a second end 236 configured to couple with a pressure conduit for delivering pressurized air 238 from a pressure source 250. Coupling 234 may create an air tight seal between first end 232 of connector 230 and inflatable bladder 220. In some embodiments, coupling 234 may be a hose clamp. In some embodiments, inflatable bladder 220 may include a coupling configured to engage coupling 234. For example, inflatable bladder 220 may include a male/female coupling and coupling 234 may include the corresponding female/male coupling. In some embodiments, connector 230 may include a pressure valve for regulating the pressure of pressurized air 238 pumped into inflatable bladder 220.

As shown in FIG. 3, pressurized air 238 delivered via connector 230 may flow between inflatable bladder 220 and last 210 (see e.g., air flow 240). Pressurized air pumped between inflatable bladder 220 and last 210 will cause inflatable bladder 220 to expand outward from inflatable last 210 (i.e. in the direction of arrows 300 in FIG. 3). In some embodiments, inflatable bladder 220 may expand symmetrically outward from last 210. In such embodiments, inflatable bladder 220 may maintain a hollow shape corresponding to the shape of a human foot as it expands outward. As inflatable bladder 220 expands outward, it may force a skin and its layers (e.g., base layer, grid layer(s), and shell layer(s)) disposed over it outward as well.

Figure 4A:
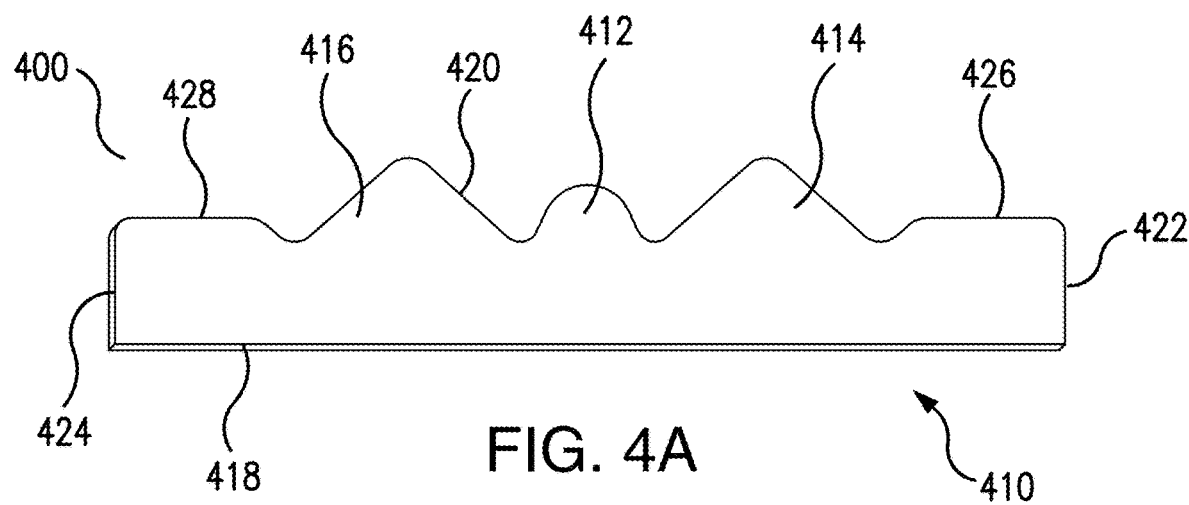
FIGS. 4A and 4B show a multi-piece base layer according to an embodiment.
Figure 4B:
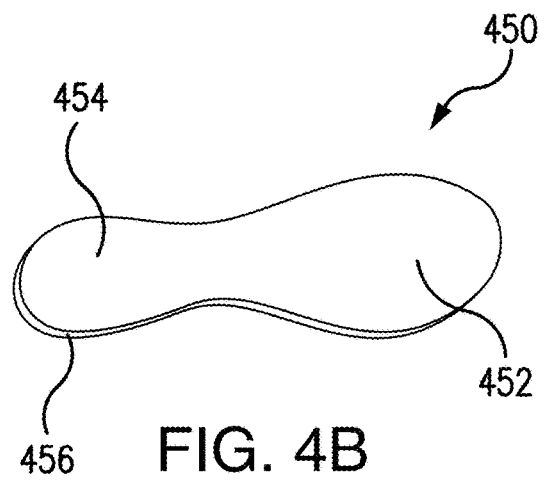

FIGS. 4A and 4B show a base layer 400 for a skin according to an embodiment. Base layer 400 may be configured (i.e., sized and shaped) to define at least a portion of a forefoot portion, midfoot portion, and rearfoot portion of an upper. Base layer 400 may include a peripheral section 410 and a bottom section 450. Peripheral section 410 may be sized and shaped to form the medial portion, lateral portion, and heel portion of base layer 400. Bottom section 450 may be sized and shaped to form the bottom portion of base layer 400. Peripheral section 410 and bottom section 450 may be composed of one or more low melting point thermoplastic polymers.

In some embodiments, peripheral section 410 may be a single integrally formed piece of material. In some embodiments, bottom section 450 may be a single integrally formed piece of material. In some embodiments, the integrally formed piece(s) of material may be cut from a source material by a single cutting operation (e.g., a single die cutting or laser cutting operation). In some embodiments, the source material may be a sheet or roll of material. Single integrally formed pieces of material that are cut by a single cutting operation may facilitate efficient and reproducible manufacturing of uppers for footwear. Moreover, such manufacturing may reduce waste by reducing waste material created during manufacturing. In some embodiments, peripheral section 410 and bottom section 450 may be coupled together to form a three-dimensional shape corresponding to the shape of a human foot before or after being disposed over an inflatable bladder (e.g., inflatable bladder 220).

In some embodiments, peripheral section 410 and bottom section 450 may be composed of the same material. In some embodiments, peripheral section 410 and bottom section 450 may be cut from the same source material. In some embodiments, peripheral section 410 and bottom section 450 may be composed of different materials. In some embodiments, the material of peripheral section 410 and/or bottom section 450 of base layer 400 may be a mechanically isotropic material. In some embodiments, the material of peripheral section 410 and/or bottom section 450 of base layer 400 may be a homogenous material.

When coupled together, peripheral section 410 and bottom section 450 may form a substantially mechanically isotropic base layer 400. When coupled together, peripheral section 410 and bottom section 450 may form a substantially homogenous material layer, with the exception of the location of any seams on base layer 400 (e.g., the seam joining peripheral section 410 and bottom section 450). The homogenous and/or mechanically isotropic nature of base layer 400 may facilitate uniform outward expansion of base layer 400 when acted on by an inflatable bladder over which base layer 400 is disposed. This may serve to create a substantially uniform wall thickness of base layer 400 after it is expanded by an inflatable bladder. This may also serve to ensure proper positioning of layers disposed over base layer 400.

Peripheral section 410 may include a heel portion 412 for defining the portion of base layer 400 that wraps around the heel of a wearer, a medial portion 414 for defining the medial side of base layer 400, and a lateral portion 416 for defining the lateral side of base layer 400. A top edge 420 of peripheral section 410 may define at least portion of an opening in base layer 400 through which a wearer inserts his or her foot when putting on an article of footwear including base layer 400. Top edge 420 may include a medial toe edge 422 and a lateral toe edge 424, which may be coupled together to define a toe end of base layer 400 when peripheral section 410 is folded into a three-dimensional shape corresponding to the shape of a human foot. Top edge 420 may also include a medial forefoot edge 426 and a lateral forefoot edge 428, which may be coupled together to define a forefoot portion of base layer 400 when peripheral section 410 is folded into a three-dimensional shape corresponding to the shape of a human foot. Edges of peripheral section 410 may be coupled together using, for example, stitching and/or an adhesive. In some embodiments, peripheral section 410 may include an extension on top edge 420 configured to define the tongue of an upper.

A bottom edge 418 of peripheral section 410 may be coupled to bottom section 450. For example, in some embodiments, bottom edge 418 may be stitched to bottom section 450 at a peripheral edge 456 of bottom section 450. In some embodiments, bottom edge 418 may alternatively or additionally be adhered to peripheral edge 456 via an adhesive. Bottom section 450 may include a forefoot portion 452 defining a forefoot area of bottom section 450 and a rearfoot portion 454 defining a rearfoot area of bottom section 450.

While FIGS. 4A and 4B show a base layer 400 sectioned into two pieces, base layer 400 may be sectioned into a different number of pieces that may be coupled together to form a three-dimensional shape corresponding to the shape of a human foot. As a non-limiting example, peripheral section 410 may be replaced with two sections, one defining the medial half of base layer 400 and one defining the lateral half of base layer 400.

Figure 5:
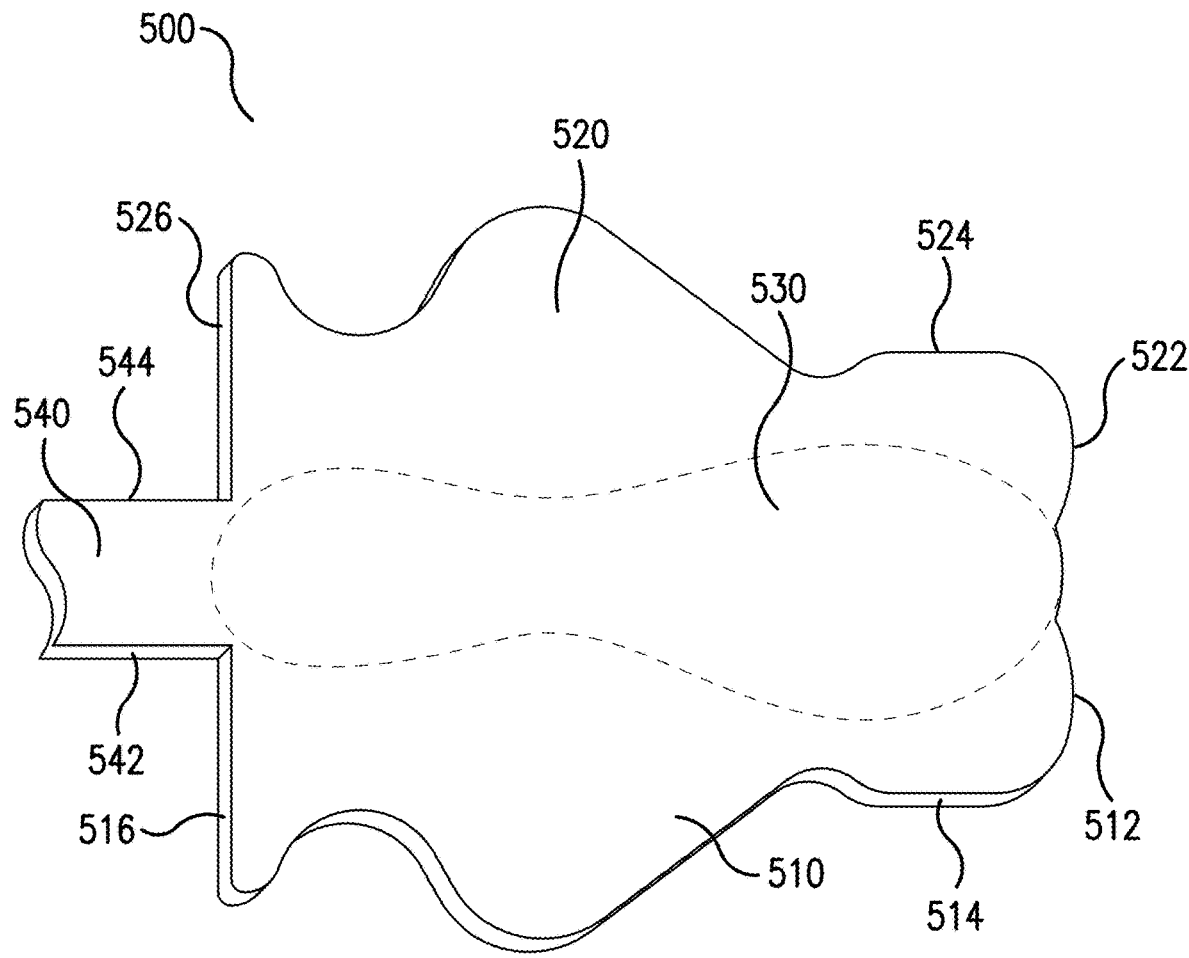
FIG. 5 is a single piece base layer according to an embodiment.

FIG. 5 shows a base layer 500 for a skin according to an embodiment. Base layer 500 may be configured (i.e., sized and shaped) to define at least a portion of a forefoot portion, midfoot portion, and rearfoot portion of an upper. Base layer 500 may include a single piece of material sized and shaped to define the medial portion 510, lateral portion 520, bottom portion 530 (shown in broken lines in FIG. 5 for illustration purposes), and heel portion 540 of base layer 500. Base layer 500 may be composed of one or more low melting point thermoplastic polymers In some embodiments, base layer 500 may be a single integrally formed piece of material. In some embodiments, base layer 500 may be cut from a source material by a single cutting operation (e.g., a single die cutting or laser cutting operation). In some embodiments, the source material may be a sheet or roll of material. In some embodiments, the material of base layer 500 may be a mechanically isotropic material. In some embodiments, the material of base layer 500 may be a homogenous material.

Edges of base layer 500 may be coupled together to form a three-dimensional shape corresponding to the shape of a human foot before or after being disposed over an inflatable bladder (e.g., inflatable bladder 220). When folded into a shape corresponding to the shape of a human foot, base layer 500 may form a substantially mechanically isotropic material layer. When folded into a shape corresponding to the shape of a human foot, base layer 500 may form a substantially homogenous material layer, with the exception of the location of any seams on base layer 500 (e.g., the seams joining edges of base layer 500). The homogenous and/or mechanically isotropic nature of base layer 500 may facilitate uniform outward expansion of base layer 500 when acted on by an inflatable bladder over which base layer 500 is disposed.

Medial portion 510 of base layer 500 may include a toe edge 512 and lateral portion 520 may include a top edge 522, which may be coupled together to define a toe end of base layer 500 when base layer 500 is folded into a three-dimensional shape corresponding to the shape of a human foot. Similarly, medial portion 510 may include forefoot edge 514 and lateral portion 520 may include a forefoot edge 524, which may be coupled together to define a forefoot portion of base layer 500 when base layer 500 is folded into a three-dimensional shape corresponding to the shape of a human foot.

Medial portion 510 of base layer 500 may include a rearfoot edge 516 that may couple with heel portion 540 when base layer 500 is folded into a three-dimensional shape corresponding to the shape of a human foot. In particular, rearfoot edge 516 may couple with a medial heel edge 542 of heel portion 540. Similarly, lateral portion 520 may include a rearfoot edge 526 that may couple with heel portion 540 when base layer 500 is folded into a three-dimensional shape corresponding to the shape of a human foot. In particular, rearfoot edge 526 may couple with a lateral heel edge 544 of heel portion 540. Edges of base layer 500 may be coupled together using, for example, stitching and/or an adhesive.

While FIG. 5 shows base layer 500 cut so that particular edges are coupled together when folding base layer 500 into a three-dimensional shape corresponding to the shape of a human foot, base layer 500 may be cut in alternative ways. In other words, base layer 500 may be cut so that seams joining the edges of base layer 500 are positioned differently when base layer 500 is folded into a three-dimensional shape corresponding to the shape of a human foot.

In some embodiments, rather than including flat pieces(s) of material that are folded into a three-dimensional shape, the base layer for a skin may be three-dimensional piece of material. For example, the base layer may be an injection molded three-dimensional layer having a shape corresponding to the shape of a human foot. In such embodiments, the base layer may not include any seams.

Figure 6A:
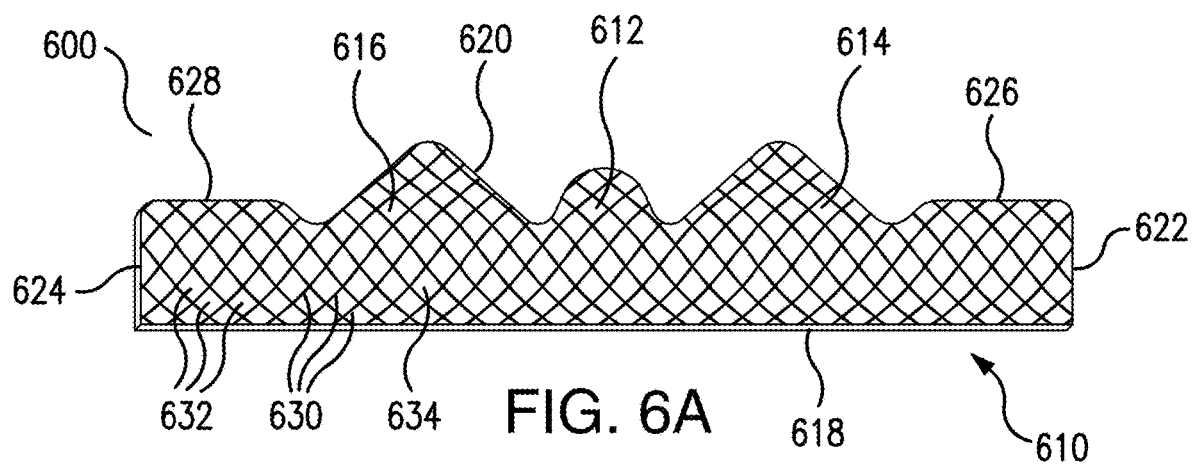
FIGS. 6A and 6B show a multi-piece grid layer according to an embodiment.
Figure 6B:
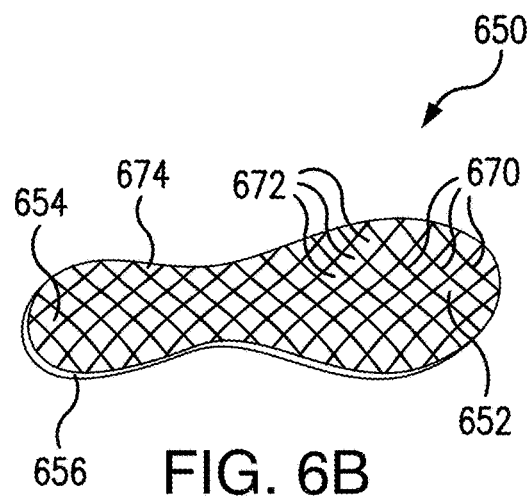

FIGS. 6A and 6B show a grid layer 600 for a skin according to an embodiment. Grid layer 600 may be composed of one or more low-melting point thermoplastic polymers. Grid layer 600 may include open pores defined by a lattice structure. In some embodiments, the lattice structure may be a porous layer composed of a low-melting point thermoplastic polymer. In some embodiments, the lattice structure may be a woven or non-woven structure defined by yarn. In some embodiments, grid layer 600 may include yarn composed of a low melting point thermoplastic polymer. In some embodiments, the yarn of grid layer 600 may be a low melting point thermoplastic polymer yarn. In some embodiments, the yarn of grid layer 600 may include thermoplastic polyurethane. In some embodiments, the yarn of grid layer 600 may include a polymeric fiber core (e.g., thermoplastic polyurethane fiber) coated with a low melting point thermoplastic polymer (e.g., a low melting point polyester or polyamide). In some embodiments, the yarn of grid layer 600 may be woven to form a woven grid layer 600.

In some embodiments, grid layer 600 may be an anisotropic layer configured to provide one or more different characteristics to different areas of upper. In some embodiments, grid layer 600 may be a mechanically anisotropic layer. Grid layer 600 may include an open pore pattern including areas having different porosities (i.e., open pore densities) configured to provide one or more different characteristics to different areas of an upper. In embodiments including a grid layer 600 including yarn, grid layer 600 may include an open pore pattern including areas having different porosities (i.e., open pore densities) defined by the arrangement of the yarn (e.g., the weave pattern of the yarn). In some embodiments, grid layer 600 may include a pattern including areas with different yarn densities configured to provide one or more different characteristics to different areas of the upper.

Grid layer 600 may include open pores arranged in a specific pattern (or composition of different patterns) to provide desired characteristics, such as but not limited to, ventilation, breathability, thermal conductivity, stretchability, and strength for an upper. In some embodiments, the pattern may be non-uniform to provide varying degrees of one or more of these characteristics to a particular area or areas of an upper. In some embodiments, grid layer 600 may provide at least one of: targeted zonal strength, targeted thermal conductivity, targeted breathability, and desired stretchability. In some embodiments, the pattern of grid layer 600 may work in concert with other layers of a skin (e.g., a base layer or shell layer(s)) to provide desired characteristics.

In some embodiments, grid layer 600 may include a peripheral section 610 sized and shaped to form the medial portion, lateral portion, and heel portion of grid layer 600. Peripheral section 610 may include a lattice structure 630 and open pores 632. In some embodiments, lattice structure 630 may be defined by woven or non-woven yarn. In some embodiments, grid layer 600 may include a bottom section 650 sized and shaped to form the bottom portion of grid layer 600. Bottom section 650 may include a lattice structure 670 and open pores 672. In some embodiments, lattice structure 670 may be defined by woven or non-woven yarn. In some embodiments, the orientation of the yarns in lattice structures 630/670 of grid layer 600 may provide desired strength and/or stretchability for areas of an upper.

In some embodiments, lattice structure 630 of peripheral section 610 and lattice structure 670 of bottom section 650 may be composed of the same material(s). In some embodiments, lattice structure 630 of peripheral section 610 and lattice structure 670 of bottom section 650 may be composed of different material(s) (or of the same material(s), but with different mechanical characteristics (e.g., stiffness)). In some embodiments, peripheral section 610 and bottom section 650 may be pieces of material cut from the same source material (e.g., a sheet or roll of material). In some embodiments, peripheral section 610 and bottom section 650 may be pieces of material cut from different source materials. In some embodiments, peripheral section 610 and bottom section 650 may be coupled together to form a three-dimensional shape corresponding to the shape of a human foot before or after being disposed over an inflatable bladder (e.g., inflatable bladder 220).

Peripheral section 610 may include a heel portion 612 for defining the portion of grid layer 600 that wraps around the heel of a wearer, a medial portion 614 for defining the medial side of grid layer 600, and a lateral portion 616 for defining the lateral side of grid layer 600. A top edge 620 of peripheral section 610 may define at least portion of an opening in grid layer 600 through which a wearer inserts his or her foot when putting on an article of footwear including grid layer 600. Top edge 620 may include a medial toe edge 622 and a lateral toe edge 624, which may be coupled together to define a toe end of grid layer 600 when grid layer 600 is folded into a three-dimensional shape corresponding to the shape of a human foot. Top edge 620 may also include a medial forefoot edge 626 and a lateral forefoot edge 628, which may be coupled together to define a forefoot portion of grid layer 600 when grid layer 600 is folded into a three-dimensional shape corresponding to the shape of a human foot. Edges of peripheral section 610 may be coupled together using, for example, stitching and/or an adhesive.

A bottom edge 618 of peripheral section 610 may be coupled to bottom section 650. For example, bottom edge 618 may be stitched and/or adhered to bottom section 650 at a peripheral edge 656 of bottom section 650. Bottom section 650 may include a forefoot portion 652 defining a forefoot area of bottom section 650 and a rearfoot portion 654 define a rearfoot area of bottom section 650.

While FIGS. 6A and 6B show a grid layer 600 sectioned into two pieces, grid layer 600 may be sectioned into a different number of pieces that may be coupled together to form a three-dimensional shape corresponding to the shape of a human foot, or a portion thereof. As a non-limiting example, peripheral section 610 may be replaced with two sections, one defining the medial side of grid layer 600 and one defining the lateral side of grid layer 600. Furthermore, in some embodiments, grid layer 600 may be a single piece of material like base layer 500. In some embodiments, grid layer 600 may be sized and shaped to for a three-dimensional shape corresponding to a portion of the shape of a human foot. For example, grid layer 600 may be sized and shaped to form a three-dimensional shape corresponding to a midfoot portion and a heel portion of a human foot.

In some embodiments, the lattice structure(s) of grid layer 600 (e.g., woven yarns) may be at least partially embedded within a matrix material. For example, lattice structure 630 of peripheral section 610 may be at least partially embedded within a matrix material 634 and lattice structure 670 of bottom section 650 may be at least partially embedded within a matrix material 674. Matrix material 634 and matrix material 674 may be the same or different. In some embodiments, the lattice structure(s) of grid layer 600 may be at least partially embedded within a base layer. In other words, the material of a base layer may include a grid layer embedded at least partially therein. In such embodiments, a combined base and grid layer may be cut from source material including a base layer serving as the matrix for a grid layer.

Figure 7:
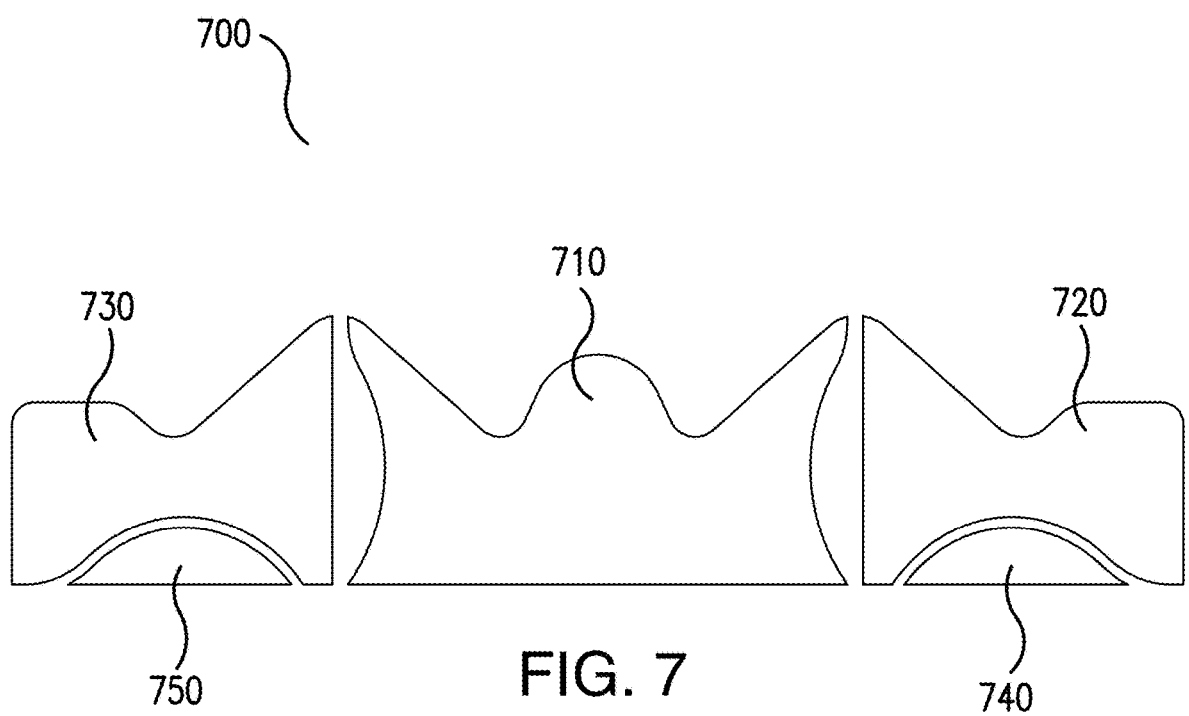
FIG. 7 shows various shell layers according to various embodiments.

FIG. 7 shows various shell layers 700 for skins according to various embodiments. Shell layers 700 may be composed of one or more low-melting point thermoplastic polymers. Shell layers 700 may be configured to provide one or more different characteristics to different areas of an upper.

FIG. 7 shows a heel shell layer 710, a top medial shell layer 720, a top lateral shell layer 730, a bottom medial shell layer 740, and a bottom lateral shell layer 750. The size and shape of shell layers 710, 720, 730, 740, and 750 shown in FIG. 7 are exemplary (see e.g., shell layers in FIGS. 12, 13, and 14 for other exemplary shapes). Shell layers 700 may be sized and shaped to cover various areas on an upper and provide such areas with desired characteristics. A skin may include any suitable number of shell layers 700. In some embodiments, different shell layers 700 may partially or fully overlap to provide desired characteristics to areas of an upper. In some embodiments, a shell layer 700 may be sized and shaped to cover the entirety of an upper (e.g., a shell layer 700 may have the same size and shape as base layer 400 or 500). In some embodiments, a shell layer 700 that covers the entirety of an upper may be disposed over all other layers of a skin to protect the other layers and prevent them from detaching during use.

In some embodiments, shell layers 700 may be configured to provide targeted strength and/or support for an upper. For example, heel shell layer 710 may provide additional support for a wearer's ankle. As another example, bottom medial shell layer 740 and a bottom lateral shell layer 750 may provide increased strength for an upper at locations corresponding to the proximal heads of an individual's metatarsals. Such locations may experience a large amount of stress during an athletic activity (e.g., when an individual cuts to the left or right). In some embodiments, shell layers 700 may be configured to provide targeted comfort and/or protection for an individual's feet. For example, heel shell layer 710 may be composed of a low melting point thermoplastic foam configured to provide additional cushioning for an individual's heel. As other example, top medial shell layer 720 and a top lateral shell layer 730 may be composed of a low melting point thermoplastic foam configured to provide additional cushioning and protection for the sides of an individual's feet. In some embodiments, the foam of shell layers may provide increased thermal insulation for areas of an individual's feet.

In some embodiments, the absence of shell layers on areas of an upper may provide desired characteristics for certain areas of an upper. For example, an upper may devoid of shell layers 700 at areas corresponding to areas of an individual's feet which experience the highest skin temperature and/or sweat production during an athletic activity. The absence of shell layers 700 at these locations may provide increased thermal conductivity and/or breathability at these locations. Areas of feet that may experience the highest skin temperature and/or sweat production are described in U.S. Pat. No. 8,910,313, which is incorporated herein in its entirety by reference thereto. In some embodiments, a shell layer 700 may include an open pore pattern as discussed in regards to grid layer 600 to provided desired characteristics to areas of an upper. In some embodiments, grid layer 600 and shell layers 700 may provide an upper with a desired texture and/or aesthetically appealing design or pattern. In some embodiments, shell layer(s) 700 may provide increased traction to portions of an article of footwear.

In some embodiments, shell layer(s) 700 may be employed to produce partial forming and/or variable heating of an upper. For example, a shell layer disposed on a forefoot portion of an upper and comprising an insulating material may heat at a slower rate compared to a different portion of an upper (e.g., a heel portion). The variable heating may result in less bonding between layers in the forefoot portion of the upper compared to the bonding of layers in the heel portion of the upper. Variation in the amount of bonding between layers on an upper may result in variable characteristics, such as breathability and thermal conductivity, for different portions of an upper.

FIG. 8A shows a skin 800 disposed over inflatable bladder 220 according to an embodiment. Skin 800 may include a base layer 810 (i.e., an innermost layer) disposed over inflatable bladder 220. A grid layer 820 may be disposed over base layer 810. In some embodiments, grid layer 820 may be in direct contact with base layer 810. Skin 800 may also include one or more shell layers 830 disposed over grid layer 820. In some embodiments, shell layer(s) 830 may be in direct contact with grid layer 820. In some embodiments, the order of grid layer 820 and shell layers 830 may be reversed (i.e., grid layer 820 may be disposed over shell layers 830). In some embodiments, skin 800 may include a plurality of grid layers 820. In some embodiments, one or more grid layers 820 may be disposed over shell layer(s) 830 and one or more grid layers 820 may be disposed between base layer 810 and shell layer(s) 830. In some embodiments, a low tact adhesive may be used to properly position grid layer(s) 820 and/or shell layer(s) 830 over base layer 810.

Figure 8B:
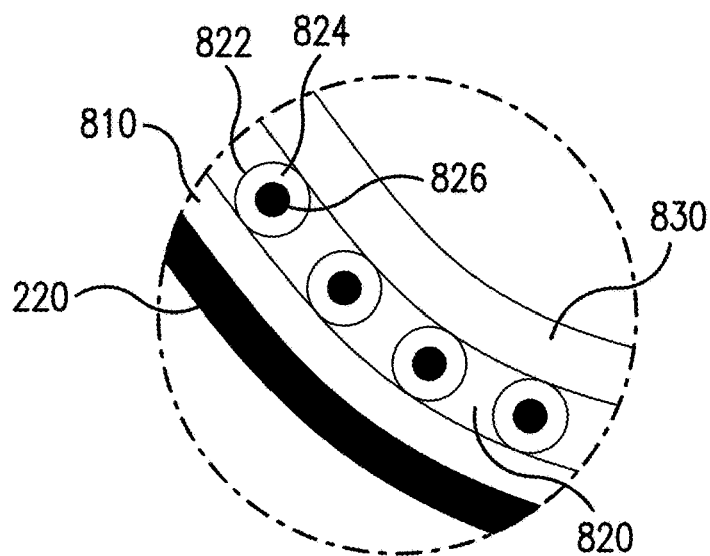
FIG. 8B is an enlarged cross-sectional view of various layers of a skin disposed over an inflatable bladder assembly according to an embodiment.

In some embodiments, as shown for example in FIG. 8B, grid layer 820 may include yarn 822 including a core 826 and a coating 824. In some embodiments, core 826 may be a polymeric fiber core. In some embodiments, core 826 may be composed of a high melting point thermoplastic polymer (e.g., thermoplastic polyurethane fiber). In some embodiments, coating 824 may be composed of a low melting point thermoplastic polymer (e.g., a low melting point polyester or polyamide). In embodiments including a coating 824 composed of a low melting point thermoplastic polymer, coating 824 may facilitate the bonding of yarn 822 to other layers (e.g., base layer 810 and/or shell layer(s) 830) during thermo-molding.

FIG. 9 shows a mold 900 for thermo-forming an upper according to an embodiment. Mold 900 may include a medial mold plate 910 including a medial mold cavity 912. Medial mold cavity 912 may have a medial mold cavity surface 914 having a shape corresponding to the shape of a medial half of an upper for an article of footwear. Mold 900 may also include a lateral mold plate 920 including a lateral mold cavity 922. Lateral mold cavity 922 may have a lateral mold cavity surface 924 having a shape corresponding to the shape of a lateral half of an upper for an article of footwear.

Together, medial mold cavity 912 and lateral mold cavity 922 may form a mold cavity having an interior shape corresponding to an upper for an article of footwear. The mold cavity may have an interior shape corresponding to an upper for various types of footwear, including but not limited to, a running shoe, a hiking shoe, a water shoe, a training shoe, a fitness shoe, a dancing shoe, a biking shoe, a tennis shoe, a cleat (e.g., a baseball cleat, a soccer cleat, or a football cleat), a basketball shoe, a boot, a walking shoe, a casual shoe, or a dress shoe.

As shown, for example, in FIGS. 10A and 10B, mold 900 may be assembled around skin 800 on inflatable bladder 220 (i.e., skin 800 and inflatable bladder 220 may be inserted into the mold cavity of mold 900). In some embodiments, the mold cavity of mold 900 may be coated with a non-stick material, such as but not limited to a silicone spray, to reduce potential adhesion between skin 800 and the mold cavity during forming. Before or after skin 800 and inflatable bladder 220 are inserted into the mold cavity, mold 900 may be heated to a predetermined temperature. The temperature of mold 900 may be such that it softens skin 800 to allow it to take on the shape of upper for an article of footwear. In some embodiments, the predetermined temperature may be below the melting point of the low melting point thermoplastic polymers of skin 800. In some embodiments, the predetermined temperature may be 180 degrees C. or less. In some embodiments, the predetermined temperature may be in the range of 180 degrees C. to 80 degrees C. In some embodiments, the predetermined temperature may be 160 degrees C. or less. In some embodiments, the predetermined temperature may be in the range of 160 degrees C. to 65 degrees C. In some embodiments, the predetermined temperature may be selected such that materials of skin 800 undergo no chemical reactions during thermo-forming an upper. Heat may be applied to mold 900 in one or more ways, such as but not limited to, high frequency heating.

After heating mold 900, inflatable bladder 220 may be expanded to press skin 800 into contact with the interior surface of the mold cavity defined by medial mold cavity 912 and lateral mold cavity 922. The combination of pressure and heat will cause skin to take on the shape of the interior surface of the mold cavity, thereby taking on the shape of an upper for an article of footwear. The layers of skin 800 closest to the interior surface of the mold cavity may experience the most about of heat, while the layers of skin furthest from the interior surface of the mold cavity (i.e., a base layer) may experience the least of amount of heat. In some embodiments, the material of base layer 810 may have a lower melting temperature than the materials of the other layers of skin 800. In some embodiments, the pressing of skin 800 against the mold cavity may result in grid layer 820 becoming partially embedded within base layer 810 and/or shell layer(s) 830. In other words, the material of base layer 810 and/or shell layer(s) 830 may at least partially fill open pores of grid layer 820. The temperature at which, pressure at which, and/or amount of time skin 800 is pressed against the interior shape of the mold cavity may be tailored to produce an upper having desired characteristics.

The mold cavity of mold 900 may be sized and shaped for a particular foot type and size (i.e., length and width). In some embodiments, the mold 900 may be a customized mold including a customized interior mold cavity surface. In some embodiments, mold 900 may be customized for a particular individual. In some embodiments, mold 900 may include a mold cavity created by digitally scanning a human foot. In some embodiments, mold 900 may include a customized mold cavity created by digitally scanning an individual's foot. In some embodiments, an individual's foot may be scanned using a CREAFORM Go!SCAN 3D scanner, Serial No: 570489, manufactured by Ametek Ultra Precision Technologies.

When thermo-forming of uppers for footwear as discussed herein, only mold(s) 900 may need to be interchanged to form different sizes, shapes, and/or types of uppers. The interchangeability and modularity of molds may reduce manufacturing costs by reducing the number of parts that need to changed/adjusted when forming uppers for different articles of footwear. Reducing the parts that need to changed/adjusted when forming uppers for different articles of footwear may facilitate the use of an automated process for thermo-forming uppers for articles of footwear. Further, it may facilitate cost-effective manufacturing of customized uppers.

As shown for example in FIG. 10C, after skin 800 takes on the shape of the mold cavity defined by medial mold cavity 912 and lateral mold cavity 922, inflatable bladder 220 may be deflated and an upper 1000 may be removed from the mold cavity. In some embodiments, excess material may be removed (e.g., cut) from upper 1000 to define the edges of upper 1000.

FIGS. 11A and 11B show an upper according to an embodiment. As shown for example in FIG. 11A, upper 1100 includes a forefoot end 1102, a heel end 1104, a medial side 1106, and a lateral side 1108 opposite medial side 1106. Also as shown in FIG. 11A, upper 1100 includes a forefoot portion 1110, a midfoot portion 1112, and a heel portion 1114. Portions 1110, 1112, and 1114 are not intended to demarcate precise areas of upper 1100. Rather, portions 1110, 1112, and 1114 are intended to represent general areas of upper 1100 that provide a frame of reference.

In some embodiments, upper 1100 may include a base layer 1120 and a grid layer 1130. Base layer 1120 may be the same as or similar to base layer 400 or 500. Grid layer 1130 may be the same as or similar to grid layer 600. For example, as shown in FIGS. 11A and 11B, grid layer 1130 may include a peripheral section 1140 coupled to a bottom section 1142 at a seam 1144 (e.g., via stitching and/or an adhesive). Peripheral section 1140 may wrapped about bottom section 1142, folded, and coupled at seam 1136 to form forefoot end 1102 and forefoot portion 1110 of upper 1100.

In some embodiments, grid layer 1130 may include yarns 1132 arranged in a pattern comprising open pores 1134. In some embodiments, grid layer 1130 may include yarns 1132 woven in a pattern comprising open pores 1134. Open pores 1134 may have varying size and/or pore density at different areas on upper 1100 to provide different characteristics to those areas. For example, as shown in FIGS. 11A and 11B, the pore size of pores 1134 may larger and the pore density of pores 1134 may be less in forefoot portion 1110 and heel portion 1114 of upper 1100 compared to midfoot portion 1112 of upper 1100. In such embodiments, upper 1100 may have greater breathability and stretchability in forefoot portion 1110 and heel portion 1114 compared to midfoot portion 1112. In such embodiments, the smaller pore size and higher pore density in midfoot portion 1112 may result in higher strength and less breathability in midfoot portion 1112 of upper 1100.

In some embodiments, the orientation of yarns 1132 may provide directional strength and/or stability to upper 1100. For example, some yarns 1132 of upper 1100 may be oriented such that they extend substantially vertically between a top edge 1141 of peripheral section 1140 and bottom section 1142 in heel portion 1114 and midfoot portion 1112 of upper 1100. This orientation of yarns 1132 may provide vertical strength and stability for upper 1100 in heel portion 1114 and midfoot portion 1112 to vertically support a wearer's ankle and inhibit the ankle form excessively twisting during an athletic activity.

FIG. 12 shows an upper 1200 according to an embodiment. Similar to upper 1100, upper 1200 includes a forefoot end 1202, a heel end 1204, a medial side 1206, and a lateral side 1208 opposite medial side 1206. Upper 1200 also includes a forefoot portion 1210, a midfoot portion 1212, and a heel portion 1214. Portions 1210, 1212, and 1214 are not intended to demarcate precise areas of upper 1200. Rather, portions 1210, 1212, and 1214 are intended to represent general areas of upper 1100 that provide a frame of reference.

In some embodiments, upper 1200 may include a base layer 1220 and a grid layer 1230. Base layer 1220 may be the same as or similar to base layer 400 or 500. Grid layer 1230 may be the same as or similar to grid layer 600. For example, grid layer 1230 may include a peripheral section 1240 coupled to a bottom section 1242.

In some embodiments, upper 1200 may include an ankle shell layer 1250, a heel shell layer 1252, and a metatarsal shell layer 1254. Ankle shell layer 1250 may provide increased support and/or protection for a wearer's ankle. Heel shell layer 1252 may provide additional strength for upper 1200 around a wearer's heel. Metatarsal shell layer 1254 may provide additional strength for upper 1200 at locations corresponding to the proximal head of an individual's first metatarsal (i.e., an individual's medial-most metatarsal).

FIG. 13 shows an upper 1300 according to an embodiment. Upper 1300 may include a base/grid layer 1320. Base/grid layer 1320 may include a base layer the same as or similar to base layer 400 or 500 and a grid layer the same as or similar to grid layer 600. In some embodiments, upper 1300 may include a rearfoot shell layer 1340, a top metatarsal shell layer 1342, and a bottom metatarsal shell layer 1344. In some embodiments, rearfoot shell layer 1340 may include an open pore layer like grid layer 600 (e.g., a woven layer) configured to provide increased support and/or protection for a wearer's ankle. Top metatarsal shell layer 1342 may provide additional strength for upper 1300 at a location corresponding to the proximal head an individual's fifth metatarsal (i.e., an individual's lateral-most metatarsal). Bottom metatarsal shell layer 1344 may provide additional cushioning for upper 1300 at a location corresponding to the proximal head of an individual's fifth metatarsal.

In some embodiments, upper 1300 may include a tongue 1350. In some embodiments, tongue 1350 may be defined by a portion of a skin used to thermo-form upper 1300. In some embodiments, tongue 1350 may be integrally formed with a layer of the skin (e.g., the base layer of the skin). In some embodiments, tongue 1350 may be coupled to the skin (e.g., via stitching and/or an adhesive) before thermo-forming. In some embodiments, tongue 1350 may be composed of a low melting point thermoplastic polymer. In some embodiments, tongue 1350 may be coupled to upper 1300 after it is thermo-molded.

In some embodiments, upper 1300 may include a sole wrap 1360. Sole wrap 1360 may be configured to facilitate the attachment of a sole to upper 1300. In some embodiments, sole wrap 1360 may include a sheet of material that may be disposed over at least a portion of a sole and bonded to the sole (see e.g., sole wrap 1516 in FIG. 15). In some embodiments, sole wrap 1360 may comprise a tape that provides traction, such as an athletic tape. In some embodiments, sole wrap 1360 may be the same as or similar to the second sole element discussed in U.S. application Ser. No. 14/683,616, filed Apr. 10, 2015, the disclosure of which is hereby incorporated by reference in its entirety by reference thereto. In some embodiments, sole wrap 1360 may be a separate layer coupled to upper 1300 using stitching, an adhesive, and/or thermo-molding. In some embodiments, sole wrap 1360 may be an integral part of one or more layers (e.g., base layer, grid layer, or shell layer) of upper 1300 (i.e. sole wrap 1360 may be an integral part of the skin of upper 1300).

In some embodiments, sole wrap 1360 may be disposed over a sole before the sole and a skin (e.g., skin 800) are inserted into a mold cavity of a (e.g., mold 900). In such embodiments, the sole may be three-dimensionally shaped along with the skin of upper 1300 in a single thermo-molding operation. In some embodiments, sole wrap 1360 and a sole may be coupled to upper 1300 in a second processing operation (e.g., a second thermo-molding operation) after a skin (e.g., skin 800) is three-dimensionally shaped into upper 1300 in a first thermo-molding operation.

FIG. 14 shows an article of footwear 1400 according to an embodiment. Article of footwear 1400 may include an upper 1410 coupled to a midsole 1430. Upper 1410 may include a body 1412 formed using a thermo-molding process discussed herein. For example, body 1412 may include a heel shell layer 1420 and a forefoot shell layer 1422. In some embodiments, a top edge of body 1412 may be lined with a cushioning liner 1414 to provide comfort for an individual's foot. In some embodiments, body 1412 may include shoe lace eyelets 1416 for a shoe lace.

In some embodiments, article of footwear 1400 may include an outsole 1432 coupled to midsole 1430. Suitable materials for midsole 1430 and outsole 1432 include, but are not limited to, a foam, a rubber, ethyl vinyl acetate (EVA), expanded Thermoplastic polyurethane (eTPU), Thermoplastic rubber (TPR) and a thermoplastic polyurethane (PU). In some embodiments, the foam may comprise, for example, an EVA based foam or a PU based foam and the foam may be an open-cell foam or a closed-cell foam. In some embodiments, midsole 1430 and/or outsole 1432 may comprise elastomers, thermoplastic elastomers (TPE), foam-like plastics, and gel-like plastics. In some embodiments, article of footwear 1400 may include a toe guard 1440. In some embodiments, article of footwear 1400 may include a tongue 1450.

FIG. 15 shows an exploded cross-sectional view of an article of footwear 1500 including an upper 1510 having a sole wrap according to an embodiment. As shown in FIG. 15, upper 1510 may include a first layer 1512 and a second layer 1514 defining a sole wrap 1516 disposed over at least a portion of a sole 1520. In some embodiments, second layer 1514 may be disposed over all or a portion of first layer 1512. In some embodiments, first layer 1512 may be a base layer as discussed herein. In such embodiments, second layer 1514 may be a grid layer or a shell layer as discussed herein. In some embodiments, first layer 1512 may be a skin comprising multiple layers as discussed herein. In such embodiments, second layer 1514 may be a separate layer disposed over at least a portion of first layer 1512. In some embodiments, second layer 1514 may be attached to first layer 1512 by stitching, an adhesive, and/or thermo-molding. In some embodiments, article of footwear 1500 may include multiple second layers 1514 defining multiple sole wraps 1516.

In some embodiments, sole 1520 may be a midsole. In some embodiments, article of footwear 1500 may include an outsole 1530 coupled to sole wrap 1516. Suitable materials for sole 1520 and outsole 1530 include, but are not limited to, a foam, a rubber, ethyl vinyl acetate (EVA), expanded Thermoplastic polyurethane (eTPU), Thermoplastic rubber (TPR) and a thermoplastic polyurethane (PU). In some embodiments, the foam may comprise, for example, an EVA based foam or a PU based foam and the foam may be an open-cell foam or a closed-cell foam. In some embodiments, sole 1520 and/or outsole 1530 may comprise elastomers, thermoplastic elastomers (TPE), foam-like plastics, and gel-like plastics.

Second layer 1514 may be arranged to at least partially cover sole 1520 to provide at least one of stability, support, and bending and torsional stiffness for article of footwear 1500. By disposing second layer 1514 over at least a portion of sole 1520, sole 1520 may be provided with increased stability and/or stiffness. In some embodiments, sole 1520 may be fully contained in second layer 1514. In some embodiments, sole 1520 may be partially exposed through second layer 1514. In some embodiments, second layer 1514 may be configured to provide increased traction to portions of article of footwear 1500.

In some embodiments, second layer 1514 may cover the bottom side, medial and lateral sides, and the forefoot and heel portions of sole 1520. In some embodiments, second layer 1514 may cover sole 1520 only partially. For example, second layer 1514 may cover only a forefoot portion, a midfoot portion, or a heel portion of sole 1520. As another example, second layer 1514 may cover only the lateral side, only the medial side, or both sides of sole 1520. Also, the mentioned portions may be only covered partially by second layer 1514. In some embodiments, second layer 1514 may completely cover sole 1520 and sole 1520 may be fully surrounded by second layer 1514. In some embodiments, second layer 1514 may specifically cover portions of sole 1520 where certain characteristics are desired, such as stability, torsional and/or bending stiffness, traction, friction, etc.

In some embodiments, second layer 1514 may comprise yarns. The yarns may be based on natural or manmade fibers including polyester, high tenacity polyester, polyamide, metal yarns, stretch yarns, carbon yarns, glass yarns, polyethylene or polyolefin yarns, bi-component yarns, polytetrafluoroethylene (PTFE) yarns, ultra-high-molecular-weight polyethylene yarns, liquid crystal polymer yarns, specialty decorative yarns or reflective yarns or any of these yarns coated with EVA hot melt, TPU, PU, rubber or otherwise coated with a polymer.

In some embodiments, second layer 1514 may comprise a textile material. For example, the textile material may be a knit textile (warp or weft knit), a braided material, a woven fabric, created by tailor fiber placement, etc. In some embodiments, the textile material may be a non-woven fabric made from suitable fibers. In some embodiments, second layer 1514 may comprise at least one first area with less stretch than an adjacent area. Second layer 1514 may further comprise at least one second area with more stiffness than an adjacent area, and/or at least one third area with more traction than an adjacent area, and/or at least one fourth area with a looser knit structure than an adjacent area, and/or at least one fifth area where the second sole element is thicker than in an adjacent area.

FIG. 16 shows an article of footwear 1600 according to some embodiments. Article of footwear 1600 may include an upper 1620 coupled to a sole 1640. Article of footwear 1600 includes a forefoot end 1602, a heel end 1604, a medial side 1606, and a lateral side 1608 opposite medial side 1606. Also, as shown in FIG. 16, article of footwear 1600 includes a forefoot portion 1610, a midfoot portion 1612, and a heel portion 1614. Portions 1610, 1612, and 1614 are not intended to demarcate precise areas of article of footwear 1600. Rather, portions 1610, 1612, and 1614 are intended to represent general areas of article of footwear 1600 that provide a frame of reference. Although portions 1610, 1612, and 1614 apply generally to article of footwear 1600, references to portions 1610, 1612, and 1614 may also apply specifically to upper 1620 or sole 1640, or individual components of upper 1620 or sole 1640.

In some embodiments, upper 1620 of article of footwear 1600 may include a textile layer 1622 coupled to a thermoformed portion 1624. Thermoformed portion 1624 may be disposed over all or a portion of textile layer 1622. Thermoformed portion 1624 may be bonded to textile layer 1622. In some embodiments, thermoformed portion 1624 may be bonded to textile layer 1622 during a thermo-molding process as discussed herein. In some embodiments, thermoformed portion 1624 may be directly bonding to textile layer 1622 via one or more polymeric materials of thermoformed portion 1624 and/or one or more polymeric materials of textile layer 1622. In some embodiments, thermoformed portion 1624 may define one or more lace holes 1660 in upper 1620. In some embodiments, lace holes 1660 may be formed during a thermo-molding process.

In some embodiments, sole 1640 may include traction elements 1642. In some embodiments, sole 1640 and/or traction elements 1642 may be formed during a thermo-molding process (e.g., by thermo-molding sole plate 2410). In some embodiments, sole 1640 and/or traction elements 1642 may be formed with thermo-formed portion 1624 during a thermo-molding process. Traction elements 1642 may include, but are not limited to, treads and cleat studs. In some embodiments, sole 1640 may be formed separately from upper 1620 and coupled to upper 1620 via, for example, an adhesive and/or stitching.

Suitable materials for sole 1640 include, but are not limited to, a foam, a rubber, ethyl vinyl acetate (EVA), expanded Thermoplastic polyurethane (eTPU), Thermoplastic rubber (TPR) and a thermoplastic polyurethane (PU). In some embodiments, the foam may comprise, for example, an EVA based foam or a PU based foam and the foam may be an open-cell foam or a closed-cell foam. In some embodiments, sole 1640 may comprise elastomers, thermoplastic elastomers (TPE), foam-like plastics, and gel-like plastics. In some embodiments, sole 1640 may include a sole wrap the same as or similar to sole wrap 1360.

Textile layer 1622 may be, but is not limited to, woven layer, a knitted layer, a non-woven layer, braided layer, and a leather layer. In some embodiments, textile layer 1622 may be made of a layer of synthetic material. In some embodiments, textile layer 1622 may be a woven, non-woven, braided, or knitted polymeric layer. In some embodiments, textile layer 1622 may be a woven, non-woven, braided, or layer composed of thermoplastic polyurethane (TPU), polyester, polyamide, polyethylene (PE), PE foam, polyurethane (PU) foam, and co-polymers or polymer blends including one or more of these polymers. In some embodiments, textile layer 1622 may be a bioengineered woven, knitted, braided, or layered synthetic spider silk, woven, knitted, braided, or layered plant based material, or woven, knitted, braided, or layered recycled and/or extruded plastic. In some embodiments, textile layer 1622 may be film or sheet of a polymeric material, such as thermoplastic polyurethane (TPU), polyester, polyamide, polyethylene (PE), PE foam, polyurethane (PU) foam, and co-polymers or polymer blends including one or more these polymers. In some embodiments, textile layer 1622 may include a low melting point thermoplastic polymer. In such embodiments, the low melting point thermoplastic polymer of textile layer 1622 may be molded during a thermo-molding process with thermoformed portion 1624. In some embodiments, the low melting point thermoplastic polymer of textile layer 1622 may be bonded to thermoformed portion 1624 and/or a reinforcement layer (e.g., reinforcement layer 2820) during a thermo-molding process.

In some embodiments, textile layer 1622 may include a plurality of layers stacked vertically and/or arranged side-by-side. In some embodiments, the plurality of layers may be laminated. In some embodiments, textile layer 1622 may be a sock liner. In some embodiments, the sock layer may be a dual layer sock liner with high melting point polymer yarns and low melting point polymer yarns. In some embodiments, textile layer 1622 may include a leno woven fabric layer, such as, but not limited to the leno woven fabric layers disclosed in U.S. patent application Ser. No. 14/793,438, filed on Jul. 7, 2015, which is hereby incorporated by reference in its entirety. In some embodiments, textile layer 1622 may define one or more lace holes 1660 in upper 1620.

Thermoformed portion 1624 includes one or more thermo-molded layers. For example, thermoformed portion 1624 may include a base layer, one or more grid layers, one or more reinforcement layers, and/or one or more shell layers as discussed herein. In some embodiments, thermoformed portion 1624 may include one or more layers three-dimensionally thermo-molded using the methods discussed herein.

As shown in FIG. 16, in some embodiments, thermoformed portion 1624 may include an outermost layer 1626 (white layer), a first shell layer 1628 (light gray layer), and a second shell layer 1630 (dark gray layer). In some embodiments, first shell layer 1628 and second shell layer 1630 may be disposed between outermost layer 1626 and textile layer 1622. In some embodiments, first shell layer 1628 and/or second shell layer 1630 may be a reinforcement layer (e.g., the same as similar to reinforcement layer 2820).

Outermost layer 1626 may define all or a portion of an outermost surface of thermoformed portion 1624. In some embodiments, multiple layers may define an outermost surface of thermoformed portion 1624. For example, outermost layer 1626 may include a plurality of layers that, together, define the outermost surface of thermoformed portion 1624. As another example, outermost layer 1626 and first shell layer 1628 may, together, define the outermost surface of thermoformed portion 1624. In some embodiments, outermost layer 1626 may include a low melting point thermoplastic polymer. In some embodiments, outermost layer 1626 may be a single integrally formed layer. In some embodiments, outermost layer 1626 may be a monolithic material layer. In some embodiments, outermost surface of outermost layer 1626 may define at least a portion of an outermost surface of upper 1620.

In some embodiments, the outermost surface of thermoformed portion 1624 may include a molded pattern 1632 having a plurality of surface features 1634 disposed on the outermost surface. In some embodiments, molded pattern 1632 may be formed on outermost layer 1626. Surface features 1634 of molded pattern 1632 may provide one or more structural characteristics and/or aesthetic characteristics to upper 1620.

In some embodiments, surface features 1634 of molded pattern 1632 may be disposed in a continuous pattern that extends from forefoot portion 1610 of upper 1620 to heel portion 1614 of upper 1620. In some embodiments, surface features 1634 may be disposed in a continuous pattern that extends from midfoot portion 1612 of upper 1620 to heel portion 1614 of upper 1620. In some embodiments, surface features 1634 may be disposed in a continuous pattern that extends from forefoot portion 1610 of upper 1620 to midfoot portion 1612 of upper 1620. In some embodiments, surface features 1634 may be disposed in a continuous, repeating pattern. In some embodiments, surface features 1634 may be disposed in a continuous, non-repeating pattern. A continuous pattern may be a pattern that occupies an area on upper 1620 with like surface features disposed adjacent to each other in an uninterrupted fashion.

In some embodiments, surface features 1634 may be disposed in a gradient pattern that extends from forefoot portion 1610 of upper 1620 to heel portion 1614 of upper 1620. In some embodiments, surface features 1634 may be disposed in a gradient pattern that extends from forefoot portion 1610 of upper 1620 to midfoot portion 1612 of upper 1620. In some embodiments, surface features 1634 may be disposed in a gradient pattern that extends from midfoot portion 1612 of upper 1620 to heel portion 1614 of upper 1620. A gradient pattern may be a pattern that occupies an area on upper 1620 with surface features having at least one dimensional characteristic that increases and/or decreases in value in the gradient pattern. In some embodiments, a gradient pattern may be a continuous pattern.

In some embodiments, a gradient pattern of molded pattern 1632 may include surface features 1634 having different sizes, shapes, heights and/or densities. In such embodiments, surface features 1634 having different sizes, shapes, heights, and/or densities may be configured to impart varying degrees of one or more structural characteristics to different areas of upper 1620. For example, varying degrees of ventilation, stretchability, strength, and/or propulsion. In some embodiments, a gradient pattern of molded pattern 1632 may include surface features 1634 having different sizes, shapes, heights, and/or densities configured to impart different aesthetic characteristics to different areas of upper 1620.

In some embodiments, one or more dimensional characteristics (e.g., size, shape, height and/or density) of surface features 1634 in molded pattern 1632 may vary in a longitudinal direction 1650 between forefoot end 1602 of article of footwear 1600 and heel end 1604 of article of footwear 1600. In some embodiments, one or more dimensional characteristics of surface features 1634 in molded pattern 1632 may vary in a transverse direction 1652 between medial side 1606 of article of footwear 1600 and lateral side 1608 of article of footwear 1600. In some embodiments, one or more dimensional characteristics of surface features 1634 in molded pattern 1632 may vary in longitudinal direction 1650 and transverse direction 1652.

In some embodiments, the height of surface features 1634 in a gradient pattern may differ in molded pattern 1632 to provide varying degrees of one or more structural characteristics and/or aesthetic characteristics to different areas of upper 1620. In some embodiments, the perimeter size of surface features 1634 in a gradient pattern may differ in molded pattern 1632 to provide varying degrees of one or more structural characteristics and/or aesthetic characteristics to different areas of upper 1620. In such embodiments, surface features 1634 with relatively large heights and/or perimeter sizes may provide a different degree of one or more structural characteristics than surface features 1634 with relatively small heights and/or perimeter sizes due to the varying degrees of melting and/or softening of polymers(s) (e.g., low melting point thermoplastic polymer(s)) at the location of differently sized surface features 1634. Such variation in melting and/or softening of low melting point thermoplastic polymer(s) may be controlled by the structural and material characteristics of the mold inserts discussed herein.

In some embodiments, the number of surface features 1634 per unit area in molded pattern 1632 (i.e., the density of surface features 1634) may differ to provide varying degrees of one or more structural characteristics and/or aesthetic characteristics to different areas of upper 1620. In some embodiments, the number of surface features 1634 per unit area in heel portion 1614 of article of footwear 1600 may be different from the number of surface features 1634 per unit area in forefoot portion 1610 of article of footwear 1600. For example, in some embodiments, the number of surface features 1634 per unit area may be larger in heel portion 1614 than in forefoot portion 1610 of article of footwear 1600. In such embodiments, the larger number of surface features 1634 per unit area in heel portion 1614 may provide a different degree of one or more structural characteristics to heel portion 1614 (e.g., higher support and/or stability characteristics). The different degree of one or more structural characteristics imparted by different surface feature densities may be due to the varying degrees of melting and/or softening of polymer(s) (e.g., low melting point thermoplastic polymer(s)) at locations having different surface feature densities. Such variation in melting and/or softening of low melting point thermoplastic polymer(s) may be controlled by the structural and material characteristics of the mold inserts discussed herein.

In some embodiments, the shape of surface features 1634 in molded pattern 1632 may differ to provide varying degrees of one or more structural characteristics and/or aesthetic characteristics to different areas of upper 1620. In such embodiments, different shapes may impart different degrees of one or more structural characteristics due to the varying degrees of melting and/or softening of polymer(s) (e.g., low melting point thermoplastic polymer(s)) at locations having surface features with different shapes.

In some embodiments, a molded pattern (e.g., molded pattern 1632) may be formed using a three-dimensional thermo-molding process as discussed herein. In some embodiments, a molded pattern may be formed by disposing a mold insert between a skin (e.g., skin 800) and the interior surface of a mold cavity (e.g., the cavity of mold 900). In such embodiments, the mold insert may impart a molded pattern onto a skin during thermoforming, and thus onto an outermost surface of a thermoformed portion (e.g., thermoformed portion 1624).

FIG. 17 shows a mold insert 1700 according to an embodiment. Mold insert 1700 includes a forefoot end 1702, a heel end 1704, a medial side 1706, and a lateral side 1708 opposite medial side 1706. Mold insert 1700 may also include a forefoot portion, a midfoot portion, and a rearfoot portion, which correspond to the forefoot portion, midfoot portion, and rearfoot portion of an upper (e.g., portions 1610, 1612, and 1614 of upper 1620).

Mold insert 1700 also includes a mold pattern including a plurality of surface features (openings 1714) formed in mold insert 1700. Openings 1714 in mold insert 1700 are disposed between struts 1716 and have a perimeter shape defined by struts 1716. As shown in FIG. 17, openings 1714 extend through mold insert 1700 from an exterior surface 1710 of mold insert 1700 to an interior surface 1712 of mold insert 1700. Openings 1714 have a triangular perimeter shape, however, openings 1714 may have any suitable shape, including but not limited to, a square shape, a rounded shape (e.g., a circular shape or oval shape), a rectangular shape, a pentagonal shape, and a polygonal shape. In some embodiments, all the openings 1714 of mold insert 1700 may have the same perimeter shape. In some embodiments, mold insert 1700 may include openings 1714 having different perimeter shapes. Openings 1714 and struts 1716 of mold insert 1700 may define a three dimensional stencil. In some embodiments, mold insert 1700 may include surface features including openings 1714 and surface features including cavities (e.g., cavities 1914).

Mold insert 1700 may include a hollow shape defined by interior surface 1712 of mold insert 1700, an open bottom end 1720, and an open top end 1722. The hollow shape defined by interior surface 1712 of mold insert 1700 may be a three-dimensional shape corresponding to the outer volumetric shape of at least a portion of an upper for an article of footwear. For example, the hollow shape defined by interior surface 1712 may be a three dimensional shape corresponding to the outer volumetric shape of an upper for a running shoe, a hiking shoe, a water shoe, a training shoe, a fitness shoe, a dancing shoe, a biking shoe, a tennis shoe, a cleat (e.g., a baseball cleat, a soccer cleat, or a football cleat), a basketball shoe, a boot, a walking shoe, a casual shoe, or a dress shoe. In some embodiments, open bottom end 1720 may have a perimeter shape corresponding to the shape of at least a portion of a sole for an article of footwear. In some embodiments, open top end 1722 may have a perimeter shape corresponding to the shape of at least a portion of an ankle cuff for an article of footwear. In operation, interior surface 1712 of mold insert 1700 may define a surface area that contacts an exterior surface of a skin (e.g., exterior surface 840 of skin 800) during a thermo-molding process. And exterior surface 1710 of mold insert 1700 may define a surface area that contacts a mold cavity (e.g., a mold cavity defined by mold 900, 2200, or 2300) during a thermo-molding process.

In some embodiments, mold insert 1700 may comprise a polymeric material. In some embodiments, mold insert 1700 may comprise a metallic material. In some embodiments, mold insert 1700 may comprise a ceramic material. In some embodiments, mold insert 1700 may comprise an insulative material. As used herein an "insulative material" means a material having a thermal conductivity of equal to or less than 1 W/m-K at room temperature (room temperature equals 21 degrees C., which is equal to 294.15 degrees K.) Suitable insulative materials for mold insert 1700 include, but are not limited to, nylon and silicone. In some embodiments, exterior surface 1710 and/or interior surface 1712 of mold insert 1700 may be coated with a material having a desired thermal conductivity (e.g., an insulative material). In some embodiments, exterior surface 1710 and/or interior surface 1712 may be electro-plated or metal-coated.

In some embodiments, a mold insert 1700 (or any other mold insert discussed herein) may be made using an additive manufacturing process. Suitable additive manufacturing processes include, but are not limited to, a continuous liquid interface process (CLIP), selective laser sintering (SLS), stereolithography (SLA), digital light processing (DLP), fused deposition modeling (FDM), selective laser melting (SLM), electron beam melting (EBM), Laminated Object Manufacturing (LOM), and 3D-printing in general. In such embodiments, additive manufacturing may be used to rapidly produce and customize mold inserts in suitable designs, including complex and intricate designs.

In some embodiments, a mold insert (e.g., mold insert 1700) may be printed in a 3D space to fit securely and conform to an interior surface of a mold (e.g., medial and lateral mold cavity side surfaces discussed herein). In some embodiments, a mold insert may partially or completely encompass the interior surface of a mold. In some embodiments, a 3D structure for a mold insert may be formed within a mold plate assembly. For example, in some embodiments, a 3D structure for a mold insert may be printed or deposited within a medial mold cavity or a lateral mold cavity discussed herein. In some embodiments, post-manufacturing softening and shaping can be done on structures printed in a 2D or 3D space. In some embodiments, a mold insert may be printed in a 2D space, and softened and shaped into a 3D shape using heat and pressure.

In some embodiments, mold insert 1700 (or any other mold insert discussed herein) may be manufactured using a UV-curing method. In some embodiments, the UV-curing method may include fabricating a mold insert in a 2D space and partially curing the mold insert using UV light, thereby forming a mold insert green body. Then, the green body may be shaped to a 3D structure, such as a 3D last or a mold cavity, to create a desired 3D shape for the mold insert. Then, after forming the desired 3D shape, the shaped green body may be fully cured using UV light. Fully curing the green body may require approximately less than one minute under a UV light source. In some embodiments, the curing may occur in approximately 20 seconds under a UV light source. In some embodiments, the green body may be fully cured on a 3D structure, such as a on 3D last or in a mold cavity. In some embodiments, the green body may be removed from the 3D structure before being fully cured.

In some embodiments, mold insert 1700 may be composed of a material different than the material of a mold cavity (e.g., mold cavity defined by mold 900). In some embodiments, mold insert 1700 may be composed of a material having a different thermal conductivity than the material of a mold cavity. In some embodiments, mold insert 1700 may be composed of a material having a lower thermal conductivity than the material of a mold cavity.

In some embodiments, different portions of mold insert 1700 may be composed of different materials having different thermal conductivities. In such embodiments, the different materials may help control the amount of softening and/or melting of polymer(s) (e.g., low melting point thermoplastic polymer(s)) in different areas of a skin during thermo-molding by controlling the heat transfer from a mold cavity surface to the skin. This may be used to vary the degree of one or more structural characteristics in different areas or portions of an upper.

In some embodiments, the thickness of mold insert 1700, measured from exterior surface 1710 to interior surface 1712, may be constant throughout mold insert 1700. In some embodiments, the thickness of mold insert 1700 may vary in different areas or portions of mold insert 1700. In such embodiments, the variation in thickness may help control the amount of softening and/or melting of polymer(s) in different areas of a skin during thermo-molding by controlling the heat transfer from a mold cavity surface to the skin. This may be used to vary the degree of one or more structural characteristics in different areas or portions of an upper. In some embodiments, the thickness of mold insert 1700 may be in the range of 0.5 mm to 40.0 mm. In some embodiments, the thickness of mold insert 1700 may be in the range of 0.5 mm to 20.0 mm. In some embodiments, the thickness of mold insert 1700 may be in the range of 0.5 mm to 10.0 mm. In some embodiments, the thickness of mold insert 1700 may be in the range of 2.0 mm to 5.0 mm.

Openings 1714 may be disposed in a pattern configured to create any of the molded patterns 1632 and surface features 1634 discussed above in regards to FIG. 16. For example, in some embodiments, openings 1714 may be disposed in a continuous pattern that extends from a forefoot portion of mold insert 1700 to a heel portion of mold insert 1700. As another example, in some embodiments, openings 1714 may be disposed in a gradient pattern that extends from a forefoot portion of mold insert 1700 to a heel portion of mold insert 1700. In such embodiments, the openings 1714 in the gradient pattern have one or more dimensional characteristics that vary within the gradient pattern. Dimensional characteristics of openings 1714 that may vary in the gradient pattern include, but are not limited to, shape, perimeter size, depth, volumetric size, and density (i.e., number of openings 1714 per unit area on mold insert 1700).

A pattern of a mold insert (e.g., a gradient pattern) may control the amount of softening and/or melting in areas of a skin during thermo-molding by controlling the heat transfer from a mold cavity surface to the skin. In some embodiments, this may be used to vary the degree of one or more structural characteristics in different areas or portions of an upper. In general, softening and/or melting of a thermoplastic polymer (e.g., a low melting point thermoplastic polymer), and the subsequent cooling of the polymer will create a more rigid, stiffer polymer, and may alter the density of the polymer. As such, by controlling the amount of softening and/or melting of a thermoplastic polymer during a thermo-molding process, the structural characteristics of an upper including the polymer may be controlled.

For purposes of the following discussion, the following three assumptions apply. (1) The highest degree of heat transfer between a skin and a mold cavity surface will result when an exterior surface of the skin directly contacts the mold cavity surface. (2) The lowest degree of heat transfer between the skin and the mold cavity surface will result when the exterior surface of skin is separated from the mold cavity surface by air (e.g., by air present in openings 1714). (3) The thermal conductivity of mold insert 1700 is less than the thermal conductivity of the mold cavity surface, but higher than the thermal conductivity of air. And because of this, heat transfer via mold insert 1700 will be slower than direct heat transfer between the mold cavity surface and the skin, but faster than heat transfer via the air. As such, mold insert 1700 may control the heat transfer between the skin and the mold cavity surface via its own thermal conductivity and by controlling and/or preventing contact between the skin and the mold cavity surface. Also, the thickness of mold insert may be tailored to control or prevent contact between the skin and the mold cavity surface.

For a mold insert 1700 having a relatively large thickness configured to prevent contact between a skin and a mold cavity surface, smaller, shallower, and/or less densely packed openings 1714 may result in a relatively large degree of softening and/or melting of a polymer. This may be the result of the thermal conductivity of mold insert 1700 significantly controlling the heat transfer between the mold cavity surface and the skin at locations corresponding to the smaller, shallower, and/or less densely packed openings 1714. The control of heat transfer by mold insert 1700 may result in a relatively large degree of softening and/or melting because the thermal conductivity of mold insert 1700 is higher than the thermal conductivity of air present in openings 1714. As such, by minimizing the size, depth, and density of openings, the presence of air is minimized, and the heat transfer between the skin and the mold cavity surface is primarily controlled by the thermal conductivity of mold insert 1700. In contrast, larger, deeper, and/or more densely packed openings 1714 may increase the amount of air between a skin and a mold cavity surface, and decrease the amount of mold insert material between the skin and the mold cavity surface, thereby allowing air to control the heat transfer between the mold cavity surface and the skin, thus resulting in a smaller degree of softening and/or melting.

For a mold insert 1700 having a relatively small thickness configured to allow contact between a skin and a mold cavity surface within openings 1714, larger, shallower, and/or more densely packed openings 1714 may result in a large amount of softening and/or melting because these types of openings 1714 may facilitate contact between the skin and the mold cavity surface, and therefore facilitate direct heat transfer from the mold cavity surface to the skin. In contrast, smaller, deeper, and/or less densely packed openings 1714 may result in a smaller amount of direct contact, and therefore resulting in a smaller degree of softening and/or melting.

In some embodiments, mold insert 1700 may include alignment features 1730 for aligning mold insert 1700 within a mold (e.g., mold 900). In such embodiments, alignment features 1730 of mold insert 1700 may mate with corresponding alignment features on a mold. In some embodiments, alignment features 1730 may be protrusions that mate with corresponding detents on a mold. In some embodiments, alignment features 1730 may be detents that mate with corresponding protrusions on a mold. In some embodiments, mold insert 1700 may be a single piece. A single piece mold insert may avoid the formation of molding lines on a skin during a thermo-molding process. In some embodiments, mold insert 1700 may be a multi-piece mold insert. For example, in some embodiments, mold insert 1700 may be a two-piece mold insert like mold inserts 2100 and 2800. In some embodiments, mold insert 1700 may include more than two pieces, for example, three pieces, four pieces, or five pieces. In embodiments including multi-piece mold inserts, the pieces of a mold insert may be assembled together to define an entire mold insert. In some embodiments, the pieces of a mold inset may include perimeter shapes that couple with each other when pieces of the mold insert are assembled, like pieces of a jigsaw puzzle.

FIG. 18 shows a mold insert 1800 according to an embodiment. Mold insert 1800 includes a forefoot end 1802, a heel end 1804, a medial side 1806, and a lateral side 1808 opposite medial side 1806. Mold insert 1800 may also include a forefoot portion, a midfoot portion, and a rearfoot portion, which correspond to the forefoot portion, midfoot portion, and rearfoot portion of an upper (e.g., portions 1610, 1612, and 1614 of upper 1620).

Mold insert 1800 also includes a mold pattern including a plurality of surface features (openings 1814) formed in mold insert 1800. Openings 1814 in mold insert 1800 extend through mold insert 1800 from an exterior surface 1810 of mold insert 1800 to an interior surface 1812 of mold insert. Openings 1814 are shown as having a rounded perimeter shape, however, openings 1814 may have any suitable shape, including but not limited to, a square shape, a triangular shape, a rectangular shape, a pentagonal shape, and a polygonal shape. Openings 1814 of mold insert 1800 may define a three dimensional stencil. In some embodiments, mold insert 1800 may include surface features including openings 1814 and surface features including cavities (e.g., cavities 1914).

Mold insert 1800 may have a hollow shape defined by interior surface 1812 of mold insert 1800, an open bottom end 1820, and an open top end 1822. The hollow shape defined by interior surface 1812 of mold insert 1800 and the perimeter shapes of open bottom end 1820 and open top end 1822 may be the same as or similar to mold insert 1700. Also, mold insert 1800 may be composed of the same material(s), may have the same thickness characteristics as discussed above for mold insert 1700, and may be manufactured as discussed above for mold insert 1700.

In some embodiments, the thickness of mold insert 1800 may be constant throughout mold insert 1800. In some embodiments, the thickness of mold insert 1800 may vary in different areas or portions of mold insert 1800 to help control the amount of softening and/or melting of thermoplastic polymer(s) (e.g., low melting thermoplastic polymer(s)) in different areas of a skin during thermo-molding in the same manner as discussed above for mold insert 1700.

In some embodiments, mold insert 1800 may be a single piece. In some embodiments, mold insert 1800 may be a multi-piece mold insert (e.g., a two-piece mold insert like mold insert 2100). In some embodiments, mold insert 1800 may include alignment features.

Similar to openings 1714, openings 1814 may be disposed in a pattern configured to create any of the molded patterns 1632 or surface features 1634 discussed above in regards to FIG. 16. For example, as shown in FIG. 18, openings 1814 may be disposed in a gradient pattern that extends from a forefoot portion of mold insert 1800 to a heel portion of mold insert 1800 and that includes openings 1814 having different perimeter sizes. FIG. 18 shows four areas (1830, 1832, 1834, and 1836) of a gradient pattern having openings 1814 with different perimeter sizes according to an embodiment. Areas 1830 and 1834 may include relatively small openings 1814. And areas 1832 and 1836 may include relatively large openings 1814. Together areas 1830, 1832, 1834, and 1836 create a gradient pattern having openings 1814 with sizes that vary in a transverse direction 1852 between lateral side 1808 of mold insert 1800 and medial side 1806 of mold insert 1800. Also, each area 1830, 1832, 1834, and 1836 includes openings 1814 disposed in a continuous pattern extending in a longitudinal direction 1850 between forefoot end 1802 of mold insert 1800 and heel end 1804 of mold insert 1800. The longitudinal continuous patterns of each area may have a relatively small amount of variation in the size of openings 1814.

The gradient pattern shown in FIG. 18 may control the amount of softening and/or melting of low melting point thermoplastic polymer(s) in different areas of a skin (e.g., areas of a skin pressed against areas 1830, 1832, 1834, and/or 1836) during thermo-molding by controlling the heat transfer from a mold cavity surface to the skin. This may be used to vary the degree of one or more structural characteristics in different areas or portions of an upper. While FIG. 18 illustrates a gradient pattern with openings 1814 having different sizes, similar gradient patterns may be created by varying a different dimensional characteristic of openings 1814 (e.g., depth, shape, and/or density of openings 1814).

FIG. 19 shows a mold insert 1900 according to an embodiment. Mold insert 1900 includes a forefoot end 1902, a heel end 1904, a medial side 1906, and a lateral side 1908 opposite medial side 1906. Mold insert 1900 may also include a forefoot portion, a midfoot portion, and a rearfoot portion, which correspond to the forefoot portion, midfoot portion, and rearfoot portion of an upper (e.g., portions 1610, 1612, and 1614 of upper 1620).

Mold insert 1900 may have a hollow shape defined by an interior surface 1912 of mold insert 1900, an open bottom end 1920, and an open top end 1922. The hollow shape defined by interior surface 1912 of mold insert 1900 and the perimeter shapes of open bottom end 1920 and open top end 1922 may be the same as or similar to mold insert 1700. Also, mold insert 1900 may be composed of the same material(s), may have the same thickness characteristics as discussed above for mold insert 1700, and may be manufactured as discussed above for mold insert 1700.

In some embodiments, the thickness of mold insert 1900 may be constant throughout mold insert 1900. In some embodiments, the thickness of mold insert 1900 may vary in different areas or portions of mold insert 1900 to help control the amount of softening and/or melting of thermoplastic polymer(s) in different areas of a skin during thermomolding in the same manner as discussed above for mold insert 1700.

In some embodiments, mold insert 1900 may be a single piece. In some embodiments, mold insert 1900 may be a multi-piece mold insert (e.g., a two-piece mold insert like mold insert 2100). In some embodiments, mold insert 1900 may include alignment features.

Mold insert 1900 includes a mold pattern including a plurality of surface features (cavities 1914) formed in mold insert 1900. In some embodiments, cavities 1914 may be formed in interior surface 1912 of mold insert 1900. In some embodiments, cavities 1914 formed in interior surface 1912 of mold insert 1900 may be defined by recesses formed in interior surface 1912. In some embodiments, cavities 1914 formed in interior surface 1912 of mold insert 1900 may be defined by projections extending from interior surface 1912 of mold insert 1900. In some embodiments, an exterior surface 1910 of mold insert 1900 may be devoid of surface features. Cavities 1914 are shown as having a triangular perimeter shape, however, cavities 1914 may have any suitable shape, including but not limited to a square shape, a rounded shape (e.g., a circular shape or an oval shape), a rectangular shape, a pentagonal shape, and a polygonal shape. In some embodiments, all the cavities 1914 of mold insert 1900 may have the same perimeter shape. In some embodiments, mold insert 1900 may include cavities 1914 having different perimeter shapes.

Similar to openings 1714, cavities 1914 may be disposed in a pattern configured to create any of the molded patterns 1632 and surface features 1634 discussed above in regards to FIG. 16. For example, in some embodiments, cavities 1914 may be disposed in a continuous pattern that extends from a forefoot portion of mold insert 1900 to a heel portion of mold insert 1900. As another example, in some embodiments, cavities 1914 may be disposed in a gradient pattern that extends from a forefoot portion of mold insert 1900 to a heel portion of mold insert 1900. In such embodiments, the cavities 1914 in the gradient pattern have one or more dimensional characteristics that vary within the gradient pattern. Dimensional characteristics of cavities 1914 that may vary in the gradient pattern include, but are not limited to, shape, perimeter size, depth, volumetric size, and density (i.e., number of cavities 1914 per unit area on mold insert 1900). In such embodiments, the gradient pattern may control the amount of softening and/or melting of thermoplastic polymer(s) (e.g., low melting point thermoplastic polymer(s)) in different areas of a skin during thermomolding by controlling the heat transfer from a mold cavity surface to the skin. This may be used to vary the degree of one or more structural characteristics in different areas or portions of an upper. Cavities 1914 of mold insert 1900 may control heat transfer between a skin and a mold cavity surface in the same manner as discussed above for openings 1714, with the exception that cavities 1914 will always prevent direct contact between the skin and the mold cavity. As such, the location of cavities 1914 will be the locations with the highest degree of heat transfer between a skin and a mold cavity surface.

In some embodiments, the size, shape, density, and/or depth of surface features (openings or cavities) of a mold insert (e.g., mold inserts 1700, 1800, and 1900) may be based on a biometric data profile for an individual (e.g., individual 3000 shown in FIG. 30), or group of individuals. In some embodiments, a biometric data profile may be collected using a physiological and personal characteristic collection and analysis system, such as a Run Genie® system. In some embodiments, the biometric data profile may be collected using the data collection and analysis system described in U.S. patent application Ser. No. 14/579, 226, filed on Dec. 22, 2014 and published as US 2016/0180440, which is hereby incorporated by reference in its entirety by reference thereto. In some embodiments, a biometric data profile may include data related to an individual's gait collected using a Vicon® Motion Capture System with force plates. In some embodiments, biometric data may include strain data for an article of footwear collected using an Aramis system from GOM mbH.

In some embodiments, a sensor module (e.g., sensor modules 3002 shown in FIG. 30) is placed and/or predisposed into article of footwear (e.g., article of footwear 3004 shown in FIG. 30) to measure, for example, a runner's running form and gait cycle (e.g., sensor is placed on, removably attached to, or built into the heel, midsole, or toe of article of footwear 3004). Additional sensors/motion monitors can also be placed on the runner's knee and hip, for example, to obtain more information about the runner's running form.

Sensor module 3002 may include a plurality of sensors, including but not limited to, one or more motion sensors, such as acceleration sensors and magnetic field sensors, or angular momentum sensors. In some embodiments, sensor module 3002 may include one or more temperature sensors, a heart rate monitoring device, a pedometer, and/or an accelerometer-based monitoring device. Sensors of sensor module 3002 may be capable of measuring a variety of athletic performance parameters. The term "performance parameters" may include physical parameters and/or physiological parameters associated with the individual's 3000 athletic activity. Physical parameters measured may include, but are not limited to, time, distance, speed, pace, pedal count, wheel rotation count, rotation generally, stride count, stride length, airtime, stride rate, altitude, temperature, strain, impact force, jump force, force generally, and jump height. Physiological parameters measured may include, but are not limited to, heart rate, respiration rate, blood oxygen level, blood lactate level, blood flow, hydration level, calories burned, or body temperature.

An acceleration sensor may be adapted to measure the acceleration of the sensor module 3002. Accordingly, when the sensor module 3002 is physically coupled to an object (such as an individual's 3000 body, article of footwear 3004, or other a piece of athletic equipment), the acceleration sensor may be capable of measuring the acceleration of the object, including the acceleration due to the earth's gravitational field. In some embodiments, an acceleration sensor may include a tri-axial accelerometer that is capable of measuring acceleration in three orthogonal directions. In some embodiments one, two, three, or more separate accelerometers may be used.

A magnetic field sensor may be adapted to measure the strength and direction of magnetic fields in the vicinity of sensor module 3002. Accordingly, when sensor module 3002 is physically coupled to an object (such as an individual's 3000 body, article of footwear 3004, or other a piece of athletic equipment), a magnetic field sensor may be capable of measuring the strength and direction of magnetic fields in the vicinity of the object, including the earth's magnetic field. In some embodiments, a magnetic field sensor may be a vector magnetometer. In some embodiments, a magnetic field sensor may be a tri-axial magnetometer that is capable of measuring the magnitude and direction of a resultant magnetic vector for the total local magnetic field in three dimensions. In some embodiments one, two, three, or more separate magnetometers may be used.

In some embodiments, an acceleration sensor and a magnetic field sensor may be contained within a single accelerometer-magnetometer module bearing model number LSM303DLHC made by STMicroelectronics of Geneva, Switzerland.

An angular momentum sensor, which may be, for example, a gyroscope, may be adapted to measure the angular momentum or orientation of sensor module 3002. Accordingly, when the sensor module 3002 is physically coupled to an object (such as an individual's 3000 body, article of footwear 3004, or other athletic equipment), the angular momentum sensor may be capable of measuring the angular momentum or orientation of the object. In some embodiments, an angular momentum sensor may be a tri-axial gyroscope that is capable of measuring angular rotation about three orthogonal axes. In some embodiments one, two, three, or more separate gyroscopes may be used. In some embodiments, angular momentum sensor may be used to calibrate measurements made by one or more of an acceleration sensor and a magnetic field sensor.

A heart rate sensor may be adapted to measure individual's 3000 heart rate. A heart rate sensor may be placed in contact with the individual's 3000 skin, such as the skin of the individual's chest, and secured with a strap. A heart rate sensor may be capable of reading the electrical activity the individual's 3000 heart.

A temperature sensor may be, for example, a thermometer, a thermistor, or a thermocouple that measures changes in the temperature. In some embodiments, a temperature sensor may primarily be used for calibration other sensors, such as, for example, an acceleration sensor and a magnetic field sensor.

In some embodiments, sensor module 3002 may include a position receiver, such as an electronic satellite position receiver that is capable of determining its location (i.e., longitude, latitude, and altitude) using time signals transmitted along a line-of-sight by radio from satellite position system satellites. Known satellite position systems include the GPS system, the Galileo system, the BeiDou system, and the GLONASS system. In some embodiments, a position receiver may be an antenna that is capable of communicating with local or remote base stations or radio transmission transceivers such that the location of sensor module 3002 may be determined using radio signal triangulation or other similar principles. In some embodiments, position receiver data may allow sensor module 3002 to detect information that may be used to measure and/or calculate position waypoints, time, location, distance traveled, speed, pace, or altitude.

Data collected by sensor module 3002 may classify individuals based on their running style, utilizing data analysis such as an anterior-posterior plot angle vs. time; medial-lateral plot angle vs. time; and the like. Calculations of these characteristic may be used to group individuals into different categories (groups), such as a heel striker, a midfoot striker, a forefoot striker, a pronator, supinator, a neutral individual, or some combination of characteristics. In some embodiments, gait analysis may utilize personal information of individual 3000, such a gender, shoe size, height, weight, running habits, and prior injuries.

In some embodiments, a regression analysis can be used to determine gait characteristics such as foot strike type, rate of pronation, degree of pronation, and the like based on acceleration data obtained from sensor module 3002. In some embodiments, the regression analysis can be used to determine gait characteristics such as foot strike type, rate of pronation, degree of pronation, and the like based on other data such as magnetometer data, angular momentum sensor data, or multiple types of data. In some embodiments, the analysis can include other user-input information such as prior injury information, an athletic goal, intended athletic environment or terrain, intended athletic duration, and current athletic footwear.

Athletic goals may be, for example, training for a race, to stay healthy, to lose weight, and training for sports. Other examples of athletic goals may include training for a race, or other sporting event, improving individual fitness, simply enjoy running, or the like. Frequency intervals may include for example about 1 to 2 times per week, about 3 to 4 times per week, about 5 to 7 times per week, or the individual doesn't know. Length intervals may include for example about less than about 5 miles per week, about 5 to 10 miles per week, about 10 to 20 miles per week, greater than about 20 miles per week, or the individual doesn't know. Examples of intended athletic terrain environments may include roads, track, treadmill, trail, gym, or particular athletic fields designed for a specific sport. Examples of athletic equipment preferences may include for example more cushioning, less weight, better fit, strength, durability, intended athletic activity range, balance, weight balance, more color choices, and the like.

In some embodiments, collecting a biometric data profile may include obtaining previously collected and stored data for an individual. In some embodiments, collecting biometric data may include obtaining a standard biometric data profile for a group of individuals. For example, a standard profile for individuals having a certain shoe size, weight, height, arch shape, stability characteristic, and/or touchdown characteristic may be retrieved.

Biometric data may be used to generate mold patterns (e.g., continuous and/or gradient patterns of surface features discussed herein) for a mold insert. Characteristics of a mold insert that may be customized to an individual's, or group of individuals' needs include, but are not limited to: (i) opening/cavity shape, (ii) opening/cavity perimeter size, (iii) opening/cavity depth, (iv) opening/cavity density, (v) thickness of a mold insert, and (vi) material(s) of a mold insert. Characteristics (i)-(vi) may vary between different areas or portions of a mold insert (e.g., a forefoot portion, a midfoot portion, and a heel portion) to provide targeted characteristics in different areas or portions of an upper based on an individual's needs. These targeted characteristics may be provided by controlling the heat transfer between a mold cavity surface and skin during a thermo-molding process, thereby controlling the amount of softening and/or melting of thermoplastic polymer(s) of a skin.

In some embodiments, parameters (i)-(vi) may be tailored to a particular individual's foot or gait, or a particular group of individuals' feet or gait. This customization may be based on unique user characteristics provided by, for example, a Run Genie® system. In some embodiments, parameters (i)-(vi) may be customized for an individual to modify an irregularity in the individual's gait. In such embodiments, an upper molded with a customized mold insert may have a molded pattern that provides stability and/or propulsion characteristics to modify the individual's gait (i.e., modify his or her gait to a preferred motion). Correcting/modifying an individual's gait to preferred motion may reduce discomfort for an individual during exercise.

In some embodiments, mold patterns for a mold insert, and therefore molded patterns on an upper, may be customized to the individual characteristics of the musculoskeletal system of an individual, or group of individuals, and/or to the movements and forces the musculoskeletal system is subject to during movement of the individual, or group of individuals, for example, during a gait cycle. The independent movement of the upper may allow the upper to remain in close proximity to the foot of an individual whilst the individual is moving. This close proximity of the upper to the foot of the individual may support or stimulate the musculoskeletal system so that the system is better equipped to handle the forces acting, for example, through stimulating the arch of the foot to engage the onward postural chain to avoid possible negative effects, for example, arch collapse, thus, increasing the stability of the foot and musculoskeletal system of the wearer.

In some embodiments, mold patterns for a mold insert, and therefore molded patterns on any upper may be tailored for or an individual, or group of individuals, based on the musculoskeletal system of the individual, or group of individuals, and/or to the movements and forces the musculoskeletal system is subject to during movement of the individual, or group of individuals, for example, during a gait cycle. In some embodiments, parameters (i)-(vi) may be tailored based on a musculoskeletal system. In some embodiments, parameters (i)-(vi) may be tailored to allow a minimum or maximum strain percentage in areas on an upper. For example, parameters (i)-(vi) may be tailored to allow a minimum stain of 5% in both the medial-lateral direction and forefoot-to-rearfoot direction (also called the anterior-to-posterior direction). The allowed minimum strain may also be 10% or 15% or 20% or 30% or 50%. In the midfoot region where an individual's arch is located an upper may be configured to allow a maximum strain of 150% in both the medial-lateral direction and forefoot-to-rearfoot direction. The allowed maximum strain may also be 125% or 110% or 100% or 80%.

The strain may in part include a strain imparted to the upper during manufacturing of the upper. The strain may in part be imparted when the user inserts their foot into the upper. The strain may be imparted during use of the shoe by the wearer.

In some embodiments, strain percentages may be analyzed using an Aramis system from GOM mbH. The system is a calibrated digital image correlation (DIC) device which allows for dynamic real time surface strain measurement. Based on strain data collected by the Aramis system, mold patterns of mold inserts, and therefore molded patterns formed on an upper, may be tailored to provide desired strain percentages to areas of an upper.

Returning now to FIG. 1, a mold insert (e.g., mold insert 1700, 1800, or 1900) may be employed in method 100 to manufacture at least a portion of an upper for an article of footwear. In such embodiments, inflatable bladder 220 may be disposed around last 210 in step 104 and a skin (e.g., skin 800) may be disposed over inflatable bladder 220 in step 106. Skin 800 may include one or more material layers for an upper as discussed herein (i.e., skin may be an upper material).

Then, in step 106, last 210, inflatable bladder 220, and the skin may be placed within the cavity of a mold (e.g., mold 900) such that a mold insert (e.g., mold insert 1700) is disposed between the skin and a mold cavity surface (e.g., medial cavity surface 914 and lateral cavity surface 924 of mold 900). In some embodiments, a mold insert may be disposed over a skin before placing the skin into a mold cavity. In some embodiments, a mold insert may be releasably coupled to a mold cavity that is assembled about a skin disposed over an inflatable bladder.

FIG. 20 shows an assembled last 210, inflatable bladder 220, skin 800, and mold insert 1700 disposed within mold 900 according to some embodiments. As shown in FIG. 20, when assembled, exterior surface 1710 of mold insert 1700 defines a mold-cavity-facing surface of mold insert 1700 and interior surface 1712 defines a skin-facing surface of mold insert 1700 opposite the mold-cavity-facing surface. In some embodiments, interior surface 1712 of mold insert 1700 may be coated with a non-stick material (e.g., Teflon) to help prevent skin 800 from sticking to mold insert 1700 during thermo-molding.

Skin 800 may include one or more low melting point thermoplastic polymers. In some embodiments, skin 800 may include one or more base layers 810 disposed over inflatable bladder 220. In some embodiments, base layer(s) 810 may be the same as or similar to base layers 400 or 500. In some embodiments, a base layer 810 may be a textile layer the same as or similar to textile layer 1622.

In some embodiments, skin 800 may include one or more reinforcement layers 825. In some embodiments, reinforcement layers 825 may include a low melting point thermoplastic polymer. In some embodiments, reinforcement layers 825 may include one or more grid layers 820. In some embodiments, reinforcement layers 825 may include one or more reinforcement plates or reinforced textile layers as discussed in regards to reinforcement layer 2820.

In embodiments, skin 800 may include one or more shell layers 830 disposed over reinforcement layer(s) 825. In some embodiments, one or more shell layers 830 may include a low melting point thermoplastic polymer. In some embodiments, shell layer(s) 830 may include any of shell layers 700, 710, 720, 730, 740, and 750. In some embodiments, shell layer(s) 830 may include one or more outermost shell layers defining an outermost surface (exterior surface 840) of skin 800 like outermost layer 1626 of thermoformed portion 1624. In some embodiments, skin 800 may include a base layer 810, a shell layer 830 defining all or a portion of exterior surface 840 of skin 800, and a reinforcement layer 825 disposed between base layer 810 and shell layer 830.

After assembly in step 106, mold 900 may be heated to a predetermined temperature in step 108. And in step 110 inflatable bladder 220 may be inflated such that skin 800 is pressed against mold insert 1700 within the heated mold cavity of mold 900, thereby forming a pattern (e.g., a continuous and/or gradient pattern) on exterior surface 840 of skin 800. In some embodiments, step 108 may also cause skin 800 (and each layer of skin 800) to take on the shape of at least a portion of an upper for an article of footwear. In some embodiments, pressing skin against mold insert 1700 may bond one or more layers of skin 800 together by directly bonding (fusing) polymer material of adjacent layers.

In some embodiments, the thermoplastic polymer(s) of skin 800 may soften when skin 800 in pressed against mold insert 1700 and the mold pattern of mold insert 1700 (i.e., pattern of openings 1714) may cause varying degrees of softening of the thermoplastic polymer(s) in skin 800. In some embodiments, the thermoplastic polymer(s) of skin 800 may melt when skin 800 in pressed against mold insert 1700 and the mold pattern of mold insert 1700 (i.e., pattern of openings 1714) may cause varying degrees of melting of the thermoplastic polymer(s) in skin 800. In some embodiments including reinforcement layer(s) 825, pressing the skin 800 against mold insert 1700 may bond a portion of a base layer 810 to a portion of a shell layer 830 to thereby encapsulate reinforcement layer(s) 825 between the base layer 810 and the shell layer 830.

In some embodiments, a portion of skin 800 defining exterior surface 840 of skin 800 includes a low melting point thermoplastic polymer. In some embodiments, skin 800 may be pressed against mold insert 1700 such that portions of exterior surface 840 of skin 800 are forced into openings 1714 of mold insert 1700 (e.g., in the direction of arrows 242 in FIG. 20). As discussed above, the degree to which portions of exterior surface 840 of skin are forced into openings 1714 may be influence the amount of softening and/or melting of thermoplastic polymer(s) of skin 800.

While FIG. 20 shows mold insert 1700 in mold 900, other mold inserts discussed herein (e.g., mold inserts 1800, 1900, and 2100) may be employed in a similar fashion as mold insert 1700. Similar to mold insert 1700, when assembled, the exterior surfaces of mold inserts 1800, 1900, and 2100 may define mold-cavity-facing surfaces and the interior surfaces of mold inserts 1800, 1900, and 2100 may define skin-facing surfaces. And, in operation, mold inserts 1800, 1900, and 2100 may form a pattern (e.g., a gradient and/or continuous pattern) on exterior surface 840 of skin 800 and cause skin 800 to take on the shape of at least a portion of an upper for an article of footwear in the same fashion as mold insert 1700.

FIG. 21 shows a two-piece mold insert 2100 according to some embodiments. Mold insert 2100 may include a medial mold insert 2110 and a lateral mold insert 2150. Medial mold insert 2110 includes surface features 2120 and lateral mold insert 2150 includes surface features 2160. In some embodiments, surface features 2120 and/or 2160 may be openings (e.g., the same as or similar to openings 1714). In some embodiments, surface features 2120 and/or 2160 may be cavities (e.g., the same as or similar to cavities 1914). Surface features 2120/2160 may be arranged in continuous and/or gradient patterns as discussed herein.

In some embodiments, medial mold insert 2110 may include alignment features 2130 and lateral mold insert 2150 may include alignment features 2170. In such embodiments, alignments features 2130/2170 may mate with corresponding alignment features on a mold (e.g., alignment features 2220 and 2260 of mold 2200). In some embodiments, alignment features 2130/2170 may be protrusions that mate with detents on a mold. In some embodiments, alignment features 2130/2170 may be detents that mate with protrusions on a mold.

In some embodiments, alignment features 2130/2170 may serve to releasably couple medial mold insert 2110 and lateral mold insert 2150 to a mold (e.g., to medial mold plate 2210 and lateral mold plate 2250 of mold 2200). In such embodiments, alignment features 2130/2170 may engage corresponding alignment features on a mold (e.g., alignment features 2220 and 2260) to releasably couple medial mold insert 2110 and lateral mold insert 2150 to the mold. In some embodiments, the engagement between alignment features 2130/2170 on mold inserts 2110/2150 and the alignment features of a mold may be a frictional engagement (e.g., a snap fit).

FIG. 22 shows a mold 2200 according to some embodiments. Mold 2200 may include a medial mold plate 2210 including a medial mold cavity 2212. Medial mold cavity 2212 may have a medial mold cavity side surface 2214 having a shape corresponding to the shape of a medial half of an upper for an article of footwear. Medial mold cavity 2212 may also include a medial cavity sole surface 2216 having a shape corresponding to the shape of a medial half of a sole for an article of footwear. In some embodiments, medial cavity sole surface 2216 may include indents 2218 for molding traction elements for a medial half of a sole. Indents 2218 may be sized and shaped to form traction elements, such as but not limited to, cleat studs or treads.

Mold 2200 may also include a lateral mold plate 2250 including a lateral mold cavity 2252. Lateral mold cavity 2252 may have a lateral mold cavity side surface 2254 having a shape corresponding to the shape of a lateral half of an upper for an article of footwear. Lateral mold cavity 2252 may also include a lateral cavity sole surface 2256 having a shape corresponding to the shape of a lateral half of a sole for an article of footwear. In some embodiments, lateral cavity sole surface 2256 may include indents 2258 for molding traction elements for a lateral half of a sole. Indents 2258 may be sized and shaped to form traction elements, such as but not limited to, cleat studs or treads. Together, medial cavity sole surface 2216 and lateral sole surface 2256 may form a sole cavity surface having an interior shape corresponding to the shape of an sole, with or without traction elements, for an article of footwear (see e.g., sole cavity surface 2420 in FIG. 24B)

In some embodiments, medial mold plate 2210 may include alignment features 2220 and lateral mold plate 2250 may include alignment features 2260. In such embodiments, alignments features 2220/2260 may mate with corresponding alignment features on a mold insert (e.g., alignment features 2130 and 2170 of mold insert 2100) for aligning the mold insert within medial mold plate 2210 and/or lateral mold plate 2250. In some embodiments, alignment features 2220/2260 may serve to releasably couple a mold insert (e.g., mold insert 2100) to mold 2200. In some embodiments, alignment features 2220/2260 may engage corresponding alignment features on a mold insert. In some embodiments, the engagement between alignment features may be a fictional engagement (e.g., a snap fit).

Together, medial mold cavity 2212 and lateral mold cavity 2252 may form a mold cavity surface having an interior shape corresponding to the shape of an upper and sole for an article of footwear (see e.g., mold cavity surface 2402 in FIG. 24B). Medial mold plate 2210 may define a medial side of the cavity surface and a lateral mold plate 2250 may define a lateral side of the mold cavity. The mold cavity may have an interior shape corresponding to an upper and sole for various types of footwear, including but not limited to, a running shoe, a hiking shoe, a water shoe, a training shoe, a fitness shoe, a dancing shoe, a biking shoe, a tennis shoe, a cleat (e.g., a baseball cleat, a soccer cleat, or a football cleat), a basketball shoe, a boot, a walking shoe, a casual shoe, or a dress shoe.

In some embodiments, the temperature of medial mold plate 2210 and lateral mold plate 2250 may be independently controlled to control the degree of softening and/or melting of thermoplastic polymers on medial and lateral sides of a skin during thermo-molding. In some embodiments, the temperature in different portions (e.g., forefoot, midfoot, and rearfoot portions) of medial mold plate 2210 and lateral mold plate 2250 may be independently controlled to control the degree of softening and/or melting of thermoplastic polymers in different portions of a skin.

FIG. 23 shows a mold 2300 according to some embodiments. Mold 2300 may include a medial mold plate 2310 including a medial mold cavity 2312. Medial mold cavity 2312 may have a medial mold cavity side surface 2314 having a shape corresponding to the shape of a medial half of an upper for an article of footwear. In some embodiments, medial mold plate 2310 may include alignment features 2320 the same as or similar to alignment features 2220 of medial mold plate 2210.

Mold 2300 may also include a lateral mold plate 2350 including a lateral mold cavity 2352. Lateral mold cavity 2352 may have a lateral mold cavity side surface 2354 having a shape corresponding to the shape of a lateral half of an upper for an article of footwear. In some embodiments, lateral mold plate 2350 may include alignment features 2360 the same as or similar to alignment features 2260 of lateral mold plate 2250.

Mold 2300 may also include a sole mold plate 2380 including a sole cavity 2382 formed in a top surface 2390 of mold plate 2380. Sole cavity 2382 may include a sole cavity side surface 2384 and a sole cavity bottom surface 2385. In some embodiments, sole cavity bottom surface 2385 includes indents 2386 for molding traction elements for a sole of an article of footwear. Indents 2386 may be sized and shaped to form traction elements, such as but not limited to, cleat studs or treads. In some embodiments, sole cavity bottom surface 2385 may include grooves 2388 sized and shaped to form support elements on a sole. For example, grooves 2388 may for support elements that connect one or more cleat studs on a sole.

When assembled, medial mold plate 2310, lateral mold plate 2350, and sole mold plate 2380 may form a mold cavity having an interior shape corresponding to the shape of an upper and sole for an article of footwear (see e.g., mold cavity surface 2400 in FIG. 24A). Medial mold plate 2310 may define a medial side of the cavity surface, lateral mold plate 2350 may define a lateral side of the mold cavity, and sole mold plate 2380 may define a bottom surface of the mold cavity. The mold cavity may have an interior shape corresponding to shape for various types of footwear, including but not limited to, a running shoe, a hiking shoe, a water shoe, a training shoe, a fitness shoe, a dancing shoe, a biking shoe, a tennis shoe, a cleat (e.g., a baseball cleat, a soccer cleat, or a football cleat), a basketball shoe, a boot, a walking shoe, a casual shoe, or a dress shoe. When assembled bottom surfaces 2330 and 2370 of medial and lateral mold plates 2310 and 2350 may contact top surface 2390 of sole mold plate 2380.

In some embodiments, the temperature of medial mold plate 2310, lateral mold plate 2350, and sole mold plate 2380 may be independently controlled to control the degree of softening and/or melting of thermoplastic polymers on medial and lateral sides of skin and control temperature applied to a sole plate (e.g., sole plate 2410) during thermo-molding. In some embodiments, the temperature in different portions (e.g., forefoot, midfoot, and rearfoot portions) of medial mold plate 2310, lateral mold plate 2350, and sole mold plate 2380 may be independently controlled to control the degree of softening and/or melting of thermoplastic polymers in different portions of a skin, and control the temperature applied to different portions of a sole plate.

Together, a mold insert (e.g., mold insert 1700 or 2100) and a mold (e.g., mold 2200 or mold 2300) may constitute a molding tool molding for manufacturing at least a portion of an article of footwear. FIG. 24A shows an assembled last 210, inflatable bladder 220, skin 800, mold insert 1700, and sole plate 2410 disposed within mold 2300 for molding an article of footwear according to some embodiments. FIG. 24B shows an assembled last 210, inflatable bladder 220, skin 800, mold insert 1700, sole mold insert 2450, and sole plate 2410 disposed within mold 2200 for molding an article of footwear according to some embodiments.

As shown in FIG. 24A, mold 2300 includes a mold cavity defined by a mold cavity surface 2400 (which is defined by medial mold cavity side surface 2314, lateral mold cavity side surface 2354, and sole cavity side surface 2384, and sole cavity bottom surface 2385). Cavity surface 2400 may have a having a three-dimensional volume having a surface area corresponding to an outermost surface area of an upper and sole for an article of footwear. When assembled, mold insert 1700 may be disposed over at least a portion of cavity surface 2400 and includes a mold-cavity-facing surface (exterior surface 1710), an interior surface 1712 opposite the mold-cavity-facing surface, and a mold pattern comprising a plurality of surface features (openings 1714) formed in mold insert 1700.

As shown in FIG. 24B, mold 2200 includes a mold cavity defined by a mold cavity surface 2402, which is defined by medial mold cavity side surface 2214, lateral mold cavity side surface 2254, and a sole cavity surface 2420 (which is defined by medial cavity sole surface 2216 and lateral cavity sole surface 2256 of mold 2200). In some embodiments, cavity surface 2402 may have a three-dimensional volume having a surface area corresponding to an outermost surface area of an upper and a sole without traction elements for an article of footwear. When assembled, mold insert 1700 may be disposed over at least a portion of cavity surface 2402 and includes a mold-cavity-facing surface (exterior surface 1710), an interior surface 1712 opposite the mold-cavity-facing surface, and a mold pattern comprising a plurality of surface features (openings 1714) formed in mold insert 1700.

As illustrated in FIG. 24A, mold 2300 may be employed to thermo-mold a sole plate 2410 for forming a sole. In such embodiments, sole plate 2410 may be disposed in the mold cavity prior to step 106 or step 108 of method 100. And, in step 110, inflatable bladder 220 may press sole plate 2410 against a sole pattern defined by indents 2386 and/or grooves 2388 formed on sole cavity bottom surface 2385 of mold cavity surface 2400 (e.g., in the direction of arrows 242 in FIG. 24A.) By pressing sole plate 2410 against indents 2386 and/or grooves 2388 structural features, such as but not limited to traction elements and structural elements connecting traction elements may be formed on sole plate 2410.

In some embodiments, as illustrated in FIG. 24B, mold insert 2450 may be disposed between sole plate 2410 and sole cavity surface 2420 to control the heat transfer between sole cavity surface 2420 and sole plate 2410. In some embodiments, mold insert 2450 may be called a "sole mold insert." In such embodiments, sole mold insert 2450 may be configured to create desired traction patterns on sole plate 2410 during thermo-molding. In some embodiments, sole mold insert 2450 may be configured to control heat transfer between sole cavity surface 2420 and sole plate 2410 to create desired traction patterns.

Sole mold insert 2450 may including openings and/or cavities the same as or similar to openings and/or cavities for mold inserts discussed herein (e.g., openings 1714 and cavities 1914). Further, sole mold insert 2450 may be composed of the same material(s) and may have the same thickness characteristics as discussed for mold inserts herein (e.g., mold insert 1700). FIG. 24B shows sole mold insert 2450 including cavities 2452 for creating a desired traction pattern on sole plate 2410 during thermo-molding. In such embodiments, sole plate 2410 may be disposed in the mold cavity prior to step 106 or step 108 of method 100. And, in step 110, inflatable bladder 220 may press sole plate 2410 against a sole mold insert 2450 and into cavities 2452 (e.g., in the direction of arrows 242 in FIG. 24B). By pressing sole plate 2410 against sole mold insert 2450 structural features, such as but not limited to traction elements and structural elements connecting the traction elements may be formed on sole plate 2410. In some embodiments, the traction elements may be cleat studs. In some embodiments, a sole mold plate (e.g., sole mold plate 2450) may be a separate mold insert piece from mold insert piece(s) defining lateral and/or medial sides of a mold insert. In some embodiments, lateral and/or medial sides of a mold insert (e.g., medial mold insert 2110 and/or lateral mold insert 2150) may define all or a portion of a sole mold insert. For example, in some embodiments, a medial mold insert may define a medial side of a sole mold insert and a lateral mold insert may define a lateral side of a sole mold insert.

In some embodiments, skin 800 and sole plate 2410 may be formed together in a single thermo-molding process. In such embodiments, inflating an inflatable bladder within a heated mold cavity may bond sole plate 2410 to skin 800. In some embodiments, sole plate 2410 may form all or a portion of a midsole. In some embodiments, sole plate 2410 may form all or a portion of an outsole. In some embodiments, sole plate 2410 may form all or a portion of a midsole and an outsole. In some embodiments, sole plate 2410 may be the same as or similar to sole 1520 and skin 800 may include a sole wrap the same as or similar to sole wrap 1516.

Suitable materials for sole plate 2410 include, but are not limited to, a foam, a rubber, ethyl vinyl acetate (EVA), expanded Thermoplastic polyurethane (eTPU), Thermoplastic rubber (TPR) and a thermoplastic polyurethane (PU). In some embodiments, the foam may comprise, for example, an EVA based foam or a PU based foam and the foam may be an open-cell foam or a closed-cell foam. In some embodiments, sole plate 2410 may comprise elastomers, thermoplastic elastomers (TPE), foam-like plastics, and gel-like plastics. In some embodiments, sole plate 2410 may include a sole wrap the same as or similar to sole wrap 1360.

While FIGS. 24A and 24B show mold insert 1700 in mold 2300 and mold 2200, respectively, other mold inserts discussed herein (e.g., mold inserts 1800, 1900, and 2100) may be employed in a similar fashion as mold insert 1700. For example, in embodiments including a two-piece mold insert (e.g., mold insert 2100), medial mold insert 2110 may be disposed over at least a portion of medial mold plate 2310 or 2210 and lateral mold insert 2150 may be disposed over at least a portion of lateral mold plate 2350 or 2250 when mold insert 2100 is assembled with mold 2300 or 2200. In some embodiments, medial mold insert 2110 may be releasably attached to medial mold plate 2310 or 2210 and lateral mold insert 2150 may releasably attached to lateral mold plate 2350 or 2250 when mold insert 2100 is assembled with mold 2300 or 2200.

FIG. 25 shows a mold pattern 2500 for a mold insert according to some embodiments. For illustration purposes, mold pattern 2500 is shown as a flat pattern. However, mold pattern 2500 may be shaped into a three dimensional shape corresponding to a least a portion of an upper for an article of footwear. For example, mold pattern 2500 may be shaped into a three dimensional shape defining a medial side of an upper for an article of footwear and a forefoot portion of a lateral side of an upper for an article of footwear.

Mold pattern 2500 includes surface features 2510 arranged in a gradient pattern having surface features 2510 that generally increase in size when moving away from an interior perimeter edge 2530 at directions perpendicular to perimeter edge 2530 (i.e., in the directions indicated with arrows 2520). As such, mold pattern 2500 may be configured to impart a gradient pattern on a thermoformed portion of an upper (e.g., thermoformed portion 1624) with one or more structural characteristics that vary in the direction of arrows 2520. For example, the stretchability of an upper may increase in the direction of arrows 2520. The stretchability may increase due to a smaller amount of softening and/or melting of thermoplastic polymer(s) (e.g., low melting point thermoplastic polymer(s)) in a skin when moving away from interior perimeter edge 2530 due to the increasing size of surface features 2510. In some embodiments, surface features 2510 may be openings. In some embodiments, surface features 2510 may be cavities. In some embodiments, a different or additional dimensional characteristic of surface features 2510 may vary the direction of arrows 2520, such as the depth or density.

FIG. 26 shows a mold pattern 2600 for a mold insert according to some embodiments. For illustration purposes, mold pattern 2600 is shown as a flat pattern. However, mold pattern 2600 may be shaped into a three dimensional shape corresponding to a least a portion of an upper for an article of footwear. For example, mold pattern 2600 may be shaped into a three dimensional shape defining a portion of a medial side of an upper for an article of footwear.

Mold pattern 2600 includes surface features 2610 arranged in a gradient pattern having areas with differently sized surface features 2610. As illustrated in FIG. 26, molded pattern 2600 includes a first area 2620 and a third area 2640 having relatively small surface features 2610 and a second area 2630 having relatively large surface features 2610. As such, in some embodiments, mold pattern 2600 may be configured to impart a gradient pattern on a thermoformed portion of an upper (e.g., thermoformed portion 1624) with areas having desired degrees of one or more characteristics. For example, the stretchability of an upper may vary between areas on an upper molded by areas 2620, 2630, and 2640 to provide an upper configured to remain in close proximity to a wearer's foot whilst the wear is moving. In some embodiments, surface features 2610 may be openings. In some embodiments, surface features 2610 may be cavities. In some embodiments, a different or additional dimensional characteristic of surface features 2610 may vary between areas 2620, 2630, and 2640, such as depth or density.

FIG. 27 shows a mold pattern 2700 for a mold insert according to some embodiments. For illustration purposes, mold pattern 2700 is shown as a flat pattern. However, mold pattern 2700 may be shaped into a three dimensional shape corresponding to a least a portion of an upper for an article of footwear. For example, mold pattern 2700 may be shaped into a three dimensional shape defining a medial side and a lateral side of an upper for an article of footwear.

Mold pattern 2700 includes surface features 2710 arranged in a gradient pattern with differently sized and shaped surface features 2710. The differently sized and shaped surface features 2710 of mold pattern 2700 may be configured to impart desired aesthetic characteristics to the medial and lateral sides of a thermoformed portion of an upper (e.g., thermoformed portion 1624). In some embodiments, surface features 2710 may be openings. In some embodiments, surface features 2710 may be cavities. In some embodiments, a different or additional dimensional characteristic of surface features 2710 may vary in mold pattern 2700, such as depth.

FIG. 28 shows a two-piece mold insert 2800 according to some embodiments. Mold insert 2800 may include a medial mold insert 2810 and a lateral mold insert 2850. Medial mold insert 2810 includes surface features 2820 and lateral mold insert 2850 includes surface features 2860. In some embodiments, surface features 2820 and/or 2860 may be projections that define cavities 2822 and 2862 on interior surfaces 2812 and 2852 of medial mold insert 2810 and lateral mold insert 2850, respectively. In some embodiments, surface features 2820/2860 may be arranged in continuous and/or gradient patterns as discussed herein. In some embodiments, surface features 2820 and 2860 may include groups of surface features oriented in different directions to provide desired structural characteristics and/or aesthetic characteristics to different areas of an upper. In some embodiments, the directional orientation of surface features 2820 and 2860 may provide directional characteristics (e.g., directional strength or directional stretchability) to different areas of an upper. As used herein, the term "directional characteristic" means a characteristic provided in a specific linear direction across an area of an upper. A directional characteristic is a characteristic that is anisotropic and has a maximum/minimum value in a particular linear direction.

For example, surface features 2820 and 2860 in a forefoot portion of mold insert 2800 may produce a molded pattern that provides directional strength in a transverse direction across a forefoot portion of an upper (e.g., in direction 1652 shown in FIG. 16) to provide transverse strength for a forefoot portion of an upper. Such directional strength may provide strength and propulsion for areas of an upper that experience a large amount of lateral stress during an athletic activity (e.g., when an individual cuts to the left or right). As another example, surface features 2820 and 2860 in a rearfoot portion of mold insert 2800 may produce a molded pattern that provides directional strength in a vertical direction to provide vertical strength for a rearfoot portion of an upper. Such directional vertical strength may provide support for an individual's ankle during athletic activities, for example.

FIG. 29 shows an upper 2900 including a reinforcement layer 2920 according to some embodiments. Upper 2900 may include a thermoformed portion 2910 the same as or similar to thermoformed portion 1624, reinforcement layer 2920, and a textile layer 2930 the same as or similar to textile layer 1622. Thermoformed portion 2910 may include one or more base layers or shell layers as discussed herein. In some embodiments, reinforcement layer 2920 may be disposed between layers of thermoformed portion 2910 (e.g., between a base layer and a shell layer). In some embodiments, reinforcement layer 2920 may be disposed between thermoformed portion 2910 and textile layer 2930. In some embodiments, reinforcement layer 2920 may be stitched to textile layer 2930.

Reinforcement layer 2920 may be configured to provide increased support, stability, and/or propulsion to one or more areas of an upper. In some embodiments, reinforcement layer 2920 may include a composite fiber material. In some embodiments, reinforcement layer 2920 may be a reinforcement plate, such as but not limited to, a composite fiber plate (e.g., carbon fiber plate) or Kevlar® plate. In some embodiments, reinforcement layer 2920 may be a fiber reinforced textile layer. For example, in some embodiments, reinforcement layer 2920 may be a textile layer having polymeric thread stitched to the textile layer in one or more patterns. In some embodiments, the polymeric thread may include a low melting point thermoplastic polymer. In some embodiments, the polymer thread of a reinforcement layer may be bonded (fused) to other layers of upper 2900 (e.g., layers of thermoformed portion 2910 or textile layer 2830) during a thermo-molding process. In some embodiments, reinforcement layer 2920 may include one or more polymer thread sets stitched in one or more patterns on a textile layer as described in U.S. patent application Ser. No. 15/452,672, filed on Mar. 7, 2017, which is hereby incorporated by reference in its entirety.

Some embodiments may include a method of manufacturing an upper for an article of footwear, the method including disposing an inflatable bladder around a last; disposing a skin over the inflatable bladder, the skin including at least one of: a base layer including a low melting point thermoplastic polymer and a grid layer including a yarn composed of a low melting point thermoplastic polymer; placing the assembled last, inflatable bladder, and skin within a cavity of a mold; heating the mold to a predetermined temperature; and inflating the inflatable bladder such that the skin is pressed against an interior surface of the heated mold cavity to cause the skin to take on the shape of the internal surface of the mold cavity onto which it is pressed, thereby forming an upper for an article of footwear.

In any of the various embodiments discussed herein, the predetermined temperature of the mold may be below a melting point of the low melting point thermoplastic polymers of the base layer and the grid layer. In any of the various embodiments discussed, herein the predetermined temperature may be 180 degrees C. or less.

In any of the various embodiments discussed herein, the low melting point thermoplastic polymers of a base layer and a grid layer may be selected from the group of: polyesters, polyamides, polyethylene, polyethylene foams, polyurethane foams, co-polymers thereof, and polymer blends thereof.

In any of the various embodiments discussed herein, a skin may include a base layer and the base layer may be a substantially mechanically isotropic material. In any of the various embodiments discussed herein, a skin may include a base layer and the base layer may be a substantially homogenous material.

In any of the various embodiments discussed herein, a skin may include a base layer and a grid layer and the grid layer may be disposed over the base layer.

In any of the various embodiments discussed herein, a skin may include a grid layer and the yarn of the grid layer may include thermoplastic polyurethane. In any of the various embodiments discussed herein, a skin may include a grid layer and the yarn of the grid layer may be woven and include a woven pattern having areas with different yarn densities configured to provide one or more different characteristics to different areas of an upper. In any of the various embodiments discussed herein, a skin may include a grid layer and the grid layer may include a pattern having areas with different open pore densities configured to provide one or more different characteristics to different areas of the upper.

In any of the various embodiments discussed herein, a skin may include a base layer and disposing the skin over an inflatable bladder may include disposing one or more shell layers including a low melting point thermoplastic polymer over at least a portion of the base layer. In any of the various embodiments discussed herein, a skin may include a grid layer and disposing the skin over an inflatable bladder may include disposing one or more shell layers including a low melting point thermoplastic polymer over at least a portion of the grid layer.

In any of the various embodiments discussed herein, a method of manufacturing an upper for an article of footwear may include disposing a release liner between an inflatable bladder and a skin.

In any of the various embodiments discussed herein, a method of manufacturing an upper for an article of footwear may include a mold that is a customized mold including a customized interior surface. In any of the various embodiments discussed herein, a mold may be a customized mold including a customized interior surface for a particular individual. In any of the various embodiments discussed herein, a mold may be a customized mold including a customized interior surface for a particular foot type and size. In any of the various embodiments discussed herein, a customized mold may be created by digitally scanning an individual's foot.

In any of the various embodiments discussed herein, a method of manufacturing an upper for an article of footwear may include deflating an inflatable bladder and removing the upper from a mold cavity. In any of the various embodiments discussed herein, a method of manufacturing an upper for an article of footwear may include cutting the upper to remove excess material.

Some embodiments may include an upper for an article of footwear made by disposing an inflatable bladder around a last; disposing a skin over the inflatable bladder, the skin including at least one of: a base layer including a low melting point thermoplastic polymer and a grid layer including a yarn composed of a low melting point thermoplastic polymer; placing the assembled last, inflatable bladder, and skin within a cavity of a mold; heating the mold to a predetermined temperature; and inflating the inflatable bladder such that the skin is pressed against an interior surface of the heated mold cavity to cause the skin to take on the shape of the internal surface of the mold cavity onto which it is pressed, thereby forming an upper for an article of footwear.

Some embodiments may include a method of manufacturing an upper for an article of footwear, the method including disposing an inflatable bladder around a last; disposing a skin over the inflatable bladder, the skin including a layer including a low melting point thermoplastic polymer; placing the assembled last, inflatable bladder, and skin within a cavity of a mold; heating the mold to a predetermined temperature less than or equal to 180 degrees C.; and inflating the inflatable bladder such that the skin is pressed against an interior surface of the heated mold cavity to cause the skin to take on the shape of the internal surface of the mold cavity onto which it is pressed, thereby forming an upper for an article of footwear.

In any of the various embodiments discussed herein, a low melting point thermoplastic polymer may be selected from the group of: polyesters, polyamides, polyethylene, polyethylene foams, polyurethane foams, co-polymers thereof, and polymer blends thereof.

In any of the various embodiments discussed herein, a layer including a low melting point thermoplastic polymer may include a yarn composed of a low melting point thermoplastic polymer. In any of the various embodiments discussed herein, a yarn may include a core composed of a high melting point thermoplastic polymer coated with a low melting point thermoplastic polymer.

In any of the various embodiments discussed herein, a low melting point thermoplastic polymer may have a melting point of 200 degrees C. or less.

Some embodiments may include an upper for an article of footwear, the upper including a single integrally molded skin defining a forefoot portion, a midfoot portion, and a rearfoot portion of the upper, the skin including at least one of: a base layer defining a forefoot portion, a midfoot portion, and a rearfoot portion of the upper and including a low melting point thermoplastic polymer; and a grid layer including of a yarn composed of a low melting point thermoplastic polymer.

In any of the various embodiments discussed herein, an upper may include a shell layer including a low melting point thermoplastic polymer.

In any of the various embodiments discussed herein, the low melting point thermoplastic polymers of a base layer and a grid layer have melting points of 200 degrees C. or less.

In any of the various embodiments discussed herein, a skin may include a base layer and the base layer may be a substantially mechanically isotropic material. In any of the various embodiments discussed herein, a skin may include a base layer and the base layer may be a substantially homogenous material.

In any of the various embodiments discussed herein, a skin may include a base layer and a grid layer and the grid layer may be at least partially embedded within the base layer. In any of the various embodiments discussed herein, a skin may include a grid layer and the yarn of the grid layer may be composed of thermoplastic polyurethane.

In any of the various embodiments discussed herein, a skin may include a grid layer and the grid layer may include a pattern including areas with different open pore densities configured to provide one or more different characteristics to different areas of the upper. In any of the various embodiments discussed herein, the characteristics for different areas of an upper may be selected from the group of: breathability, strength, thermal conductivity, and stretchability.

In any of the various embodiments discussed herein, a skin may include a grid layer and the grid layer may be a woven layer. In any of the various embodiments discussed herein, a woven layer may include a woven pattern including areas with different yarn densities configured to provide one or more different characteristics to different areas of an upper.

In any of the various embodiments discussed herein, a skin may include a base layer and a grid layer.

In any of the various embodiments discussed herein, an upper may include a plurality of grid layers disposed over the base layer. In any of the various embodiments discussed herein, an upper may include a plurality of shell layers including a low melting point thermoplastic polymer disposed over a grid layer. In any of the various embodiments discussed herein, an upper may include a plurality of shell layers that provide one or more different characteristics to different areas of the upper. In any of the various embodiments discussed herein, one or more of the shell layers may be a foam layer for providing cushioning to certain areas of the upper.

In any of the various embodiments discussed herein, an upper may include a single integrally molded skin that defines a tongue of the upper.

Some embodiments may include an article of footwear including a midsole coupled to an upper, the upper including a single integrally molded skin defining a forefoot portion, a midfoot portion, and a rearfoot portion of the upper, the skin including at least one of: a base layer defining a forefoot portion, a midfoot portion, and a rearfoot portion of the upper and including a low melting point thermoplastic polymer; and a grid layer including of a yarn composed of a low melting point thermoplastic polymer.

In any of the various embodiments discussed herein, the midsole may be coupled to an upper by a sole wrap. In any of the various embodiments discussed herein, a sole wrap may be disposed around at least a portion of a midsole. In any of the various embodiments discussed herein, a sole wrap may be an integral part of a skin of an upper.

Some embodiments may include an upper for an article of footwear, the upper including a single integrally molded skin defining a forefoot portion, a midfoot portion, and a rearfoot portion of the upper, the skin including a yarn composed of a low melting point thermoplastic polymer.

In any of the various embodiment discussed herein, a yarn composed of a low melting point thermoplastic polymer may include a core composed of a high melting point thermoplastic polymer coated with a low melting point thermoplastic polymer.

In any of the various embodiments discussed herein, an upper may include a base layer defining a portion of the forefoot portion, the midfoot portion, and the rearfoot portion of the upper, the base layer including a low melting point thermoplastic polymer.

In any of the various embodiments discussed herein, a yarn composed of a low melting point thermoplastic polymer may be disposed over a base layer. In any of the various embodiments discussed herein, a yarn composed of a low melting point thermoplastic polymer may be at least partially embedded in a base layer.

Some embodiments may include a method of manufacturing at least a portion of an upper for an article of footwear, the method including disposing an inflatable bladder around a last; disposing a skin over the inflatable bladder; placing the last, the inflatable bladder, and the skin within a cavity of a mold such that a mold insert is disposed between the skin and a surface of the mold cavity, the mold insert including a mold-cavity-facing surface, a skin-facing surface opposite the mold-cavity-facing surface, and a mold pattern including a plurality of surface features formed in the mold insert; heating the mold to a predetermined temperature; and inflating the inflatable bladder such that the skin is pressed against the mold insert within the heated mold cavity, thereby forming a pattern on an exterior surface of the skin and causing the skin to take on the shape of at least a portion of an upper for an article of footwear.

In any of the various embodiments discussed herein, the surface features of a mold insert may include a plurality of openings extending through the mold insert from a skin-facing surface to a mold-cavity-facing surface of the mold insert.

In any of the various embodiments discussed herein, the surface features of a mold insert may include a plurality of cavities formed in a skin-facing surface of the mold insert.

In any of the various embodiments discussed herein, a skin may include a low melting point thermoplastic polymer. In some embodiments, the low melting point thermoplastic polymer may soften when the skin is pressed against the mold insert and the mold pattern of the mold insert may cause varying degrees of softening of the low melting point thermoplastic polymer in the skin.

In any of the various embodiments discussed herein, a portion of a skin defining the exterior surface of the skin may include a low melting point thermoplastic polymer.

In any of the various embodiments discussed herein, a mold insert may include an insulative material. In any of the various embodiments discussed herein, a mold insert may include a polymeric material.

In any of the various embodiments discussed herein, a skin may be pressed against a mold insert such that portions of an exterior surface of the skin are forced into the surface features formed in the mold insert.

In any of the various embodiments discussed herein, a mold insert may be releasably attached to a mold cavity.

In any of the various embodiments discussed herein, a mold pattern may include surface features disposed in a gradient pattern that extends from a forefoot portion of the mold insert to a heel portion of the mold insert and the gradient pattern may include surface features having one or more dimensional characteristics that vary within the gradient pattern. In any of the various embodiments discussed herein, surface features in a gradient pattern may have varying volumetric sizes. In any of the various embodiments discussed herein, surface features in a gradient pattern may have varying depths. In any of the various embodiments discussed herein, the number of surface features per unit area may vary in a gradient pattern.

In any of the various embodiments discussed herein, a pattern on an exterior surface of a skin formed by a gradient pattern may provide varying degrees of one or more characteristics to different areas of the at least a portion of the upper. In some embodiments, the one or more characteristics are selected from the group including: ventilation, stretchability, strength, and propulsion.

In any of the various embodiments discussed herein, a skin may include a base layer, a shell layer defining an exterior surface of the skin, and a reinforcement layer disposed between the base layer and the shell layer and the shell layer may include a low melting point thermoplastic polymer. In some embodiments, inflating an inflatable bladder and pressing the skin against a mold insert may bond a portion of the base layer to a portion of the shell layer thereby encapsulating the reinforcement layer between the base layer and the shell layer.

In any of the various embodiments discussed herein, a reinforcement layer may include a composite fiber material. In any of the various embodiments discussed herein, a reinforcement layer may include polymer thread comprising a low melting point thermoplastic polymer.

In any of the various embodiments discussed herein, a method of manufacturing at least a portion of an upper for an article of footwear may include disposing a sole plate in a mold cavity such that inflating an inflatable bladder presses the sole plate against a sole pattern formed on the interior surface of the mold cavity, thereby forming structural features on the sole plate. In some embodiments, inflating the inflatable bladder within a heated mold cavity bonds the sole plate to the skin.

In any of the various embodiments discussed herein, structural features formed on a sole plate may include traction elements. In any of the various embodiments discussed herein, structural features formed on a sole plate may include cleat studs.

Some embodiments may include a method of providing a pattern on at least a portion of an upper for an article of footwear, the method including disposing an inflatable bladder around a last; disposing an upper material over the inflatable bladder, the upper material including a low melting point thermoplastic polymer; providing a mold insert including a mold-cavity-facing surface, an upper-facing surface opposite the mold-cavity-facing surface, and a mold pattern including a plurality of surface features formed in the mold insert; placing the last, the inflatable bladder, and the upper material within a cavity of a mold such that the mold insert is disposed between the skin and a surface the mold cavity; heating the mold to a predetermined temperature; and inflating the inflatable bladder such that the upper material is pressed against the mold insert within the heated mold cavity, thereby forming a pattern on an exterior surface of the upper material.

In any of the various embodiments discussed herein, a portion of an upper material defining an exterior surface of the upper material may include the low melting point thermoplastic polymer.

In any of the various embodiments discussed herein, a mold insert may include a stencil including surfaces features disposed between struts of the stencil, the surface features being openings extending through the mold insert from the upper-facing surface to the mold-cavity-facing surface.

In any of the various embodiments discussed herein, openings formed in a mold insert may be disposed in a gradient pattern that extends from a forefoot portion of the mold insert to a heel portion of the mold insert and the gradient pattern may include openings with varying depths.

Some embodiments may include an article of footwear including an upper including an outermost layer including a low melting point thermoplastic polymer; and a sole coupled to the upper, where the outermost surface of the outermost layer includes a molded pattern formed by any of the various thermos-molding methods discussed herein.

In any of the various embodiments, discussed herein, an upper may include a base layer, an outermost layer, and a reinforcement layer disposed between the base layer and the outermost layer.

Some embodiments may include an article of footwear including an upper including an outermost layer including a low melting point thermoplastic polymer; and a sole coupled to the upper, where the outermost surface of the outermost layer includes a molded pattern including a plurality of surface features disposed in a gradient pattern that extends from a forefoot portion of the upper to a heel portion of the upper, the gradient pattern includes surface features having different sizes, and the gradient pattern is configured to impart varying degrees of one or more structural characteristics to different areas of the upper.

In any of the various embodiments discussed herein, an outermost layer may be a single integrally formed layer.

In any of the various embodiments discussed herein, a structural characteristics that may vary within a gradient pattern may be selected from the group including: ventilation, stretchability, strength, and propulsion.

In any of the various embodiments discussed herein, height of surface features may vary in a gradient pattern.

In any of the various embodiments discussed herein, the number of surface features per unit area in a gradient pattern in a heel portion of an article of footwear may be different from the number of surface features per unit area in the gradient pattern in a forefoot portion of the article of footwear.

Some embodiments may include a molding tool for manufacturing at least a portion of an article of footwear, the molding tool including a mold including a cavity defined by a cavity surface and including a three-dimensional volume having a surface area corresponding to an outermost surface area of an upper for an article of footwear; and a mold insert configured to be disposed over at least a portion of the cavity surface and including a mold-cavity-facing surface, an interior surface opposite the mold-cavity-facing surface, and a mold pattern including a plurality of surface features formed in the mold insert, the mold pattern including surface features disposed in a gradient pattern that is configured to impart varying degrees of one or more structural characteristics to different areas of an upper for an article of footwear.

In any of the various embodiments discussed herein, a mold insert may be releasably coupled to a mold.

In any of the various embodiments discussed herein, a mold insert may include a stencil including surfaces features disposed between struts of the stencil and the surface features may be openings extending through the mold insert from an interior surface of the mold inset to a mold-cavity-facing surface of the mold insert.

In any of the various embodiments discussed herein, a gradient pattern may include openings with varying depths.

In any of the various embodiments discussed herein, a mold may include a lateral mold plate defining a lateral side of a mold cavity and a medial mold plate defining a medial side of the mold cavity.

In any of the various embodiments discussed herein, a mold insert may include a lateral mold insert releasably attached to a mold and disposed over at least a portion of a lateral mold plate; and a medial mold insert releasably attached to the mold and disposed over at least a portion of a medial mold plate.

Some embodiments may include a molding tool for manufacturing at least a portion of an article of footwear, the molding tool including a mold including a cavity defined by a cavity surface and including a three-dimensional volume having a surface area corresponding to an outermost surface area of an upper for an article of footwear; and a three dimensional stencil including a first surface area in contact with the mold cavity, a second surface area configured to contact an exterior surface of an upper material, and a plurality of openings extending through the mold insert and disposed between struts of the stencil, where the openings are disposed in a gradient pattern including openings with at least one of: varying depths and varying sizes, the three dimensional stencil includes a shape corresponding to an outermost surface area of an upper for an article of footwear, and the gradient pattern extends from a forefoot portion of the three dimensional stencil to a heel portion of the three dimensional stencil.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention(s) and the appended claims in any way.

The present invention(s) have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention(s) should not be limited by any of the above-described exemplary embodiments, but should be defined only in accordance with the following claims and their equivalents.

What is claimed is:

1. A method of manufacturing at least a portion of an upper for an article of footwear, the method comprising:
    disposing an inflatable bladder around a last;
    disposing a skin over the inflatable bladder;
    disposing a mold insert over the skin, the mold insert comprising a mold-cavity-facing surface, a skin-facing surface opposite the mold-cavity-facing surface, and a hollow shape defined by the skin-facing surface;
    placing the last, the inflatable bladder, the skin, and the mold insert within a cavity of a mold, the cavity of the mold having an interior shape corresponding to the shape of an upper for an article of footwear;
    heating the mold to a predetermined temperature; and
    inflating the inflatable bladder such that the skin is pressed against the mold insert within the mold cavity, thereby causing the skin to take on the shape of at least a portion of an upper.

2. The method of claim 1, further comprising, after the skin is pressed against the mold insert within the mold cavity, removing the skin from the mold cavity and separating the mold insert from the skin.

3. The method of claim 1, wherein the skin does not adhere to the mold insert within the mold cavity.

4. The method of claim 1, wherein the mold insert is a single piece mold insert.

5. The method of claim 4, wherein the single piece mold insert avoids the formation of molding lines on the skin within the cavity of a mold.

6. The method of claim 1, wherein the mold insert comprises an insulative material having a thermal conductivity of equal to or less than 1 W/m-K at 294.15° K.

7. The method of claim 1, wherein the mold insert comprises a polymeric material.

8. The method of claim 1, wherein the mold insert comprises a thickness in a range of 0.5 mm to 10 mm.

9. The method of claim 1, further comprising molding the skin to a sole in the cavity of the mold.

10. The method of claim 9, wherein molding the skin to the sole bonds the skin to the sole.

11. The method of claim 9, wherein molding the skin to the sole comprises:

placing a sole within the cavity of the mold; and inflating the inflatable bladder such that the sole is pressed against the mold insert within the mold cavity.

12. The method of claim 11, wherein the mold insert is disposed between the sole and the mold cavity.

13. The method of claim 9, wherein the skin wraps around at least a portion of a medial side, a bottom surface, and a lateral side of the sole in the cavity of the mold.

14. The method of claim 13, wherein the mold insert is disposed between the bottom surface of the sole and the mold cavity.

15. The method of claim 1, wherein the skin comprises a low melting point thermoplastic polymer having a melting point of 200° C. or less.

16. The method of claim 15, wherein the predetermined temperature is below the melting point of the low melting point thermoplastic polymer.

17. A method of manufacturing at least a portion of an upper for an article of footwear, the method comprising:

disposing an inflatable bladder around a last;

disposing a skin over the inflatable bladder;

disposing a single piece mold insert over the skin, the single piece mold insert comprising a polymeric material and a thickness in a range of 0.5 mm to 10 mm;

placing the last, the inflatable bladder, the skin, and the mold insert within a cavity of a mold, the cavity of the mold having an interior shape corresponding to the shape of an upper for an article of footwear;

heating the mold to a predetermined temperature; and inflating the inflatable bladder such that the skin is pressed against the mold insert within the mold cavity, thereby causing the skin to take on the shape of at least a portion of an upper.

18. The method of claim 17, further comprising, after the skin is pressed against the mold insert within the mold cavity, removing the skin from the mold cavity and separating the single piece mold insert from the skin.

19. A method of manufacturing at least a portion of an upper for an article of footwear, the method comprising:

disposing an inflatable bladder around a last;

disposing an upper material over the inflatable bladder, the upper material comprising a low melting point thermoplastic polymer having a melting point of 200° C. or less;

disposing a mold insert over the upper material, the mold insert comprising a mold-cavity-facing surface, an upper-facing surface opposite the mold-cavity-facing surface, and a hollow shape defined by the upper-facing surface;

placing the last, the inflatable bladder, the upper material, and the mold insert within a cavity of a mold, the cavity of the mold having an interior shape corresponding to the shape of an upper for an article of footwear;

heating the mold to a predetermined temperature; and inflating the inflatable bladder such that the upper material is pressed against the mold insert within the mold cavity, thereby causing the upper material to take on the shape of at least a portion of an upper.

\* \* \* \* \*